US012664821B2

(12) United States Patent
Elwazer et al.

(10) Patent No.: US 12,664,821 B2
(45) Date of Patent: Jun. 23, 2026

(54) AUTOMATIC BODY MOVEMENT RECOGNITION AND ASSOCIATION SYSTEM INCLUDING SMOOTHING, SEGMENTATION, SIMILARITY, POOLING, AND DYNAMIC MODELING

(71) Applicant: KinTrans, Inc., Dallas, TX (US)

(72) Inventors: Mohamed Elwazer, Dallas, TX (US); Muthulakshmi Chandrasekaran, Dallas, TX (US); Vinay Mishra, Dallas, TX (US)

(73) Assignee: KinTrans, Inc., Dallas, TX (US)

( * ) Notice: Subject to any disclaimer, the term of this patent is extended or adjusted under 35 U.S.C. 154(b) by 641 days.

(21) Appl. No.: 17/858,051

(22) Filed: Jul. 5, 2022

(65) Prior Publication Data

US 2023/0177881 A1 Jun. 8, 2023

Related U.S. Application Data

(60) Provisional application No. 63/218,652, filed on Jul. 6, 2021.

(51) Int. Cl.
| | |
|---|---|
| *G06V 40/20* | (2022.01) |
| *G06T 7/246* | (2017.01) |
| *G06T 7/269* | (2017.01) |
| *G06V 20/64* | (2022.01) |

(52) U.S. Cl.
CPC .............. *G06V 40/23* (2022.01); *G06T 7/248* (2017.01); *G06T 7/251* (2017.01); *G06T 7/269* (2017.01); *G06V 20/64* (2022.01); *G06T 2207/30196* (2013.01)

(58) Field of Classification Search
CPC ........ G06V 40/23; G06V 20/64; G06T 7/248; G06T 7/251; G06T 7/269; G06T 2207/30196; G06T 2207/10016; G06T 2207/10024
See application file for complete search history.

(56) References Cited

U.S. PATENT DOCUMENTS

| | | | | |
|---|---|---|---|---|
| 9,990,553 | B1 * | 6/2018 | Chan ...................... | G06Q 40/08 |
| 2004/0186695 | A1 | 9/2004 | Aoshima et al. | |
| 2011/0292036 | A1 * | 12/2011 | Sali ........................ | G06T 17/00 |
| | | | | 345/419 |
| 2012/0058824 | A1 * | 3/2012 | Raptis ................... | A63F 13/213 |
| | | | | 463/36 |
| 2012/0163520 | A1 * | 6/2012 | Liu ........................ | G01D 21/00 |
| | | | | 375/356 |
| 2013/0051614 | A1 | 2/2013 | Lee et al. | |
| 2013/0077820 | A1 * | 3/2013 | Marais ................ | G06F 18/2148 |
| | | | | 382/103 |

(Continued)

*Primary Examiner* — Ming Y Hon
(74) *Attorney, Agent, or Firm* — Rockman Videbeck & O'Connor

(57) ABSTRACT

An automatic body movement recognition and association system that uses two dimensional (2D) and/or three dimensional (3D) skeletal joint information from at least one of a stand-alone depth-sensing image capture device, sensor, wearable sensor, video, and/or video streams that detects the body movements of a user. The automatic body movement recognition and association system can perform various processes on the body movement data, such as smoothing, segmentation, similarity, pooling, and dynamic modeling.

3 Claims, 60 Drawing Sheets

(56) References Cited

U.S. PATENT DOCUMENTS

| | | | |
|---|---|---|---|
| 2013/0222565 A1* | 8/2013 | Guerin | A63F 13/211 348/77 |
| 2013/0278501 A1* | 10/2013 | Bulzacki | G06F 18/2413 345/157 |
| 2013/0336524 A1 | 12/2013 | Zhang et al. | |
| 2014/0267611 A1* | 9/2014 | Kennett | G06V 40/23 348/46 |
| 2015/0092980 A1* | 4/2015 | Folmer | G06V 40/165 382/103 |
| 2016/0042228 A1 | 2/2016 | Opalka et al. | |
| 2016/0170603 A1 | 6/2016 | Bastien et al. | |
| 2017/0351910 A1* | 12/2017 | Elwazer | G06V 10/768 |
| 2017/0368413 A1* | 12/2017 | Shavit | A63B 24/0075 |
| 2018/0047157 A1* | 2/2018 | Sinha | A61B 5/7271 |
| 2019/0073565 A1* | 3/2019 | Saliou | G06F 18/21375 |
| 2019/0251340 A1* | 8/2019 | Brown | G06N 3/045 |
| 2020/0167555 A1* | 5/2020 | Elwazer | G06V 40/23 |
| 2020/0167556 A1 | 5/2020 | Elwazer et al. | |
| 2020/0222757 A1* | 7/2020 | Yang | G06V 40/23 |
| 2021/0059596 A1* | 3/2021 | Hiyama | A61B 5/7275 |
| 2021/0074003 A1 | 3/2021 | Xie et al. | |
| 2021/0133580 A1 | 5/2021 | Mehl et al. | |
| 2021/0192783 A1 | 6/2021 | Huelsdunk et al. | |
| 2022/0157427 A1* | 5/2022 | Keeley | G16H 30/40 |

* cited by examiner

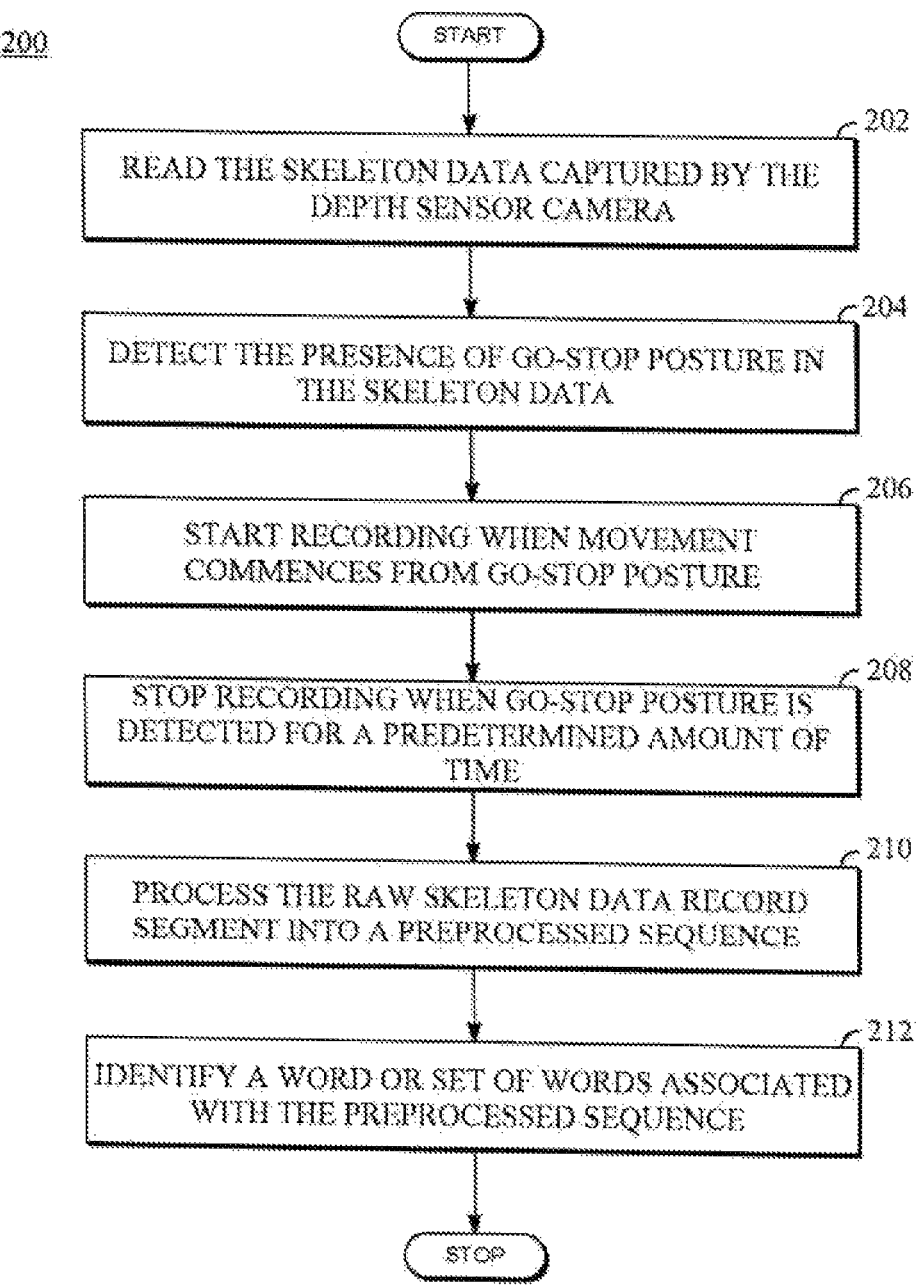

200

START

READ THE SKELETON DATA CAPTURED BY THE
DEPTH SENSOR CAMERA
202

DETECT THE PRESENCE OF GO-STOP POSTURE IN
THE SKELETON DATA
204

START RECORDING WHEN MOVEMENT
COMMENCES FROM GO-STOP POSTURE
206

STOP RECORDING WHEN GO-STOP POSTURE IS
DETECTED FOR A PREDETERMINED AMOUNT OF
TIME
208

PROCESS THE RAW SKELETON DATA RECORD
SEGMENT INTO A PREPROCESSED SEQUENCE
210

IDENTIFY A WORD OR SET OF WORDS ASSOCIATED
WITH THE PREPROCESSED SEQUENCE
212

STOP

START

ESTIMATE THE OPTIMAL PARAMETERS BASED ON THE FEATURE VECTOR ⌐302

CREATE A BODY POSITION MODE FOR THE BODY POSITION ⌐304

COMPUTE THE OBSERVATION PROBABILITY GIVEN EACH BODY POSITION MODEL ⌐306

IDENTIFY THE BODY POSITION HAVING THE MAXIMUM MODEL PROBABILITY ⌐308

STOP

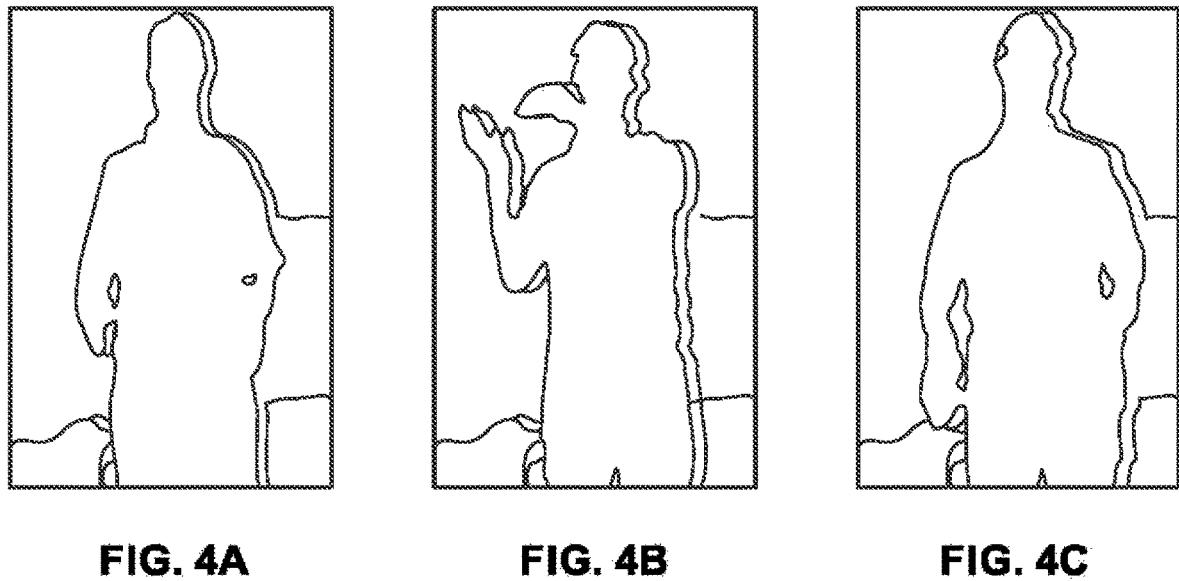
FIG. 4A FIG. 4B FIG. 4C
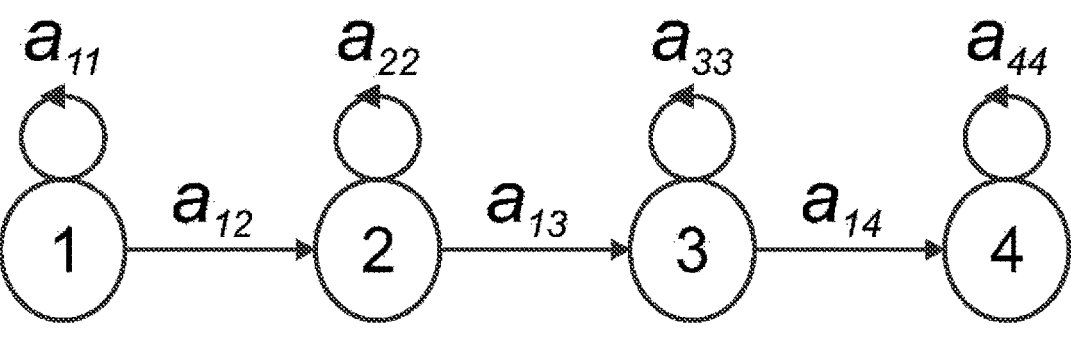
FIG. 6

1000

1100

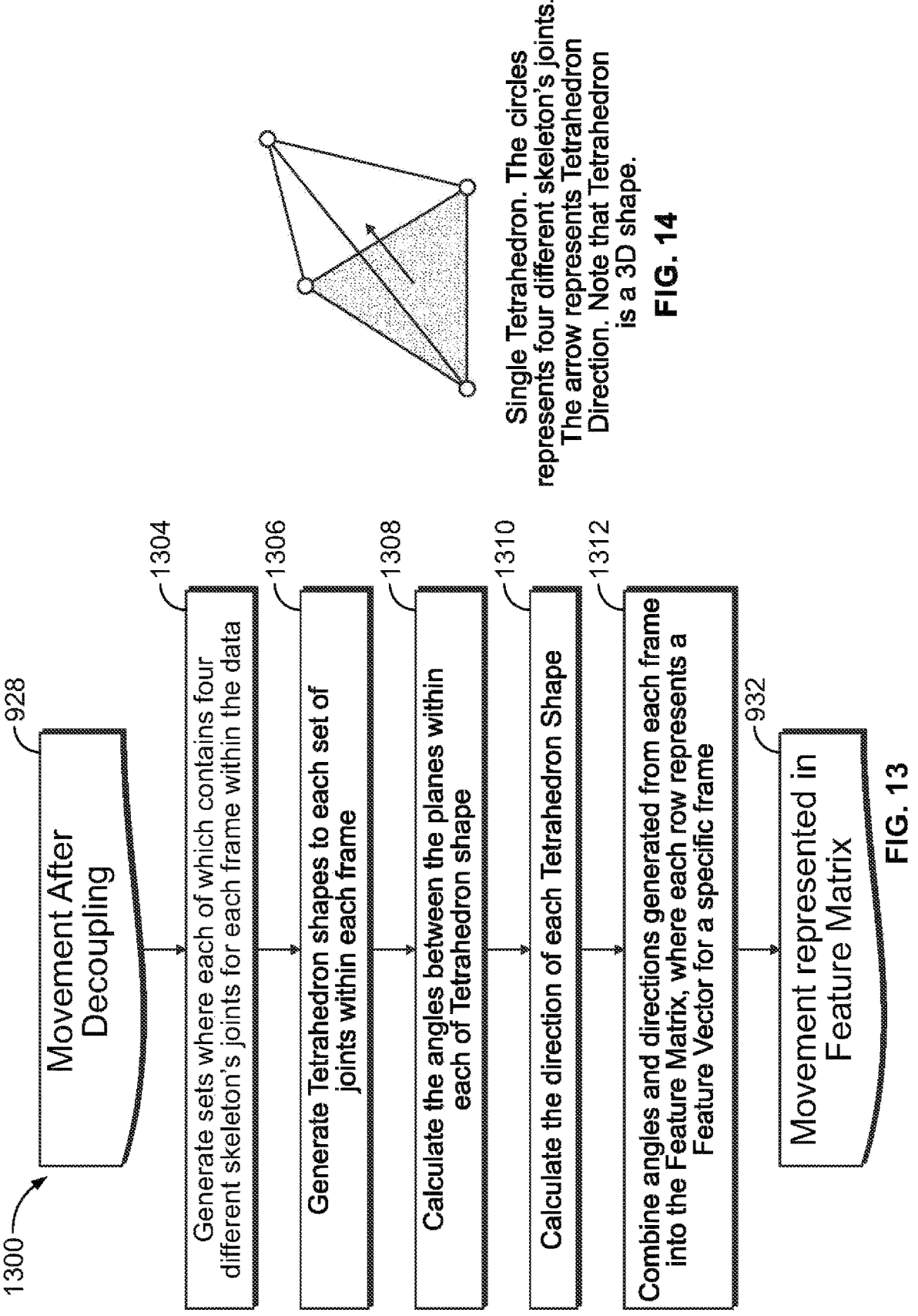

Single Tetrahedron. The circles represents four different skeleton's joints. The arrow represents Tetrahedron Direction. Note that Tetrahedron is a 3D shape.

Movement After Decoupling

1304

Generate sets where each of which contains four different skeleton's joints for each frame within the data

1306

Generate Tetrahedron shapes to each set of joints within each frame

1308

Calculate the angles between the planes within each of Tetrahedron shape

1310

Calculate the direction of each Tetrahedron Shape

1312

Combine angles and directions generated from each frame into the Feature Matrix, where each row represents a Feature Vector for a specific frame

932

Movement represented in Feature Matrix

Performance / Style /Technique Comparison Between 2 or More Different Athletes

- Similarity score between 2 movements
- Timeline comparison between movements
- Identify on a timeline the unnecessary and/or neglected Pieces of movement compared to same movement of a benchmark Timeline Analysis with Sequence Similarity Benchmark Generator Activity Segmentation Activity Segmentation Similarity Feedback Information Based on 'Correct-ness' Score and Recommendations for Improving 'Correct-ness' Score

- Specific joints not positioned correctly are identified
- 'Range-of-motion' differences between input movement and benchmark
- Overall score of correct performance Timeline Analysis with Sequence Similarity Benchmark Generator Joint Error Score

FIG. 15D (CONTINUED)

Generate Truth Model

- Truth model is probabilistic generative connected model which can find true data pieces distributions across sequence. This model will help to measure how good each time slice within sequence. Good time slices will be smoothed less. Bad(errors) time slices will be smoothed more.

|   | 0 | 1 | 2 |
|---|---|---|---|
| 0 | 0.5 | 0.5 | 0 |
| 1 | 1/3 | 1/3 | 1/3 |
| 2 | 0 | 0.5 | 0.5 |

Transition Matrix Initialization

| 1/3 | 1/3 | 1/3 |
|---|---|---|

Initials Vector Initialization

Initialize Components' Distributions from Data if No Previous Truth Model is Being Used for Component Initialization
 (0) Initialize mean with Zero
 (1) Initialize mean with Sequence Curvatures Minimum
 (2) Initialize mean with Sequence Curvatures Lower Quartile Value
FIG. 22

| | | Initialize Components' Distributions from Previous Truth Model |
|---|---|---|
| 0 | | Initialize mean Component "0" from Previous Truth Model |
| 1 | | Initialize mean Component "1" from Previous Truth Model |
| 2 | | Initialize mean Component "2" from Previous Truth Model |

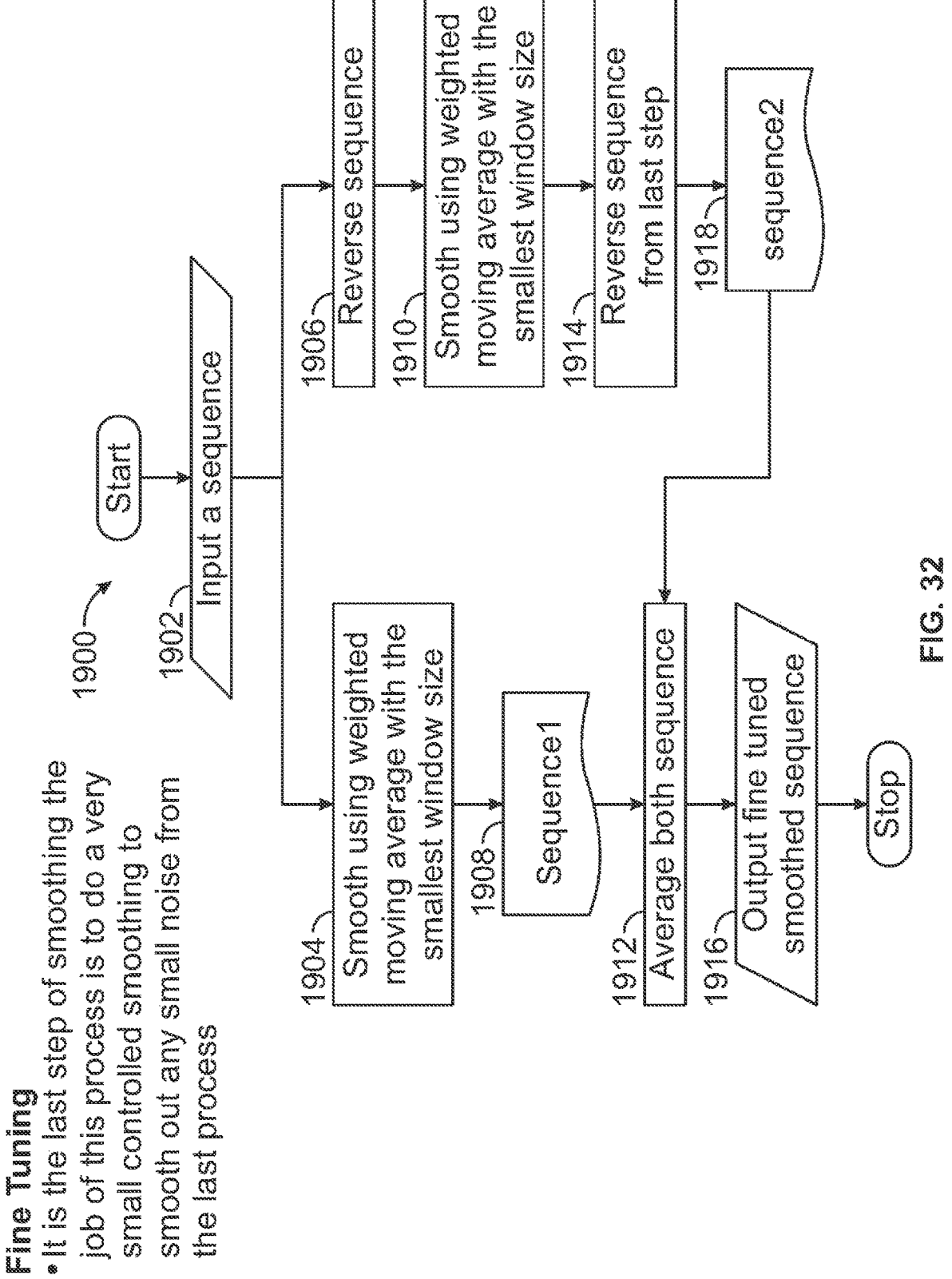

Fine Tuning

• It is the last step of smoothing the job of this process is to do a very small controlled smoothing to smooth out any small noise from the last process

1900

1902 Input a sequence

Start

1904 Smooth using weighted moving average with the smallest window size

1906 Reverse sequence

1908 Sequence1

1910 Smooth using weighted moving average with the smallest window size

1912 Average both sequence

1914 Reverse sequence from last step

1916 Output fine tuned smoothed sequence 1918 sequence2

Stop

FIG. 32

Showing Smoothing on one of Sequence Dimensions
• X-Axis is Time
• Smoothing Happens on all Dimensions at Once. This is Example for how the Smoothing will Look Like.

| | 0 | 1 | 2 |
|---|---|---|---|
| 0 | 0.5 | 0.5 | 0 |
| 1 | 1/3 | 1/3 | 1/3 |
| 2 | 0 | 1 | 0 |

Transition Matrix Initialization

| 0.5 | 0.5 | 0 |
|---|---|---|

Initials Vector Initialization

Curvature

Lable 2

Lable 1

Lable 0

Time

FIG. 39

Segmentation

Segments will not overlap

1504

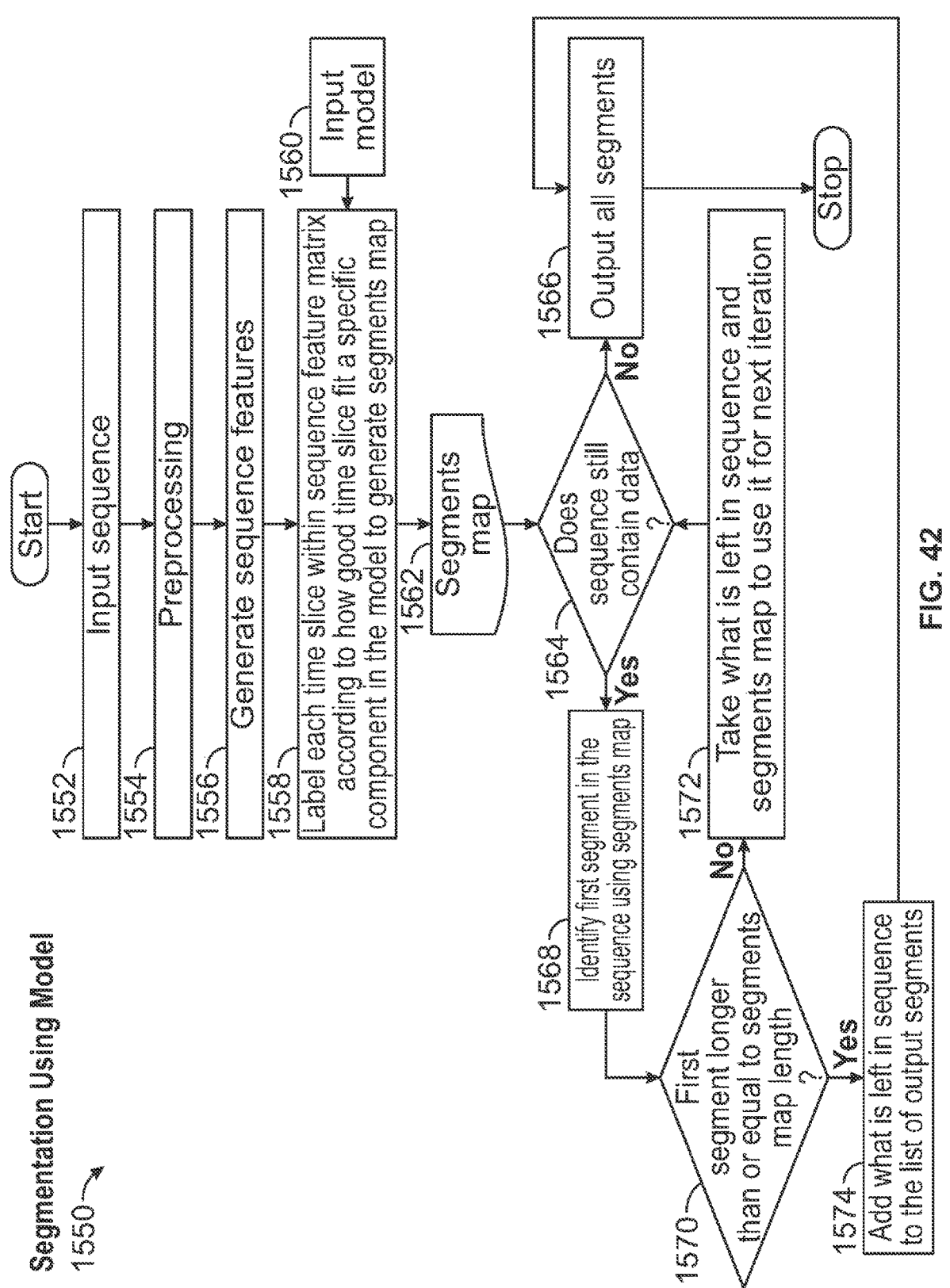

Segmentation Using Model

1550

1552 Input sequence

1554 Preprocessing

1556 Generate sequence features

1558 Label each time slice within sequence feature matrix according to how good time slice fit a specific component in the model to generate segments map 1560 Input model 1562 Segments map 1564 Does sequence still contain data?

1566 Output all segments

Stop

1568 Identify first segment in the sequence using segments map

1570 First segment longer than or equal to segments map length?

1572 Take what is left in sequence and segments map to use it for next iteration 1574 Add what is left in sequence to the list of output segments

FIG. 42

Pooling

- It Pools Segments that Looks Like Each Others Together

1700

1720

Start

1722

Preprocessing config          Input segment

1724

Calculate sequence features matrix

1726

Calculate min, average and max times slices within features matrix

1728

Initialize segment model

1730

Fit initialized segment model on sequence features matrix

1732

Output segment model and sequence features matrix

Stop

| | 0 | 1 | 2 |
|---|---|---|---|
| 0 | 1/3 | 1/3 | 1/3 |
| 1 | 1/3 | 1/3 | 1/3 |
| 2 | 0 | 0.5 | 0.5 |

Transition Matrix Initialization

| 0.5 | 0.5 | 0 |
|---|---|---|

Initials Vector Initialization

Initialize Components' Distributions from Data
 0 Initialize Mean with One of Features Matrix Max/Min Rows which Occurred First Time.
 1 Initialize Mean with Features Matrix Average Row
 2 Initialize Mean with One of Features Matrix Max/Min Rows which Occurred Later in Time.
FIG. 56

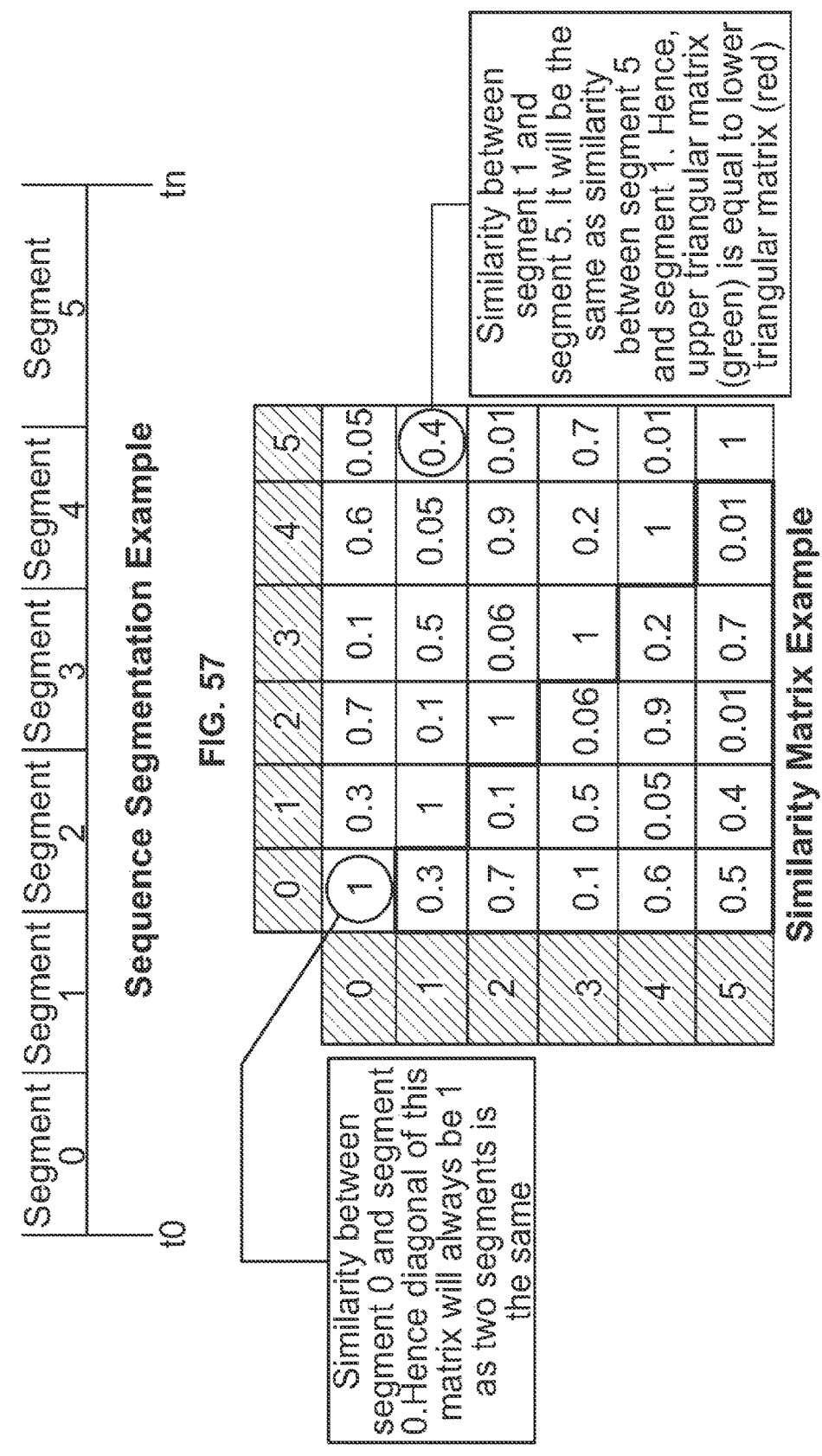

Build Similarity Matrix

- Similarity matrix is a matrix that describe how similar each segment to all the other segments
- Algorithm used in detecting similarity is similarity algorithm but using segment model in calculating similarity instead of dynamic connected model

| | Segment 0 | Segment 1 | Segment 2 | Segment 3 | Segment 4 | Segment 5 |
|---|---|---|---|---|---|---|
| t0 | | | | | | tn |

Sequence Segmentation Example

FIG. 57

Similarity between segment 0 and segment 0. Hence diagonal of this matrix will always be 1 as two segments is the same

| | 0 | 1 | 2 | 3 | 4 | 5 |
|---|---|---|---|---|---|---|
| 0 | 1 | 0.3 | 0.7 | 0.1 | 0.6 | 0.05 |
| 1 | 0.3 | 1 | 0.1 | 0.5 | 0.05 | 0.4 |
| 2 | 0.7 | 0.1 | 1 | 0.06 | 0.9 | 0.01 |
| 3 | 0.1 | 0.5 | 0.06 | 1 | 0.2 | 0.7 |
| 4 | 0.6 | 0.05 | 0.9 | 0.2 | 1 | 0.01 |
| 5 | 0.5 | 0.4 | 0.01 | 0.7 | 0.01 | 1 |

Similarity between segment 1 and segment 5. It will be the same as similarity between segment 5 and segment 1. Hence, upper triangular matrix (green) is equal to lower triangular matrix (red)

Similarity Matrix Example

FIG. 58

Dot similarity between segment 1 and segment 5. It will be the same as dot similarity between segment 5 and segment 1. Hence, upper triangular matrix (green) is equal to lower triangular matrix (red). Note the dot similarity got higher than similarity between segment 1 and segment 5, due to the higher matching between row 1 and row 5

Dot Similarity Matrix Example
FIG. 60

|   | 0 | 1 | 2 | 3 | 4 | 5 |
|---|---|---|---|---|---|---|
| 0 | 1 | ... | ... | ... | ... | 0.74 |
| 1 | ... | 1 | ... | ... | ... | ... |
| 2 | ... | ... | 1 | ... | ... | ... |
| 3 | ... | ... | ... | 1 | ... | ... |
| 4 | ... | ... | ... | ... | 1 | ... |
| 5 | 0.74 | ... | ... | ... | ... | 1 |

Similarity Matrix Example
FIG. 59

|   | 0 | 1 | 2 | 3 | 4 | 5 |
|---|---|---|---|---|---|---|
| 0 | 1 | 0.3 | 0.7 | 0.1 | 0.6 | 0.5 |
| 1 | 0.3 | 1 | 0.1 | 0.5 | 0.05 | 0.4 |
| 2 | 0.7 | 0.1 | 1 | 0.06 | 0.9 | 0.01 |
| 3 | 0.1 | 0.5 | 0.06 | 1 | 0.2 | 0.7 |
| 4 | 0.6 | 0.05 | 0.9 | 0.2 | 1 | 0.01 |
| 5 | 0.5 | 0.4 | 0.01 | 0.7 | 0.01 | 1 |

Dynamic Forward Model
- Component number is Exactly the Same as Good Segment Number

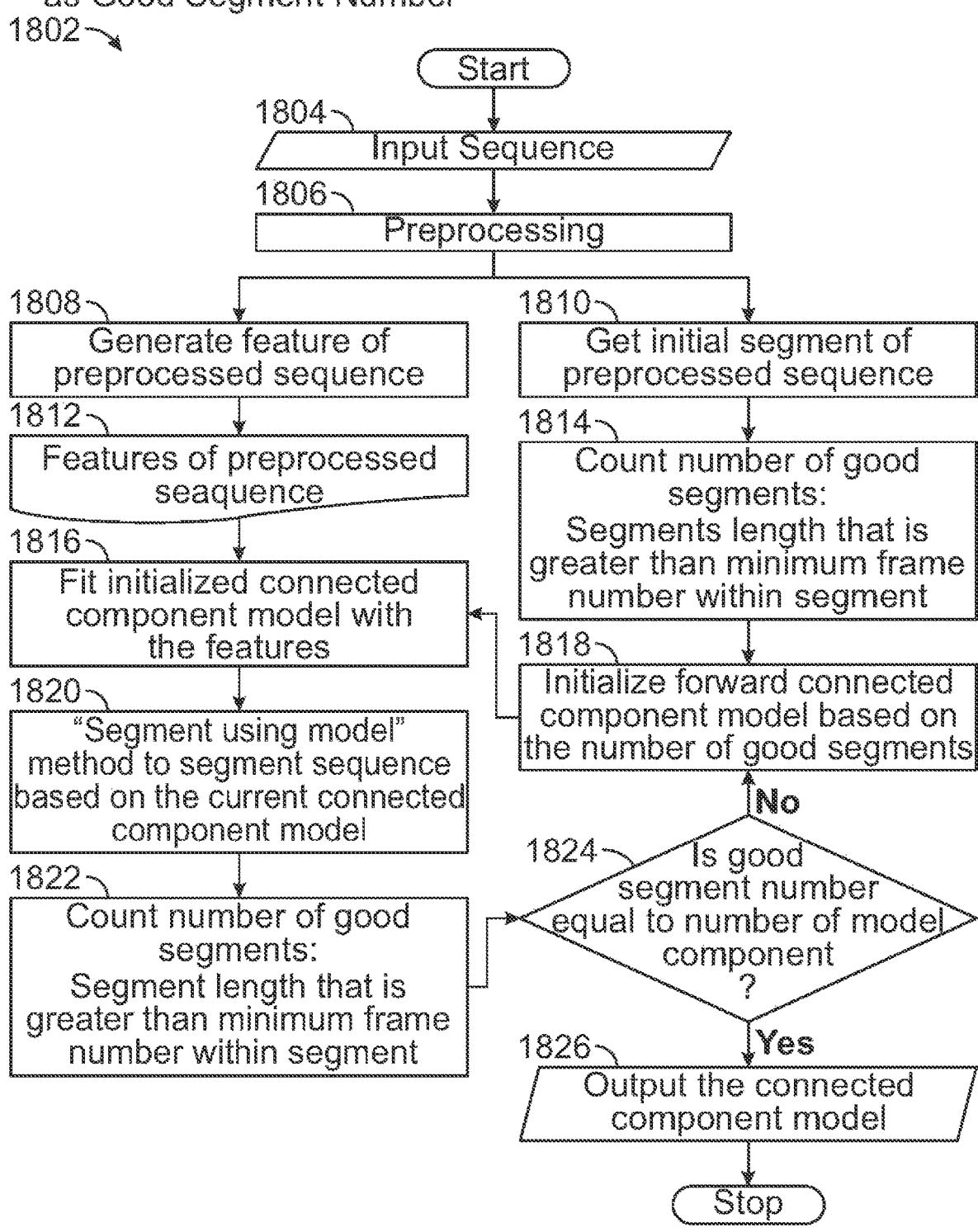

1802

Start

1804 — Input Sequence

1806 — Preprocessing

1808 — Generate feature of preprocessed sequence

1810 — Get initial segment of preprocessed sequence

1812 — Features of preprocessed seaquence

1814 — Count number of good segments:
Segments length that is greater than minimum frame number within segment 1816 — Fit initialized connected component model with the features 1818 — Initialize forward connected component model based on the number of good segments 1820 — "Segment using model" method to segment sequence based on the current connected component model 1822 — Count number of good segments:
Segment length that is greater than minimum frame number within segment 1824 — Is good segment number equal to number of model component ?

No

Yes

1826 — Output the connected component model

Stop

|     | 0 | 1 | 2 | 3 | $\cdots$ | N |
|-----|---|---|---|---|----------|---|
| 0   | 0.5 | 0.5 | 0 | 0 | 0 | 0 |
| 1   | 0 | 0.5 | 0.5 | 0 | 0 | 0 |
| 2   | 0 | 0 | 0.5 | 0.5 | $\cdots$ | 0 |
| $\vdots$ | 0 | 0 | 0 | 0.5 | $\cdots$ | 0 |
| N   | 0 | 0 | 0 | 0 | $\cdots$ | 1 |

Transition Matrix Initialization

| Component Label | 0 | 1 | 2 | $\cdots$ | N |
|-----------------|---|---|---|----------|---|
| Probability Values | 1 | 0 | 0 | 0 | 0 |

Initials Vector Initialization

Dynamic Ergodic Model
* Less number of component than dynamic forward model
* Component number is equal to number of pools
* Each pool is a group of segments that are similar to each other 3 Component Ergodic
Connected Model Example

| | 0 | 1 | 2 | 3 | $\cdots$ | N |
|---|---|---|---|---|---|---|
| 0 | 1/N | 1/N | 1/N | 1/N | 1/N | 1/N |
| 1 | 1/N | 1/N | 1/N | 1/N | 1/N | 1/N |
| 2 | 1/N | 1/N | 1/N | 1/N | 1/N | 1/N |
| $\vdots$ | 1/N | 1/N | 1/N | 1/N | 1/N | 1/N |
| N | 1/N | 1/N | 1/N | 1/N | 1/N | 1/N |

Transition Matrix Initialization

FIG. 68

| Component Label | 0 | 1 | 2 | $\cdots$ | N |
|---|---|---|---|---|---|
| Probability Values | 1 | 0 | 0 | 0 | 0 |

Initials Vector Initialization

FIG. 69

AUTOMATIC BODY MOVEMENT RECOGNITION AND ASSOCIATION SYSTEM INCLUDING SMOOTHING, SEGMENTATION, SIMILARITY, POOLING, AND DYNAMIC MODELING

CROSS-REFERENCE TO RELATED APPLICATION(S)

This application claims priority to U.S. Provisional Application No. 63/218,652, filed Jul. 6, 2021, to the extent allowed by law and the contents of which are incorporated herein by reference in their entireties.

TECHNICAL FIELD

This disclosure relates to an automatic body movement recognition and association system and, more particularly, to such a system that performs smoothing, pooling, similarity, segmentation, and dynamic modeling of the body movement data gathered by the system.

BACKGROUND

The recognition of human body movement is used in a wide variety of fields and applications. Body movement is used, for example, in motion gaming systems to play games and sports, in psychology to interpret a person's emotions through their body language, in medicine to diagnose certain ailments or conditions, and in sign language to communicate with a hearing impaired person. Each body movement or combination of body movements has a meaning in each respective application, such as the specific video game, psychological condition, medical condition, and/or sign language. Interpreting these body movements, however, requires knowledge in the field, such as a trained psychologist, a trained medical professional, or a trained sign language interpreter. The automatic body movement recognition and association system, using two dimensional and/or three dimensional skeleton data from a stand-alone depth-sensing image capture device, sensor, wearable sensor, video, video streams, and/or the like, provides more accurate body movement recognition and the ability to capture body movements in real-time and automatically associate those body movements with a meaning, such as a video game move, an emotion, a medical condition, or other written or spoken words or phrases, thereby allowing a person without any prior training or knowledge to understand the body movements as they are being captured. The automatic body movement recognition and association system further performs a smoothing process, a pooling process, a similarity process, a segmentation process and/or a dynamic modeling process on the two dimensional and/or three dimensional skeleton data received from the stand-alone depth-sensing image capture device, sensor, wearable sensor, video, video streams, and/or the like, to improve and/or bring precision and accuracy to the body movement recognition and the ability to capture body movements in real-time and automatically associate those body movements with a meaning.

SUMMARY

This disclosure relates generally to an automatic body movement recognition system. The teachings herein can provide a system that automatically receives multi-dimensional time series data points, such as human body joints in motion into new information about complex human activities and behaviors. One implementation of a method for smoothing a sequence of body movement data of a user that includes receiving the sequence of body movement data from one of a camera, a video, and a sensor, wherein the sequence of body movement data comprises one of a set of two dimensional coordinates of a plurality of points of a skeleton of the user and a set of three dimensional coordinates of a plurality of points of a skeleton of the user; fine tuning the sequence of body movement data into a smoothed sequence of body movement data; and outputting the smoothed sequence of body movement data.

One implementation of a method for segmenting a sequence of body movement data of a user that includes receiving the sequence of body movement data from one of a camera, a video, and a sensor, wherein the sequence of body movement data comprises one of a set of two dimensional coordinates of a plurality of points of a skeleton of the user and a set of three dimensional coordinates of a plurality of points of a skeleton of the user; processing, using a preprocessing component, the sequence of body movement data into a preprocessed sequence of body movement data; identifying an initial segment of body movement data on a condition that a length of the preprocessed sequence of body movement data is less than a minimum frame length; and identifying a plurality of initial segments of body movement data on a condition that the length of the preprocessed sequence of body movement data is at least the minimum frame length.

One implementation of a method of determining a similarity based on a first sequence of body movement data and a second sequence of body movement data of a user that includes receiving the first sequence of body movement data and the second sequence of body movement data from one of a camera, a video, and a sensor, wherein the first sequence of body movement data and the second sequence of body movement data comprises one of a set of two dimensional coordinates of a plurality of points of a skeleton of the user and a set of three dimensional coordinates of a plurality of points of a skeleton of the user; processing, using a preprocessing component, the first sequence of body movement data into a first preprocessed sequence of body movement data and the second sequence of body movement data into a second preprocessed sequence of body movement data; determining a first plurality of features based on the first preprocessed sequence of body movement data and a second plurality of features based on the second preprocessed sequence of body movement data; identifying a first dynamic connected model based on the first preprocessed sequence of body movement data and a second dynamic connected model based on the second preprocessed sequence of body movement data; determining a first one-way similarity based on the first plurality of features, the first dynamic connected model, and the second dynamic connected model and a second one-way similarity based on the second plurality of features, the second dynamic connected model, and the first dynamic connected model; and determining an average based on the first one-way similarity and the second one-way similarity.

One implementation of a method of pooling a sequence of body movement data of a user that includes receiving the sequence of body movement data from one of a camera, a video, and a sensor, wherein the sequence of body movement data comprises one of a set of two dimensional coordinates of a plurality of points of a skeleton of the user and a set of three dimensional coordinates of a plurality of points of a skeleton of the user; processing, using a preprocessing component, the sequence of body movement data into a preprocessed sequence of body movement data; segmenting the preprocessed sequence of body movement data into at least one segment of body movement data; identifying at least one segment model for each segment of body movement data based on the at least one segment of body movement data; identifying a similarity matrix based on the at least one segment model; identifying a dot similarity matrix based on the similarity matrix; determining a pools matrix based on the dot similarity matrix; and outputting the pools matrix and the at least one segment of body movement data.

One implementation of a method of determining at least one forward connected component model of a sequence of body movement data of a user that includes receiving the sequence of body movement data from one of a camera, a video, and a sensor, wherein the sequence of body movement data comprises one of a set of two dimensional coordinates of a plurality of points of a skeleton of the user and a set of three dimensional coordinates of a plurality of points of a skeleton of the user; processing, using a preprocessing component, the sequence of body movement data into a preprocessed sequence of body movement data; identifying a plurality of features based on the preprocessed sequence of body movement data; identifying at least one initial segment of body movement data based on the preprocessed sequence of body movement data; determining a number of good initial segments of body movement data based on the at least one initial segment of body movement data, wherein the number of good initial segments of body movement data comprises at least one initial segment of body movement data including a segment length that is greater than a minimum frame number within the at least one initial segment of body movement data; initializing at least one forward connected component model based on a number of good initial segments of body movement data; fitting the at least one initialized forward connected component model with the plurality of features; identifying at least one segment of body movement data based on the at least one initialized forward connected component model; determining a number of good segments of body movement data based on the at least one segment of body movement data, wherein the number of good segments of body movement data comprises at least one segment of body movement data including a segment length that is greater than a minimum frame number within the at least one segment of body movement data; and outputting the at least one initialized forward connected component model on a condition that the number of good segments of body movement data is equal to a number of initialized forward connected component models.

One implementation of a method of determining at least one ergodic connected component model of a sequence of body movement data of a user that includes receiving the sequence of body movement data from one of a camera, a video, and a sensor, wherein the sequence of body movement data comprises one of a set of two dimensional coordinates of a plurality of points of a skeleton of the user and a set of three dimensional coordinates of a plurality of points of a skeleton of the user; processing, using a preprocessing component, the sequence of body movement data into a preprocessed sequence of body movement data; identifying a first plurality of features based on the preprocessed sequence of body movement data; identifying at least one first pool based on the preprocessed sequence of body movement data; identifying a second plurality of features for each first pool; determining a first number of pools based on the at least one first pool; initializing at least one ergodic connected component model based on the first number of first pools; fitting the at least one initialized ergodic connected component model with the first plurality of features; identifying at least one segment of body movement data based on the at least one initialized ergodic connected component model; identifying at least one second pool based on the at least one segment of body movement data; determining a second number of pools based on the at least one second pool; and outputting the at least one initialized ergodic connected component model on a condition that the second number of pools is equal to a number of initialized ergodic connected component models.

Variations in these and other aspects of the disclosure will be described in additional detail hereafter.

BRIEF DESCRIPTION OF THE DRAWINGS

The description herein makes reference to the accompanying drawings wherein like reference numerals refer to like parts throughout the several views, and wherein:

FIG. 2 illustrates a flow diagram of a process for recognizing body movement and associating the body movement with a meaning in accordance with an implementation of this disclosure;

FIG. 4A illustrates an exemplary transition posture to be detected by the first embodiment of the automatic body movement recognition and association system in accordance with implementations of this disclosure;

FIG. 4B illustrates an exemplary body movement motion to be detected by the first embodiment of the automatic body movement recognition and association system in accordance with implementations of this disclosure;

FIG. 4C illustrates an exemplary transition posture to be detected by the first embodiment of the automatic body movement recognition and association system in accordance with implementations of this disclosure;

FIG. 6 illustrates an exemplary left-right Hidden Markov Model utilized in the exemplary first embodiment of the automatic body movement recognition and association system in accordance with implementations of this disclosure;

FIG. 13 illustrates a flow diagram of an exemplary feature extraction process for preprocessing body movement data in accordance with an exemplary implementation of this disclosure;

FIG. 14 illustrates a single three-dimensional tetrahedron and a tetrahedron direction arrow based on four different skeleton joints in accordance with an exemplary implementation of this disclosure;

FIG. 22 illustrates an exemplary initialization of the curvature components (FIG. 18) distributions from the sequence of data if no previous truth model is being used for component initialization of the exemplary second embodiment of the automatic body movement recognition and association system in accordance with implementations of this disclosure;

FIG. 32 illustrates a flow diagram of an exemplary process for fine tuning, using a very small controlled smoothing, of the exemplary second embodiment of the automatic body movement recognition and association system in accordance with implementations of this disclosure;

FIG. 39 illustrates an exemplary graph of curvature with respect to time of the exemplary second embodiment of the automatic body movement recognition and association system in accordance with implementations of this disclosure;

FIG. 42 illustrates a flow diagram of an exemplary process for segmentation using model of the sequence of data of the exemplary second embodiment of the automatic body movement recognition and association system in accordance with implementations of this disclosure;

FIG. 56 illustrates an exemplary initialization of the segment components (FIG. 52) distributions from a sequence of data of the exemplary second embodiment of the automatic body movement recognition and association system in accordance with implementations of this disclosure;

FIG. 57 illustrates an exemplary graph of a sequence segmentation example of the exemplary second embodiment of the automatic body movement recognition and association system in accordance with implementations of this disclosure;

FIG. 58 illustrates an exemplary similarity matrix example of the exemplary second embodiment of the auto-

Figure 61:
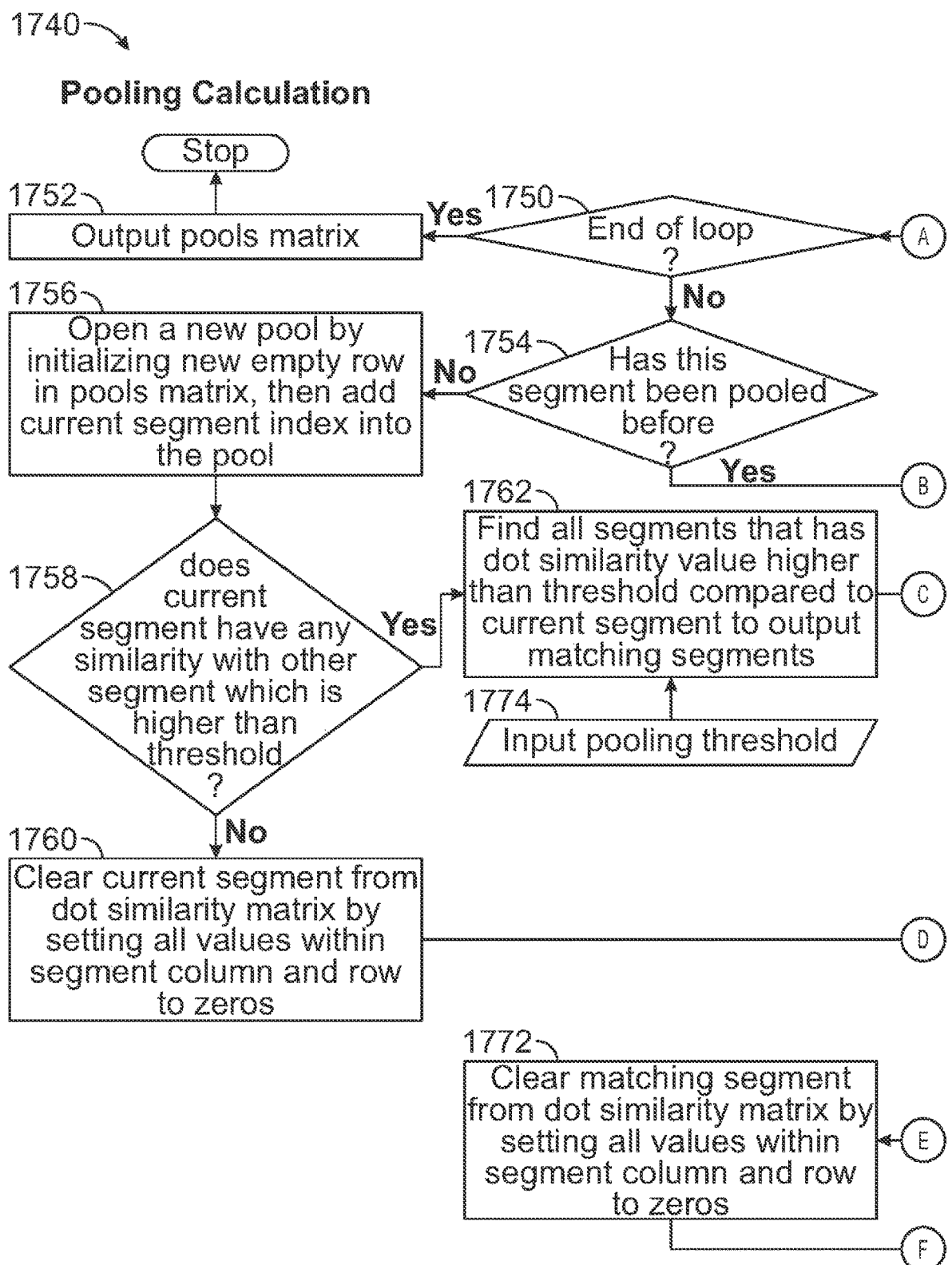
Figure 61:
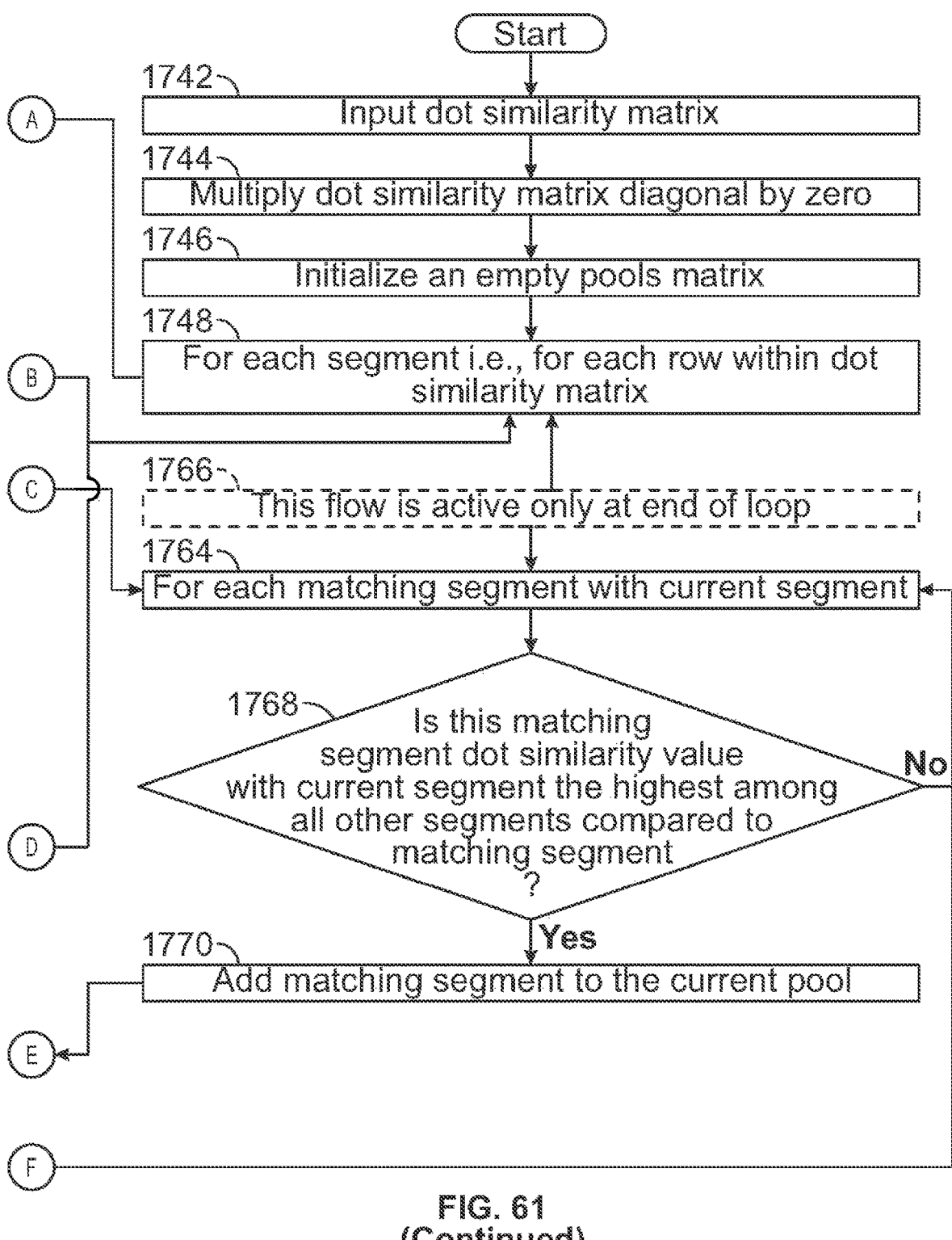
Figures 64, 65:
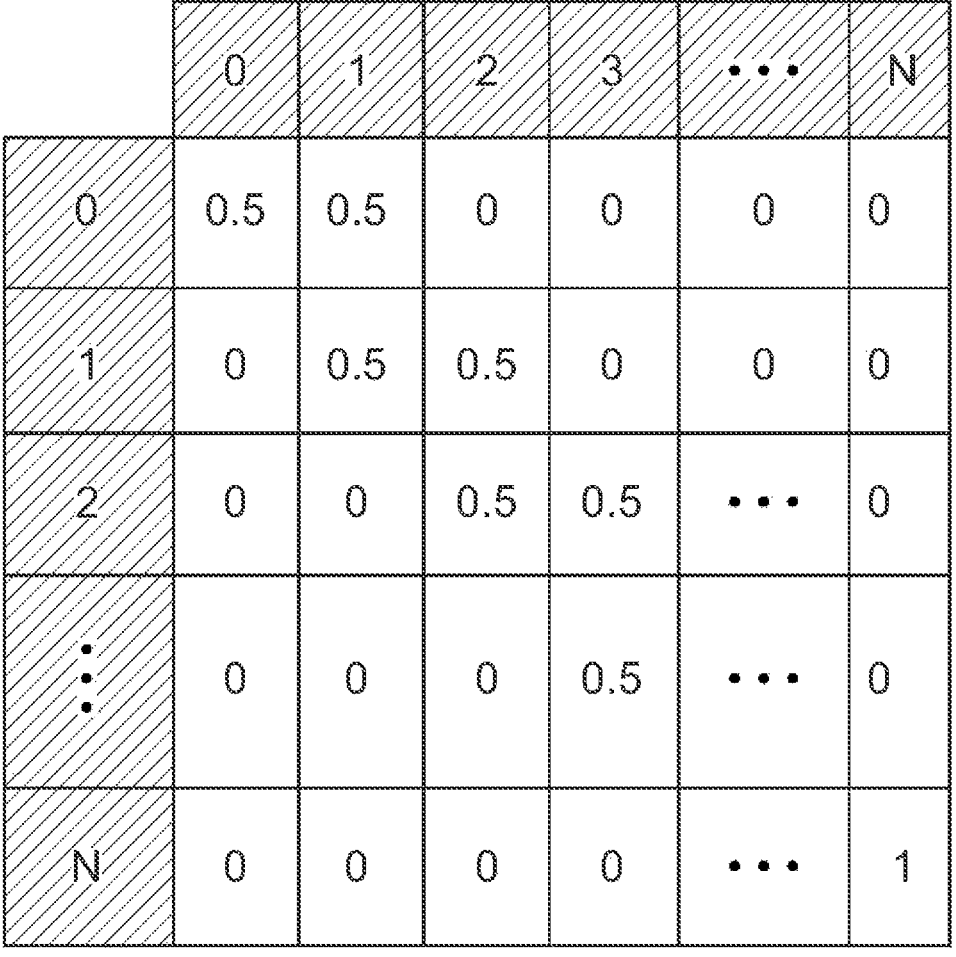
Figure 66:
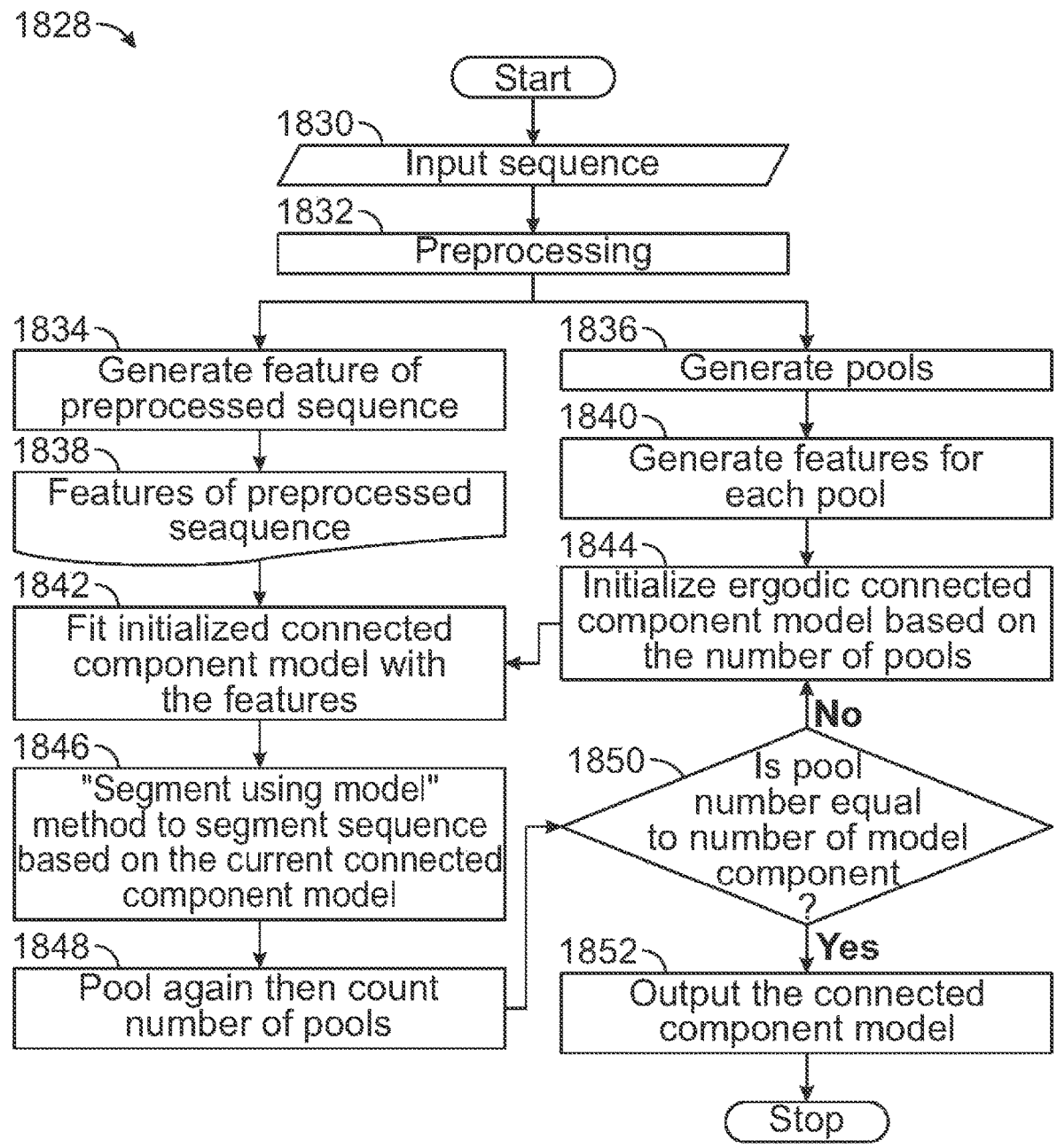
Figure 67:
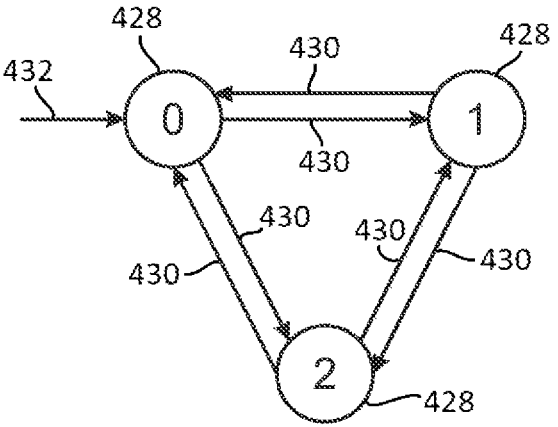

9 matic body movement recognition and association system in accordance with implementations of this disclosure;

FIG. 59 illustrates an exemplary similarity matrix example of the exemplary second embodiment of the automatic body movement recognition and association system in accordance with implementations of this disclosure;

FIG. 60 illustrates an exemplary dot similarity matrix example based on the similarity matrix example of FIG. 58 of the exemplary second embodiment of the automatic body movement recognition and association system in accordance with implementations of this disclosure;

FIG. 61 illustrates a flow diagram of an exemplary process for determining a pooling calculation of the exemplary second embodiment of the automatic body movement recognition and association system in accordance with implementations of this disclosure;

FIG. 62 illustrates a flow diagram of an exemplary process for determining a dynamic forward model of the exemplary second embodiment of the automatic body movement recognition and association system in accordance with implementations of this disclosure;

Figure 63:
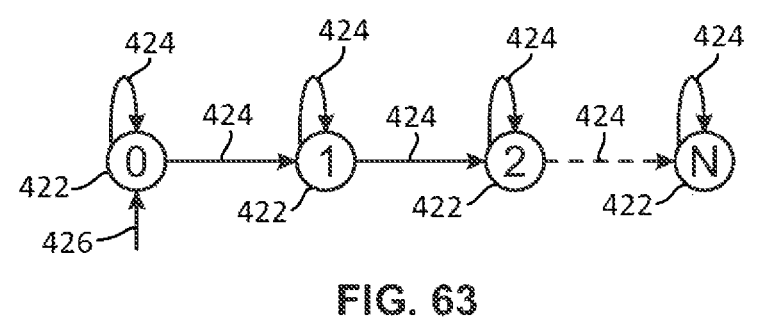

FIG. 63 illustrates an exemplary forward connected model initialization, each circle representing a segment component, of the exemplary second embodiment of the automatic body movement recognition and association system in accordance with implementations of this disclosure;

FIG. 64 illustrates an exemplary transition matrix initialization of the black arrows of FIG. 62 of the exemplary second embodiment of the automatic body movement recognition and association system in accordance with implementations of this disclosure;

FIG. 65 illustrates an exemplary initial vectors initialization of the green arrows of FIG. 62 of the exemplary second embodiment of the automatic body movement recognition and association system in accordance with implementations of this disclosure;

FIG. 66 illustrates a flow diagram of an exemplary process for determining a dynamic ergodic model of the exemplary second embodiment of the automatic body movement recognition and association system in accordance with implementations of this disclosure;

FIG. 67 illustrates an exemplary dynamic ergodic model initialization, each circle representing a pool component, of the exemplary second embodiment of the automatic body movement recognition and association system in accordance with implementations of this disclosure;

FIG. 68 illustrates an exemplary transition matrix initialization of the black arrows of FIG. 66 of the exemplary second embodiment of the automatic body movement recognition and association system in accordance with implementations of this disclosure; and FIG. 69 illustrates an exemplary initial vectors initialization of the green arrows of FIG. 66 of the exemplary second embodiment of the automatic body movement recognition and association system in accordance with implementations of this disclosure.

DETAILED DESCRIPTION

A first embodiment of an automatic body movement recognition and association system described herein provides real-time, or near real-time, body movement recognition and associates the body movements, or combination of body movements, into any number of meanings represented by the system in written or spoken words. The automatic body movement recognition and association system comprises a "live testing" component to produce text or speech associated with the movement and an "off-line training" component that continually updates a training data set to improve a learning system that is used in the "live testing" component. The automatic body movement recognition and association system of the first embodiment uses three dimensional skeletal data read from a stand-alone depth-sensing image capture device or depth-sensing camera to capture a person's body movements and then associates the body movements with any number of meanings, such as medical symptoms and/or conditions, sign language interpretation, psychological conditions, and human emotions for use in medical environments, military environments, school environments, etc., depending on the field of use.

The first embodiment of the automatic body movement recognition and association system of the present disclosure has the ability to recognize full body movement on different bodies and unify the full body movement across different customized movement dictionaries, while keeping all the processing in real time, maintaining high accuracy across a huge number of movement classes, and maintaining high accuracy with a very low number of samples per each movement class, such samples as low as ten samples per class. A second embodiment of an automatic body movement recognition and association system of the present disclosure can also perform various processes on the body movement data, such as smoothing, segmentation, similarity, pooling, and dynamic modeling, each process to be described below.

In an exemplary implementation, the first embodiment of the automatic body movement recognition and association system is used for translating sign language into written and spoken words in user/signer dependent and user/signer independent settings. The automatic body movement recognition and association system in this implementation uses three-dimensional skeletal data read from the stand-alone depth-sensing camera to capture sign language and then recognize the signs, associate the sign or combination of signs with a meaning, and produce written or spoken words associated with the sign or combination of signs.

One exemplary application of the first embodiment of the automatic body movement recognition and association system of the present disclosure involves translating sign language into written and spoken words. Sign language is used by hearing impaired people around the world. Hearing impaired children learn sign language as their first language from their environment in much the same manner as hearing children learn spoken language from their family and others. Currently, there is no standard sign language that is used throughout the world. Sign language differs from one country to another, forming many different sign languages such as American Sign Language, British Sign Language, and a wide range of Arabic Sign Languages. In the Arab world alone, there are several Arabic sign languages including Egyptian, Kuwaiti, and Jordanian sign languages. Standardized Arabic sign language does exist but is still not widely used. Further, the number of hearing people who are able to communicate in sign language is low when compared to the millions of hearing impaired people that need to communicate and interact with others in their day-to-day life activities. There exists a growing need to remove linguistics barriers facing hearing impaired people in their daily life.

Building a system that is able to automatically translate sign language into written and spoken words can help in removing the linguistic barriers facing the deaf community, especially in case of emergencies and in normal daily life situations. The first embodiment of the automatic body movement recognition and association system of the present disclosure can be implemented as a sign language translator system to automatically translate sign language into written and spoken words, thereby providing a system that aids in removing the linguistic barriers facing the deaf community, especially in case of emergencies and in normal daily life situations.

Signs in a sign language contain not only manual features, i.e., hand motion and shapes, but also non-manual features such as facial expressions. Like spoken languages, sign languages have thousands of signs which differ from each other by changes in hand motion, hand shapes, hand position, movement of the head, limbs, and torso, and the relative positions of the rest of the body movements with the hands. The automatic body movement recognition and association system of the first embodiment utilizes the relation between the sign language and the system to perform the body movement recognition. Most sign language recognition systems are vision based. The first embodiment of the automatic body movement recognition and association system of the present disclosure uses depth image cameras to acquire user depth data, such as the three dimensional locations of both manual, such as the user's hands and the user's hand shape, and non-manual features, such as head, limb, and torso movement, to automatically analyze and recognize the human skeleton detection data and to overcome the many challenges facing normal two dimensional color camera based translators.

Continuous body movement recognition can be achieved based on the assumption that body movements can be broken down into a subset of several smaller units called phonemes or chremes, which can then be segmented based on the change in the movement's direction or hand location relative to the camera and relative to the position of the rest of the body, taking into consideration noisy data, whether the body part is moving in one direction, and whether there are location points that are misleading due to error. In sign language, however, the transition between signs is not clearly marked because the signer's hands will be moving to the starting position of the next sign, which makes segmenting the signs by detecting the starting point and the ending point problematic. These movement epenthesis', which occur most commonly during the boundary between signs as the hands move from the posture required by the first sign to the posture required by the next, can be used to segment the signs or group of signs when detected in the three-dimensional data read from the depth camera. After the movements have been broken down into segments, the phonemes are processed using isolated sign language recognition.

Figure 1A:
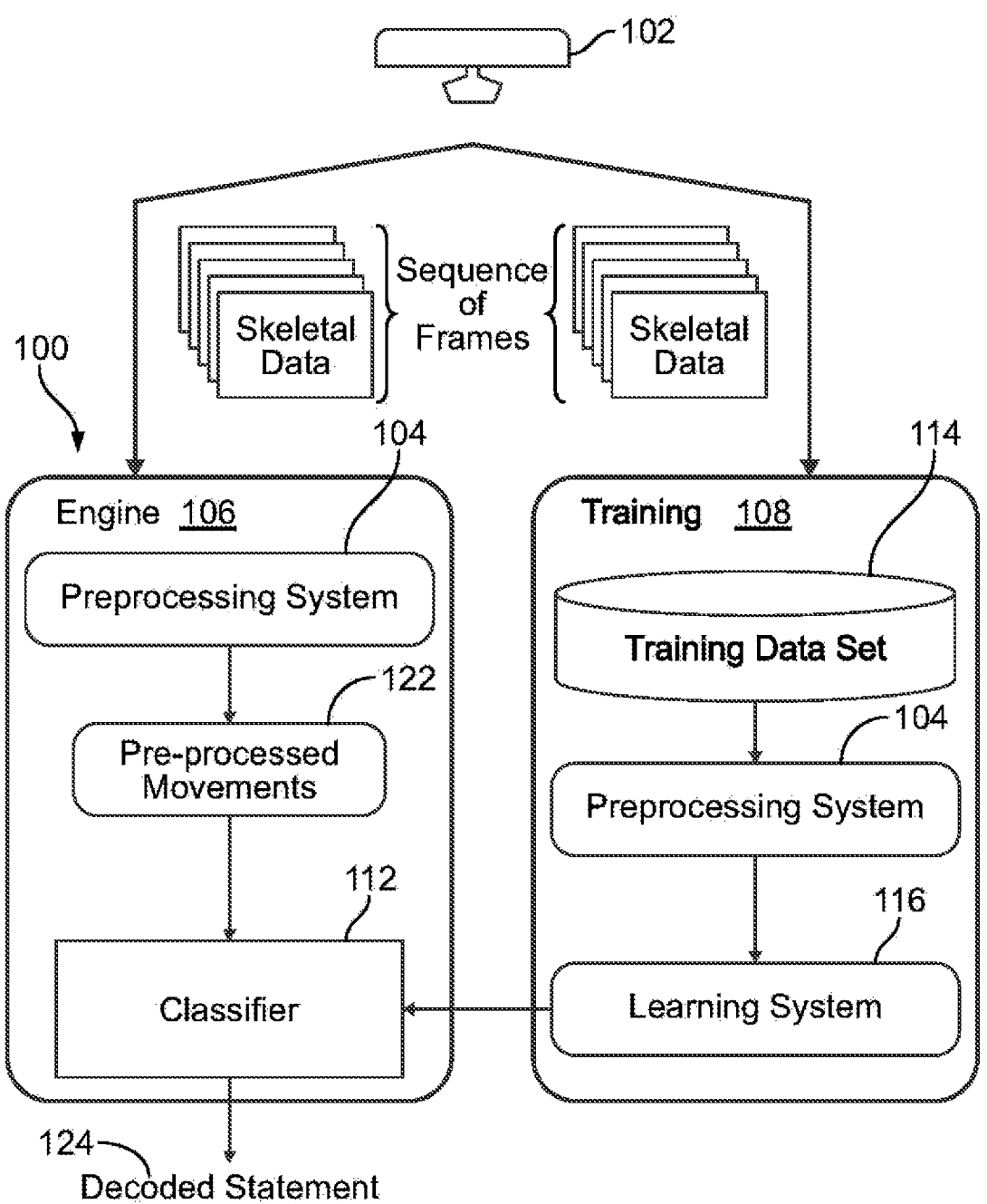
FIG. 1A illustrates a field implementation of an exemplary first embodiment of an automatic body movement recognition and association system in accordance with implementations of this disclosure, showing a "live testing" engine component, and a field implementation of an exemplary "off-line" training system.

FIG. 1A is a block diagram of a field implementation of a first embodiment of an automatic body movement recognition and association system 100 in accordance with implementations of this disclosure. The system 100 comprises a "live testing" engine component 106 that includes a preprocessing component 104 and a classifier component 112. The system 100 utilizes three dimensional (3D) skeletal data read from a stand-alone depth-sensing camera 102 that captures the 3D coordinates of skeletal joints in a sequence of frames. The system 100 processes the 3D data into a series of segmented movements 110 (FIG. 1B) that are then used by the classifier component 112 to produce text or speech.

Figure 1B:
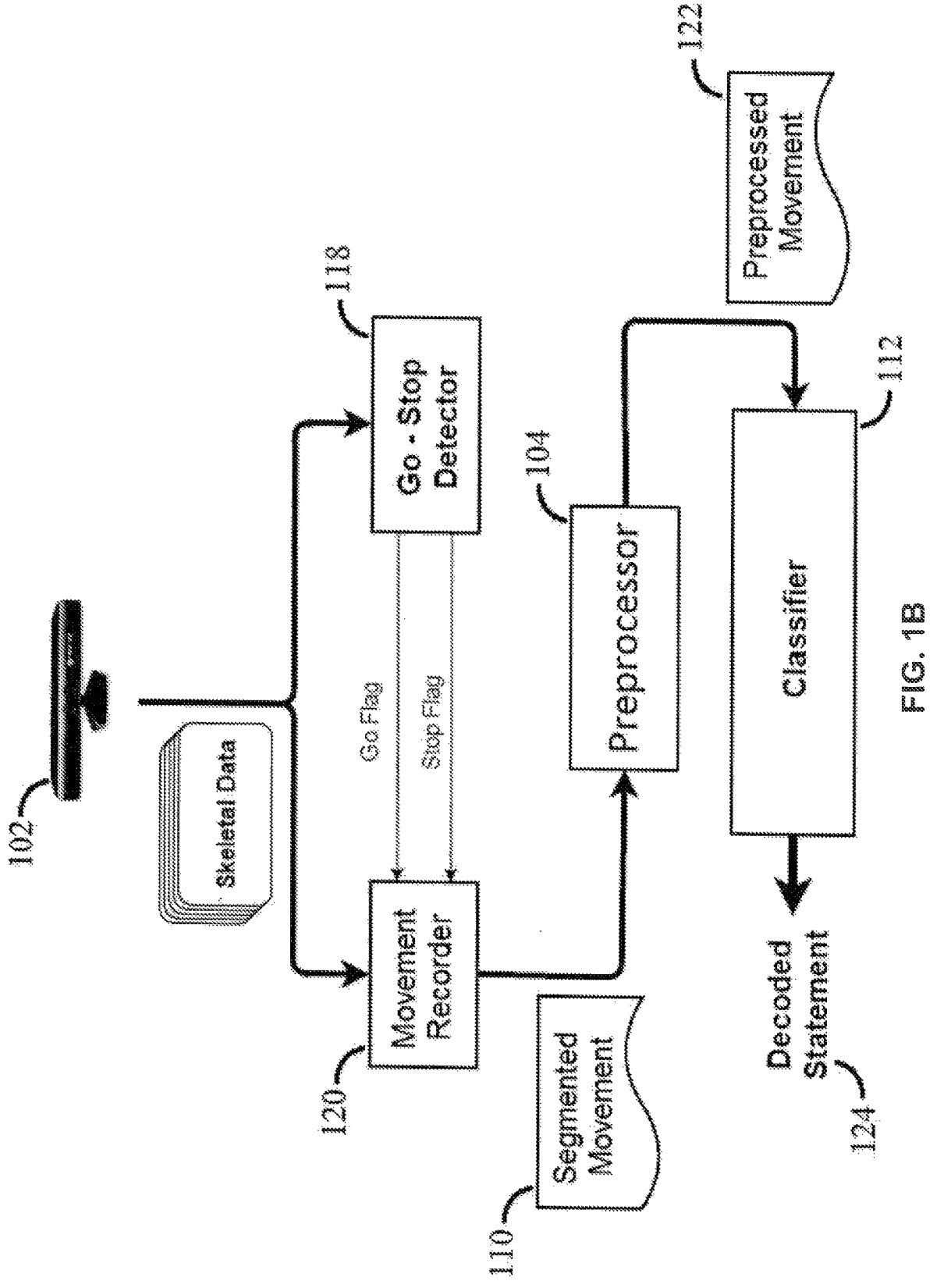
FIG. 1B illustrates a field implementation of the "live testing" engine component of the first embodiment of the automatic body movement recognition and association system in accordance with implementations of this disclosure.

FIG. 1B is a block diagram of a field implementation of the engine component 106 of the automatic body movement recognition and association system 100 of the first embodiment in accordance with implementations of this disclosure. The engine component 106 produces text or speech based on the segmented movements 110 processed by the preprocessing component 104 using the classifier component 112. The system 100 uses 3D body movement data read from the depth-sensing camera 102 from a user and then the preprocessing component 104 processes the 3D data based on a go-stop scheme to recognize segments of body movement. The go-stop scheme requires the user to add a transition posture or pose, such as putting his/her hands down, between each body movement in a body movement sequence. The transition posture detector module 118 processes the 3D data read from the depth-sensing camera 102 to detect the presence of the transition posture. The detection of the transition posture separates body movements in the body movement sequence and the movement recording module 120 stores the sequence of movements as segmented movements 110. The movement recording module 120 can be read only memory (ROM), random access memory (RAM) or any other suitable memory device. The preprocessor 104 processes the segmented movements 110 between the transition postures, described as an abstract below with reference to FIG. 5 and described in detail in FIGS. 8, 9, and 13, and provides the preprocessed movements 122, based on the segmented movements 110, to the classifier module 112 that associates the preprocessed movements 122, using a body movement recognition system algorithm, such as a Hidden Markov Model (HMM) in this exemplary implementation, to produce a decoded statement 124 as text or speech. Other body movement recognition system algorithms can be used instead of the Hidden Markov Model.

An "off-line" training system 108, shown in FIG. 1A, works independently from the system 100 to continually build a training data set 114 and improve a learning system 116 that can be used by the classifier component 112 in the engine component 106. The training system 108 comprises its own preprocessing component 104 that processes 3D data, the transition position detector 118, and the body movement recording module 120. The preprocessing component 104 processes data from the training data set 114 and/or processes 3D data that is read from the depth-sensing camera 102, as described below in relation to the engine component 106. The preprocessing component 104 continues to run "off-line" without any further interaction with the depth-sensing camera 102 when it is not receiving data from the depth-sensing camera 102. The training data set 114 includes a plurality of body movements, gestures, or signs that are stored in the training system 108. The training system 108 will continually test the body movement samples in the training data set 114 to determine if recognition and association accuracy can be improved. The training system 108 can also add additional body movements received as preprocessed movements from the preprocessing component 104 to the training data set 114. The training data set 114 is analyzed in the learning system 116 to determine whether the additional data in the training data set 114 improves accuracy. When the training data set 114 is determined to improve accuracy, the learning system 116 sends movement models, learning configurations, and learnings models to the classifier component 112 to improve the accuracy of the system 100.

FIG. 2 is a flow diagram showing a process 200 for recognizing body movement and associating the body movement with a meaning in the first embodiment in accordance with an implementation of this disclosure. The depth-sensing camera 102 captures data streams as a sequence of frames that include color frame and depth frame from which a skeleton stream is estimated. The skeleton stream contains 3D data about the main 20 human skeleton joints or points which comprise 3D coordinates of the location of each joint relative to the depth-sensing camera's 102 three main axes. The system 100 tracks the nearest human in front of the depth-sensing camera 102 that is at least one meter away from the depth-sensing camera 102 and reads the skeleton data 202 captured by the depth-sensing sensor camera 102.

The transition posture detector module 118 processes the 3D data, recognizing the different skeletal points and their relation to one another, to detect the presence of the transition posture 204, relying on measuring the speed and positions of the skeletal joints or points, and recognizing the different skeletal points and their positions relative to other skeletal points and positions in the 3D space. The transition posture detector module 118 analyzes the 3D data to determine if the 3D data contains the 3D coordinates of the skeletal points associated with the specific transition posture. The scheme used by the transition posture detector module 118 to determine the specific transition posture to be detected, indicating that the system receive data for processing, is configurable and depends on the intended application where the system will be utilized, whether it be a medical application, military application, psychology, sign language, or other application that needs to detect specific body movements. According to the application, the transition posture detector module 118 is programmed with the proper 3D coordinates of the skeletal points of interest of the desired transition posture and those 3D coordinates are used to compare to the 3D data.

Detecting the transition posture can be explained further using an example scheme for an exemplary sign language application. For explanation purposes, the exemplary sign language implementation of the system 100 calculates Rx, Ry, Rz, Lx, Ly, and Lz values based on the 3D skeleton joints data, where Rx is the horizontal difference between the user's right hand joint and hip center joint (RHx–HCx), Ry is the vertical difference between the user's right hand joint and hit center joint (RHy–HCy), Rz is the depth difference between the user's right hand joint and hip center joint (RHz–HCz), Lx is the horizontal difference between the user's left hand joint and hip center joint (LHx–HCx), Ly is the vertical difference between the user's left hand joint and hip center joint (LHy–HCy), and Lz is the depth difference between the user's left hand joint and hip center joint (LHz–HCz). When Rx and Lx are within a predetermined range, the user is determined to be in the default position, signifying the transition posture. When Rx and Lx are not within the predetermined range, the user is determined to be performing a sign.

The transition posture detector module 118 sends a start signal to the recording module 120 to begin recording 206 when movement commences from the transition posture, as shown in the transition from the go-stop posture in FIG. 4A to the body movement in FIG. 4B. The transition posture detector module 118 sends a stop signal to the recording module 120 to stop recording 208 when the user's hands have returned to the transition posture, as shown in the transition from the body movement in FIG. 4B to the transition posture in FIG. 4C, for a predetermined amount of time or for a predetermined amount of frames in order to account for noise. In this exemplary implementation, the transition posture must be validated, or present, for at least 90 msecs or at least three subsequent frames, otherwise the transition posture detector module 118 considers the position as a noisy measurement. The recorded segmented movement 110 comprises the raw skeleton data read from the depth-sensing camera 102 between transition postures.

Figure 5:
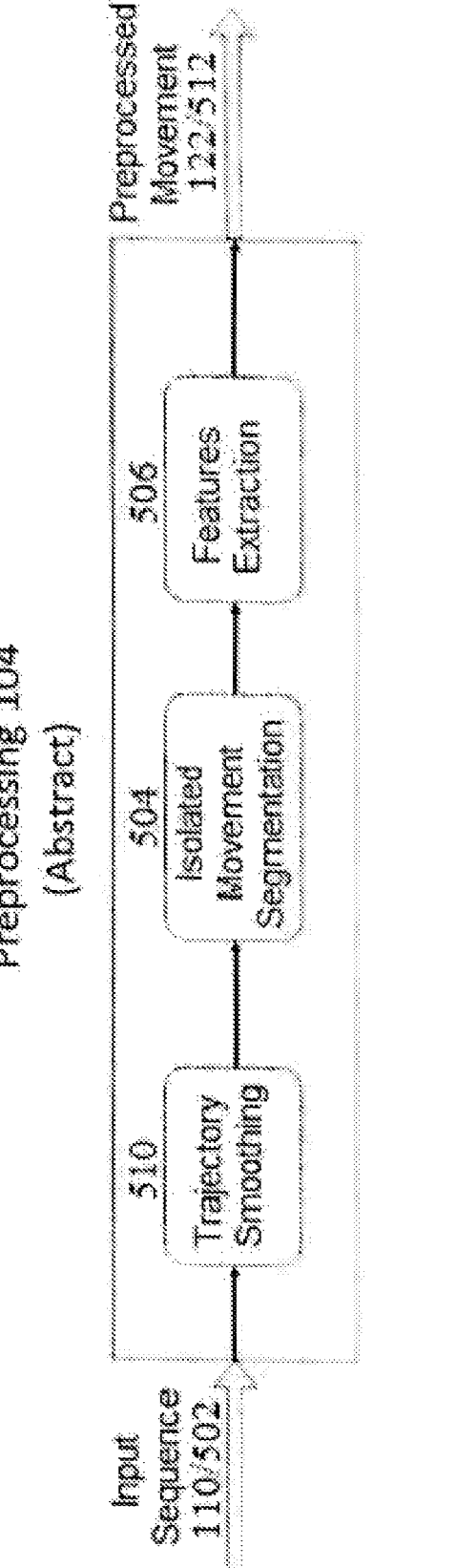
FIG. 5 illustrates an abstract block diagram of an preprocessing component used by the first embodiment of the automatic body movement recognition association system and the "off-line" training system in accordance with implementations of this disclosure.
Figure 9:
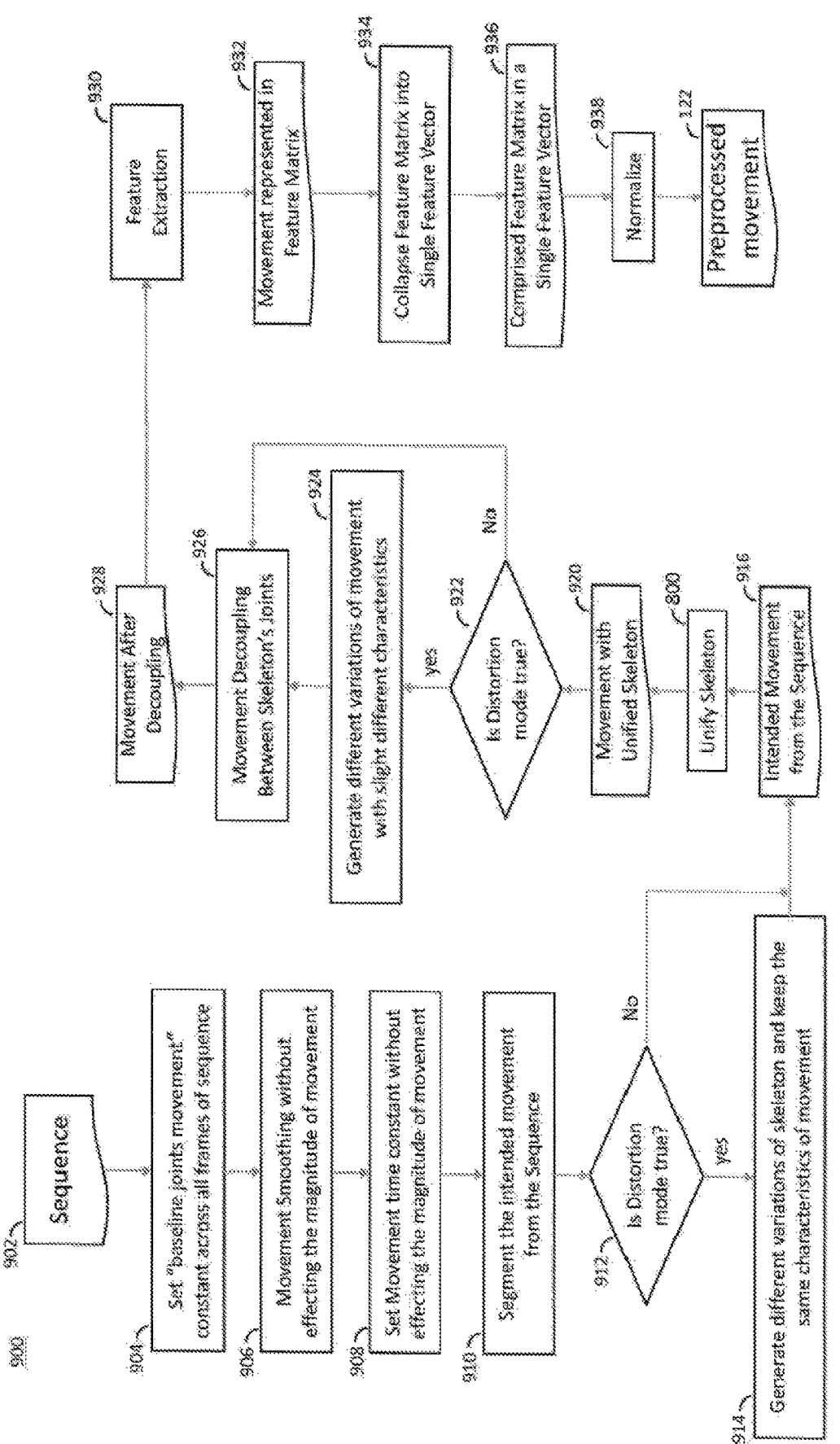
FIG. 9 illustrates a flow diagram of an exemplary process for preprocessing body movement data in accordance with an exemplary implementation of this disclosure.

Referring to FIG. 5, which is an abstract representation of the preprocessing component and which is shown in detail in FIG. 9, the preprocessing component 104 processes the segmented movement 110 in three consecutive steps that include relative positioning/feature extraction and low pass filtering to ensure distance invariance and to remove noise fluctuations 210. In this exemplary implementation, the preprocessing component 104 receives the segmented movement 110/502 and applies a low-pass filter 510, providing trajectory smoothing, on the samples to smooth the value of the samples. The preprocessing component 104 then identifies the isolated movement segmentation 504 from the smoothed segmented movement 110/502. The preprocessing component 104 processes the isolated movement segmentation 504 using feature extraction 506. The isolated movement segmentation 504 includes the positions, or locations, of the user's skeletal points relative to the depth-sensing camera 102 as a set of 3D coordinates. The locations of the user's skeletal points depend on the location in which the user is standing in front of the camera 102.

After feature extraction 506, the preprocessing component 104 sends the preprocessed sequence 122/512 to the classifier component 112 which then processes the preprocessed sequence 122 to identify the decoded statement 124 associated with the preprocessed sequence 122, such as the written or spoken word meaning of the sign or signs performed by the user. In this exemplary implementation, the classifier component 112 utilizes HMM for sign language recognition. In alternate embodiments, the classifier component 112 can use other vision-based sign language recognition systems, such as Parallel HMM, Context-Dependent HMM, and Product-HMM.

Figure 3:
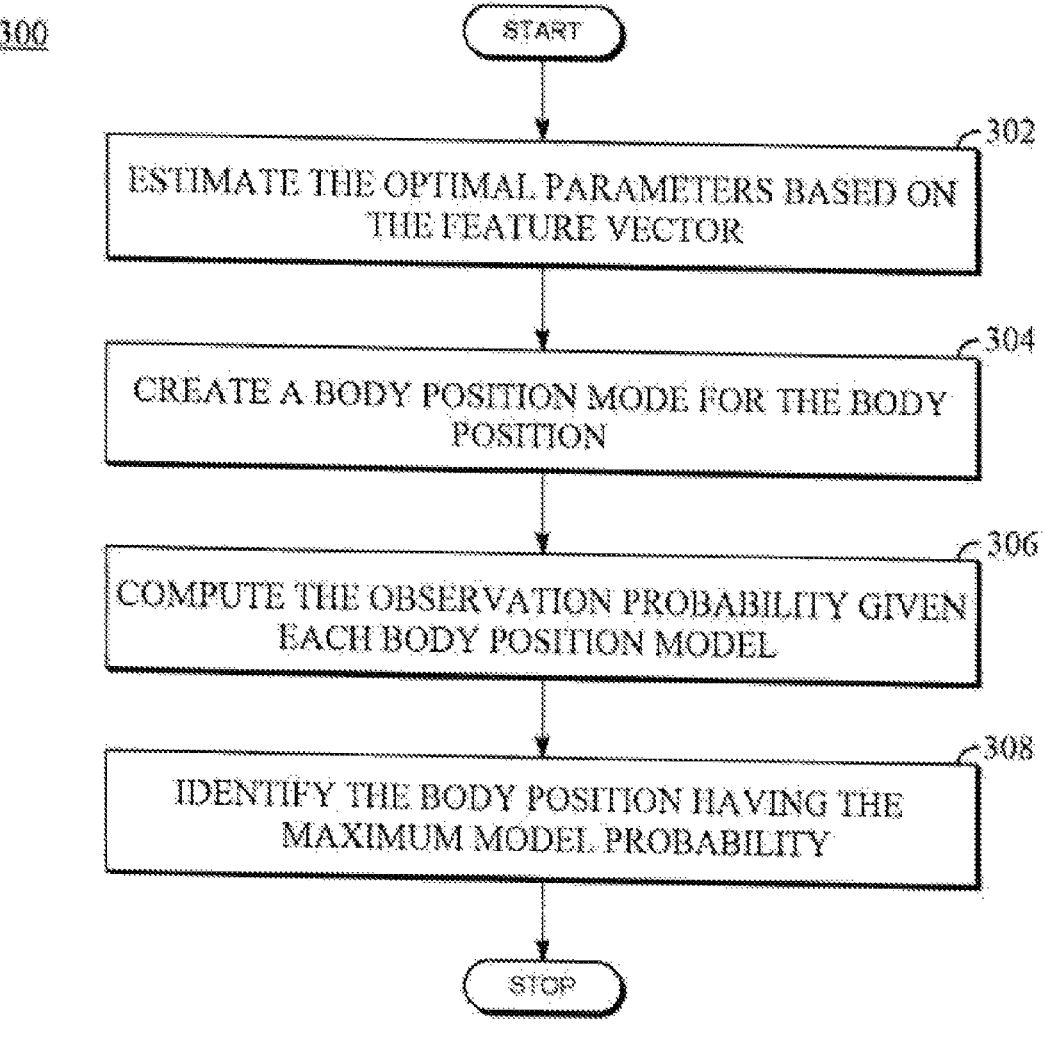
FIG. 3 illustrates a flow diagram for building an isolated body movement recognizer in the training component of the first embodiment of the automatic body movement recognition and association system in accordance with an exemplary implementation of this disclosure.

FIG. 3 is a flow diagram showing a process 300 for building an isolated body movement recognizer in the "off-line" training system 108 that can be used with the first embodiment of the automatic body movement recognition and association system in accordance with an exemplary implementation of this disclosure. A classifier component 112 can be built for a wide variety of body movements that are to be associated with words or meaning. For example, the body movements can be associated with the written or spoken words associated with the sign language movement captured by the depth camera 102. In this exemplary sign language implementation, the classifier component 112 uses a left-right HMI with no skip transitions, as shown in FIG. 6, to build an isolated sign language recognizer. The first step is to determine the number of hidden states. In this exemplary implementation, the system 100 works with eight hidden states empirically and uses continuous Gaussian emission probability distribution (Gaussian), in which each hidden state is a multivariate Gaussian with means and covariances that can be specified with the Baum-Welch learning algorithm, to govern the observation sequence generation. The system 100 trains a single HMI per sign using the Baum-Welch learning algorithm in the library. The system 100 utilizes a relatively large number of training samples, such as 30 samples per sign in this exemplary implementation, and uses Gaussian with a full covariance matrix for the six features in the feature vector (FV). After all HMMs have been trained, a new sample can be easily recognized by determining the start point and end points, segmenting the sign to be classified, identifying the FV, providing the FV to all HMMs, determining the probabilities P(FV) for each FV for all HMIs, and identifying the sign comprising the highest probability.

For explanation purposes, for example, a set of N signs to be recognized, a training set of M samples for each sign, and an independent test set are provided. In order to build the HMI classifier, an HMM for each sign in the vocabulary is built. The system 100 estimates the optimal parameters 302 based on the feature vector extracted from the preprocessing steps as observations from the set of M samples for each sign and creates a sign model $\lambda_i$ 304 for the ith vocabulary sign, from $1 \le i \le N$, using Baum-Welch training algorithm for parameter estimation and model creation. For each sample in the test set, described by the observation sequence built from preprocessed movement feature vectors $O=O_1, O_2, \ldots, O_T$ and for each sign model $\lambda_i$, compute the observation probability 306 given each sign model $P_i=(O|\lambda_i)$ using the forward-backward algorithm. Identify the sign having the maximum model probability 308, i.e., $i^*=\mathrm{argmax}[P_i]$ $1 \le i \le N$.

In an alternate embodiment, the system 100 can comprise two different classifier components, a classifier component 112 for one-handed signs and another classifier component 126 (not shown) for two-handed signs, thereby allowing the system 100 to switch between classifier component 112 and classifier component 126 based on an algorithm that classifies the body movement as either a one-handed movement or a two-handed movement to automate switching.

Figure 7:
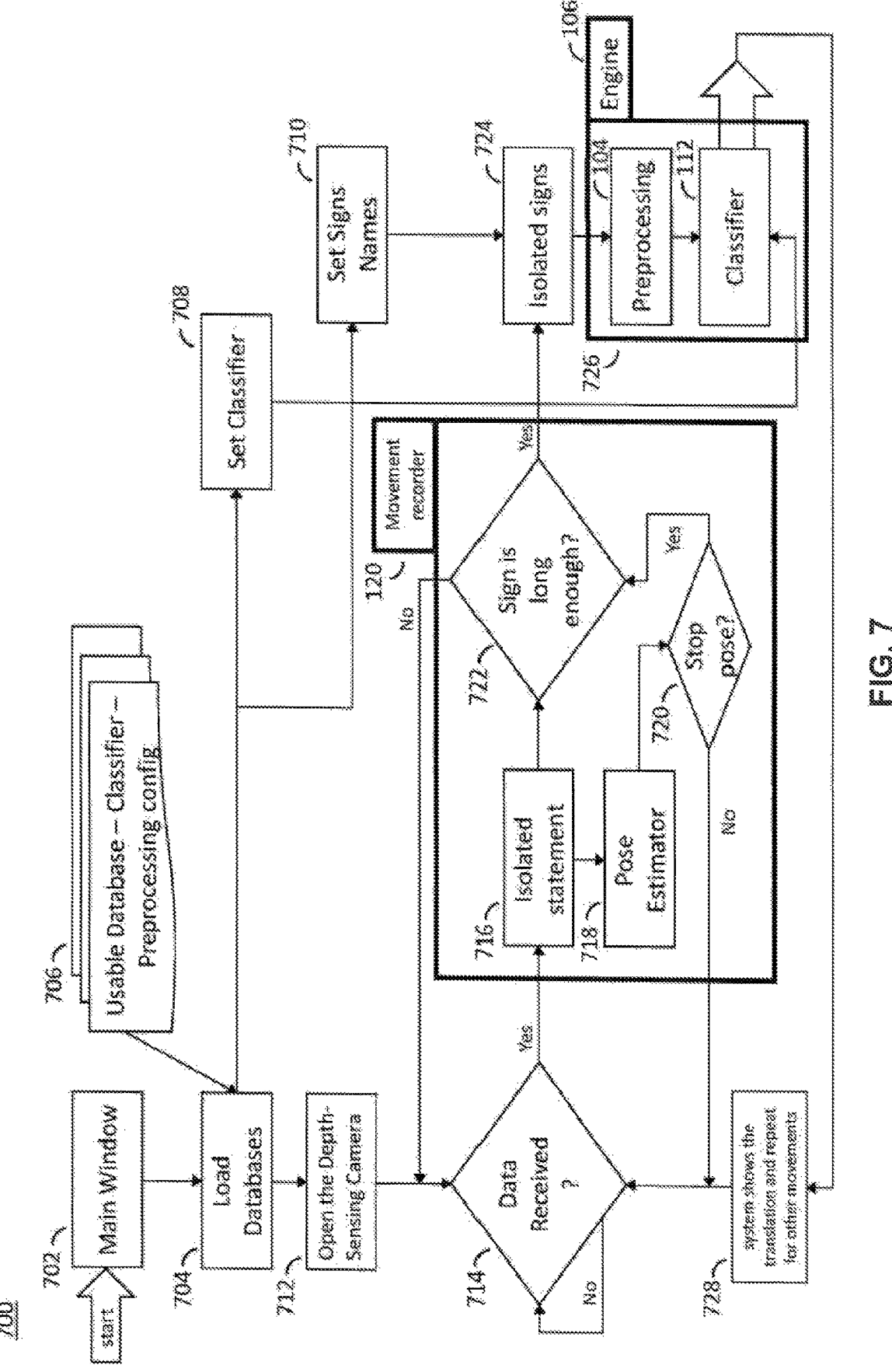
FIG. 7 illustrates a flow diagram of an exemplary process for recognizing body movement and associating the body movement with a meaning in accordance with an implementation of this disclosure.

An exemplary implementation of the "live testing" engine component 106 and the "off-line" training system 108 of the first embodiment are shown in FIGS. 7-12. FIG. 7 is a flow diagram showing an exemplary process 700 for recognizing body movement and associating the body movement with a meaning in accordance with an implementation of this disclosure. The process 700 begins by displaying a main window 702 that proceeds to load databases 704 using at least one of usable databases, classifiers, and/or preprocessing configurations 706. The classifier component 112 is set 708 based on at least one of the usable databases, classifiers, and/or preprocessing configurations 706. The body movement signs are assigned names 710 based on the information received when the databases are loaded 704 and based on at least one of the usable databases, classifiers, and/or preprocessing configurations 706. Once the databases are loaded 704, the depth-sensing camera 102 is opened 712 to receive body movement data. Step 714 identifies if data is received from the depth-sensing camera 102. If data is not received, process 700 loops back to step 714 to identify if data is received from the depth-sensing camera 102. When data is received in step 714, the data is sent to movement recording module 120 where the data is received as an isolated statement 716. The isolated statement is sent to the pose estimator 118 718. The pose estimator 118 identifies when the isolated statement contains the go-stop scheme 720. If the go-stop scheme is not detected in step 720, process 700 loops back to step 714 to identify if data is received from the depth-sensing camera 102. When the go-stop scheme is detected in step 720, the isolated statement is sent to step 722 that determines whether the isolated statement is long enough in length, duration, and/or frames 722. If the isolated statement is not long enough in step 722, process 700 loops back to step 714 to identify if data is received from the depth-sensing camera 102. When the isolated statement is long enough, the isolated statement and the names assigned to the body movement signs at step 710 are sent to step 724 that identifies isolated signs. The isolated signs are sent to engine 106 where the preprocessing component 104 processes the isolated signs into preprocessed movements 122. The preprocessed movements 122 are then sent to the classifier 112 that was set in step 708 to identify a word or set of words associated with the preprocessed movements 122. The system 100 shows the words, set of words, and/or translation 728 and then loops back to step 714.

Figure 8:
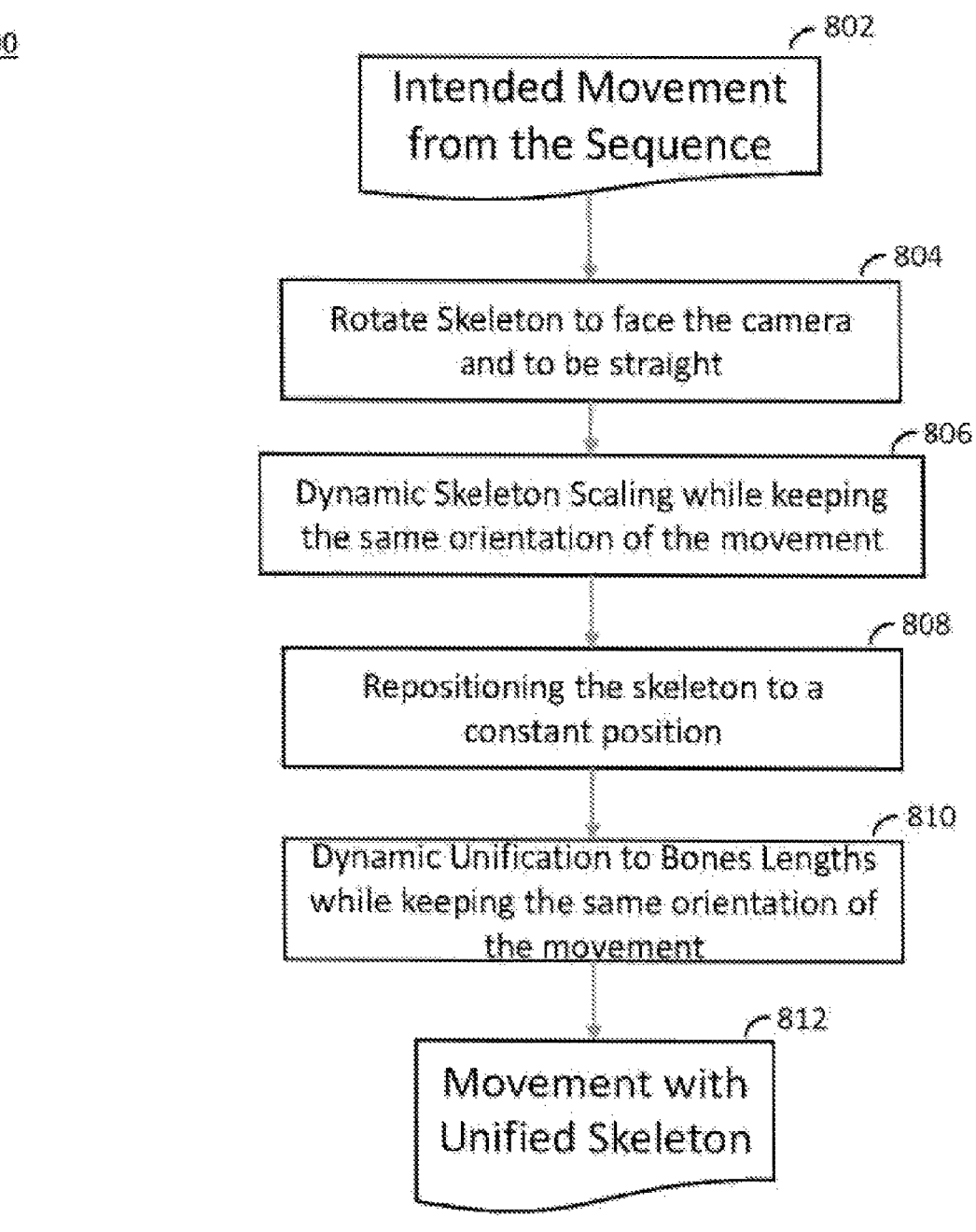
FIG. 8 illustrates a flow diagram of an exemplary process for preprocessing body movement data in accordance with an exemplary implementation of this disclosure.

FIGS. 8 and 9 are flow diagrams showing exemplary processes 800 and 900 for preprocessing body movement data in the first embodiment in accordance with an implementation of this disclosure. FIG. 8 is a flow diagram showing an exemplary process 800 for preprocessing data into movement with a unified skeleton. Process 800 removes variables, such as how far away a person is standing from the depth-sensing camera 102 and how a person is standing, whether the person is standing with their left side facing the depth-sensing camera 102, whether the person is standing with their right side facing the depth-sensing camera 102, and whether the person is standing facing the depth-sensing camera 102, thereby increasing the accuracy of the system 100 regardless of the orientation of the user by ensuring that the data all has the same orientation. Process 800 allows the system 100 to unify the movement over different skeleton and different positions to keep the accuracy at the same level with different positions and bodies for the user who performs the movement.

Process 800 begins by receiving an intended movement from a sequence of body motions 802 and rotating the skeleton data to face the depth-sensing camera 102 and be straight with the depth-sensing camera 102 804. Process 800 determines a dynamic skeleton scaling while keeping the same orientation of the intended movement 806 and repositions the skeleton to a constant position 808. Process 800 determines a dynamic unification to bones lengths while keeping the same orientation of the intended movement 810 to produce a movement with a unified skeleton 812. Process 800 is continually performed as new movement data is received.

FIG. 9 is a flow diagram showing an exemplary process 900 for preprocessing data into a preprocessed movement. Process 900 can be used to generate the preprocessed movement 122 used in the "live testing" engine component 106 and the "off-line" training system 108. Process 900 provides a plurality of samples from a single sample, thereby increasing the accuracy and stability of the classifier component 112, by repeating the preprocessing process at the training time of the classifier with the distortion mode on. Enabling the distortion mode allows the classifier to understand different variations of a certain movement. The distortion mode must be turned off in preprocessing when translating movements in the "live testing" engine component 106.

Process 900 begins by receiving sequence of movements 902 and setting "baseline joints movement" constant across all frames of the sequence 904. Process 900 performs movement smoothing without effecting the magnitude of the movement 906 and sets the movement time constant without effecting the magnitude of the movement 908. The magnitude of the movement includes all motion that occurs within the sequence that is being preprocessed. The intended movement is segmented from the sequence 910. Step 912 identifies whether the distortion mode is on or off. If the distortion mode is on, process 900 generates different variations of the skeleton while keeping the same characteristics of the movement 914, thereby generating more samples for the movement for various skeletons having various physical characteristics. If the distortion mode is off, or after different variations of the skeleton have been generated in step 914, the intended movement from the sequence 916 is processed to unify the skeleton 800, as shown in process 800 of FIG. 8. Process 900 then identifies the movement with the unified skeleton 920. Step 922 identifies whether the distortion mode is on or off. If the distortion mode is on, process 900 generates different variations of the movement with slightly different characteristics 924, thereby allowing some tolerance in case a movement is not performed exactly how it should be, such as where the hands are placed too high and/or too far away from the body. If the distortion mode is off, or after different variations of the movement have been generated in step 924, the movement is decoupled between the skeleton's joints 926, separating data between joints and distinguishing between joint movement and body part movement, producing a movement after decoupling 928. The decoupled movement 928 is then processed using feature extraction 930, explained in greater detail in FIG. 13, which produces a movement represented in a feature matrix 932. The feature matrix is collapsed into a single feature vector 934 where the feature matrix comprises a single feature vector 936. By providing a data point for each joint for each movement, collapsing the sequence of data points into one point on a feature space, and collapsing the sequence into a matrix having one row, makes the system 100 more accurate, reduces the training time of the system 100, and prevents performance reduction and speed reduction of the system 100. The single feature vector is then sent to a normalizer 938 that performs data steps to make features independent from each other and produces the preprocessed movement 122.

Figure 10:
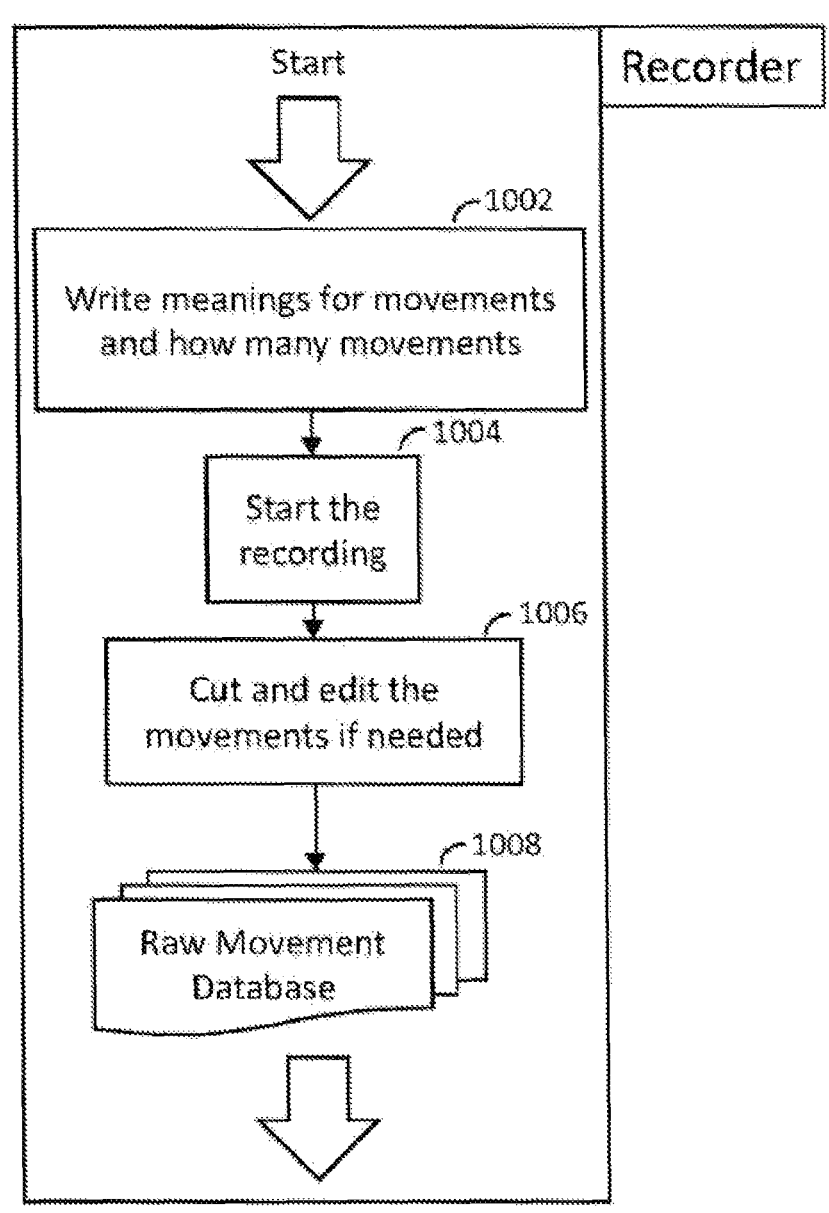
FIG. 10 illustrates a flow diagram of an exemplary process for building an isolated body movement recorder in the training component of the first embodiment of the automatic body movement recognition and association system in accordance with an exemplary implementation of this disclosure.
Figure 11:
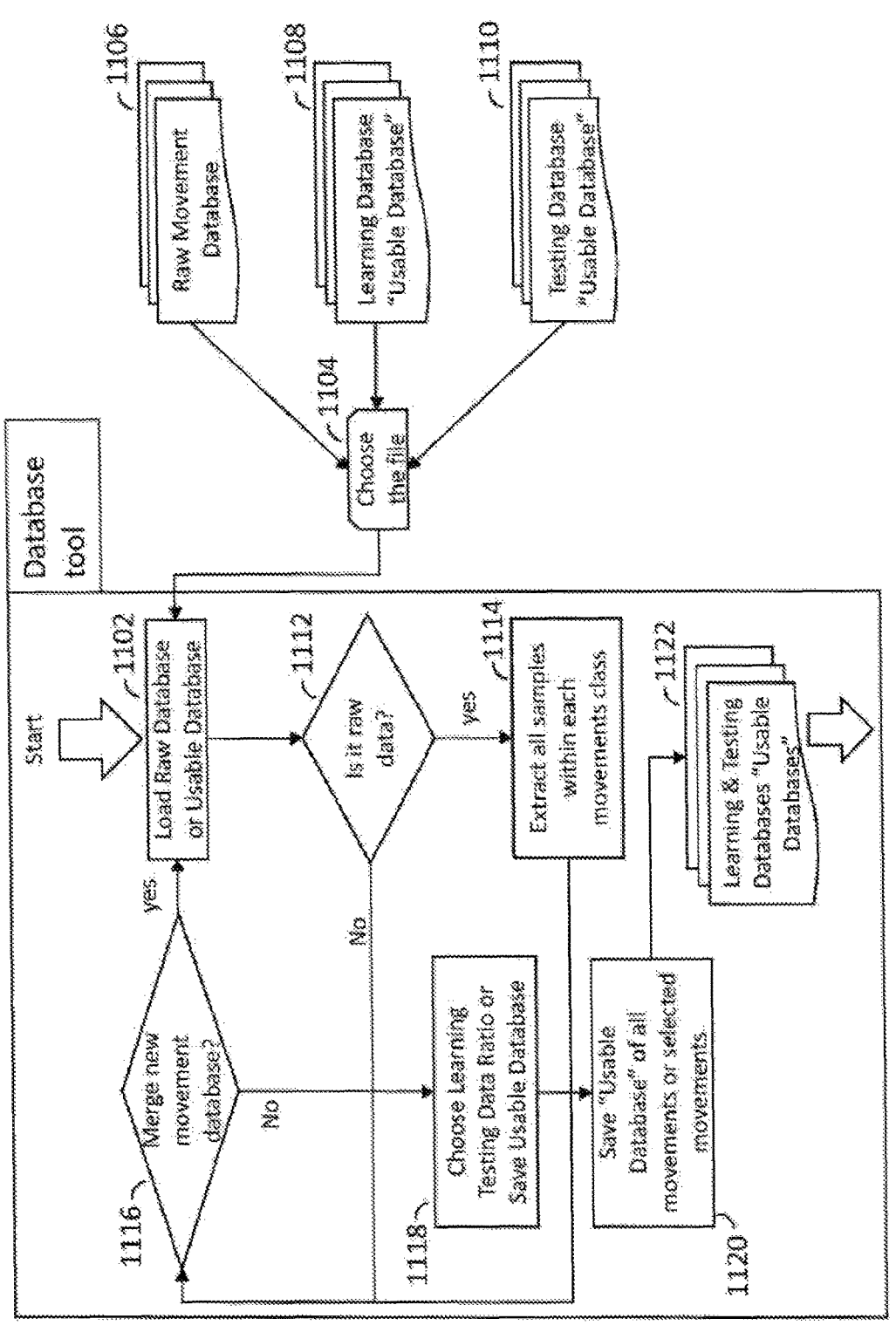
FIG. 11 illustrates a flow diagram of an exemplary database tool process in the training component of the first embodiment of the automatic body movement recognition and association system in accordance with an exemplary implementation of this disclosure.
Figure 12:
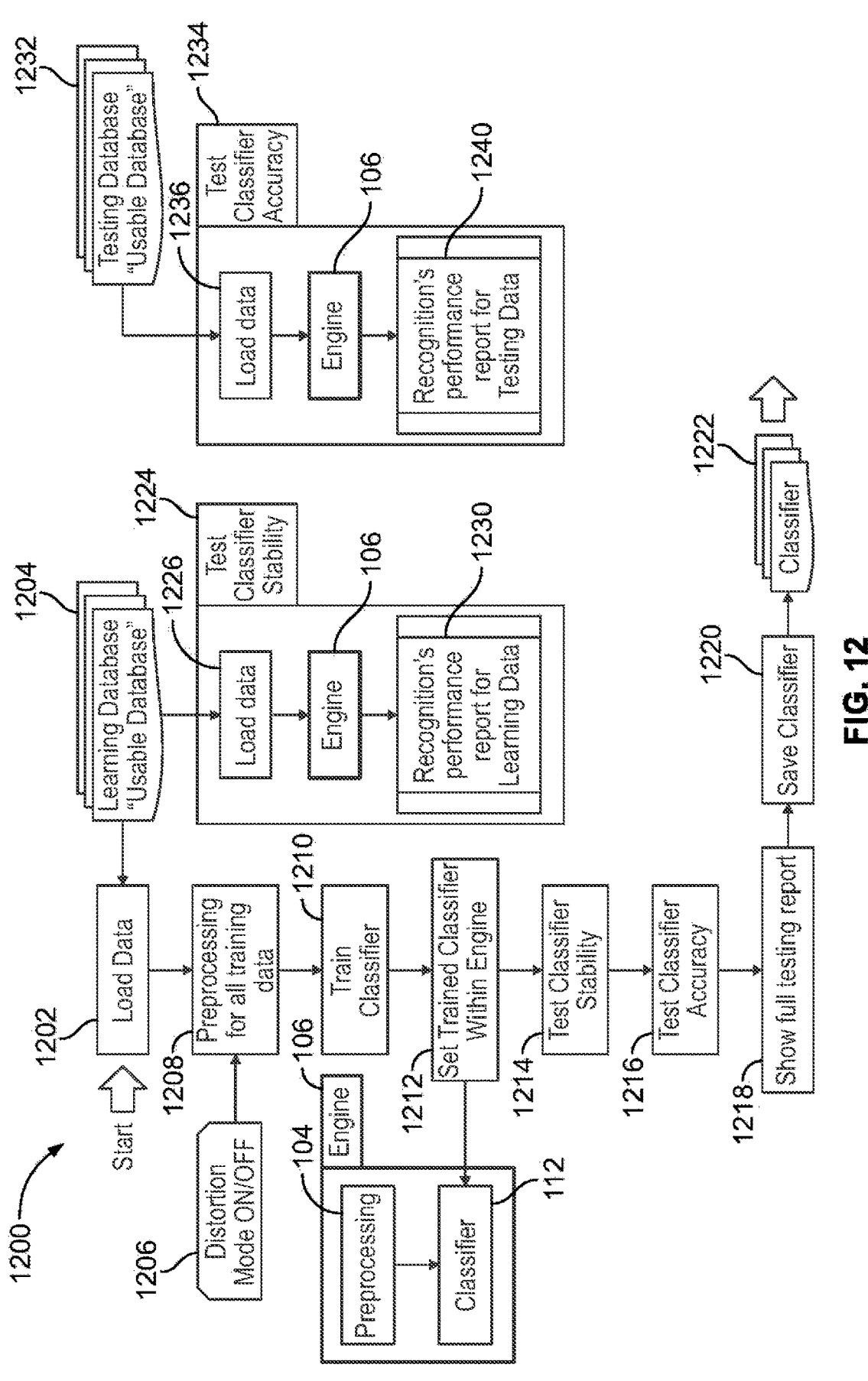
FIG. 12 illustrates a flow diagram of an exemplary process for building an isolated body movement recognizer in the training component of the first embodiment of the automatic body movement recognition and association system in accordance with an exemplary implementation of this disclosure.

FIGS. 10-12 are flow diagrams showing processes 1000, 1100, and 1200 for building an isolated body movement recorder, database tool process, and in the "off-line" training system 108 that can be used with the first embodiment of the automatic body movement recognition and association system in accordance with an exemplary implementation of this disclosure. FIG. 10 is a flow diagram showing an exemplary process 1000 for determining at least one raw movement database. There are a plurality of movement classes, where each class comprises at least one movement. Process 1000 begins by identifying the number of movements and the meanings for those movements 1002 and then starts the recording 1004. The movements are cut and edited if needed 1006, such as when the user makes a wrong move while performing a specific body movement and/or sign. The meanings for the movements, whether cut and edited or not, are then stored in at least one raw movement database 1008. Process 1000 is adapted to generate at least one raw movement data base.

FIG. 11 is a flow diagram showing an exemplary process 1100 for determining at least one usable database in the first embodiment of the automatic body movement recognition and association system in accordance with an exemplary implementation of this disclosure. Process 1100 begins by loading at least one of raw databases and/or usable databases 1102 by choosing the file 1104 from at least one raw movement database 1106, at least one learning usable database 1108, and at least one testing usable database 1110. Usable databases are those that can be sent to the preprocessing system 104 and the classifier component 112. Step 1112 identifies whether the data received in step 1102 is raw data. If the data is raw, process 1100 extracts all samples within each movement class 1114, wherein each movement class may include a plurality of samples. If the data is not raw, or after all samples within each movement class are extracted in step 1114, step 1116 determines whether to merge the new movement database with the currently loaded database to form a single database. If the new movement database is merged, the process 1100 loops back to step 1102. If the new movement database is not merged, process 1100 chooses the learning testing data ratio and/or saves the usable database 1118. Process 1100 then saves the usable database of all movements and/or selected movements 1120 and then identifies at least one of at least one learning usable database and at least one testing usable database 1122, which can then be sent to the preprocessing system 104 and/or the classifier component 112.

FIG. 12 is a flow diagram showing an exemplary process 1200 for determining at least one classifier. The process 1200 begins by loading databases 1202 using at least one learning usable database 1204. Process 1200 performs preprocessing for all training data 1208, the preprocessing taking into account whether the distortion mode is on or off 1206. The preprocessed training data is sent to a train classifier 1210 and the trained classifier is sent to the engine component 106 to set classifier component 112. Process 1200 continues to test the train classifier stability 1214 and test the train classifier accuracy 1214. A lookup table may be used to determine if a higher accuracy is available. A full testing report is generated 1218, based on the stability and accuracy, and the train classifier is saved 1220 to a group of at least one classifier 1222. The at least one usable database 1204 is also sent to test the classifier stability 1224 where the data is loaded 1226 and sent to the engine component 106. The test classifier stability 1224 generates a recognition performance report for the learning data 1230. At least one testing usable database 1232 is sent to test the classifier accuracy 1234 where the data is loaded 1236 and sent to the engine component 106. The test classifier accuracy 1234 generates a recognition performance report for the testing data 1240. The full testing report 1218 is based on at least one of the recognition performance reports for the learning data and the recognition performance report for the testing data.

FIG. 13 is a flow diagram showing an exemplary feature extraction process 1300 for preprocessing body movement data in the first embodiment. Process 1300 begins by taking the decoupled movement 928, shown in FIG. 9, to generate at least one set, wherein each set comprises four different skeleton joints for each frame within the data 1304. Tetrahedron shapes, such as the exemplary tetrahedron shape of FIG. 14, for each set of joints within each frame are generated 1306. Process 1300 calculates the angles between the planes within each of the tetrahedron shapes 1308 and calculates the direction of each tetrahedron shape 1310, as shown in the arrow in FIG. 14. Process 1300 combines the angles and directions generated from each frame into the feature matrix 1312, wherein each row represents a feature vector for a specific frame, and then identifies the movement represented in a feature matrix 932, as shown in FIG. 9.

For simplicity of explanation, process 200, process 300, and processes 700-1300 are depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

Applicant's patented 2D-3D technology delivers an unprecedented ability to automate the analysis and understanding of human activities and behaviors in real time. Deep learning algorithms and math algorithm libraries work to perform automatic segmentation, various comparative analytics, and/or recognition, to generate information about human activity and/or behaviors. By consuming human movement content within a video, video streams, camera, camera streams and/or sensors, the technology generates information from single movement sequences and/or between two or more body movements sequences.

Figure 15A:
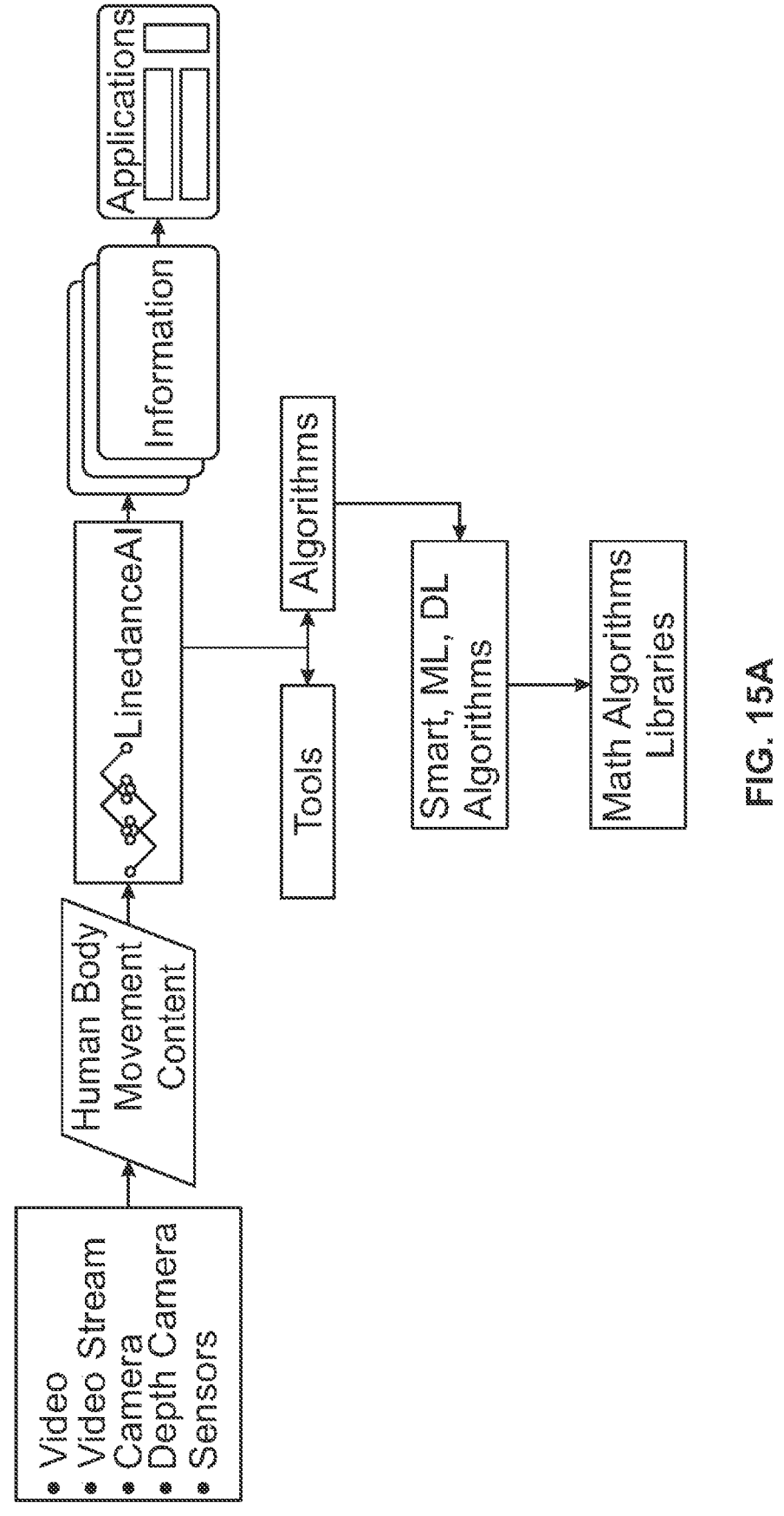
FIG. 15A illustrates a field implementation of an exemplary second embodiment of an automatic body movement recognition and association system in accordance with implementations of this disclosure.

The patented 2D-3D algorithms can be pipelined in various ways, shown in FIG. 15A, to generate information for market segments concerned with complex human activities and/or behaviors, including, but not limited to, applications in physical security and video analytics (FIG. 15B), manufacturing and workplace safety (FIG. 15C), sport performance (FIG. 15D), and/or healthcare applications (FIG. 15E) concerned with physical therapy and/or assessing neurological disorders manifesting outwardly in irregular body movement such as with Autism Spectrum Disorder, Parkinson's, Dystonia, and Motor Stereotypies.

Data inputs for Applicant's patented 2D-3D algorithms are human joints offering a precise and accurate location of body movement. The math and algorithm libraries that run in the cloud or edge environment process the relationship of joint movement in real time. The technology stack design is inherently agnostic to both the pose estimator and the vision hardware or type of sensor (wearable or depth sensing sensors). Data outputs are represented by recognition, association, and/or analysis of a human body movement or human body movement sequences as directed by the use case.

Figure 15B:
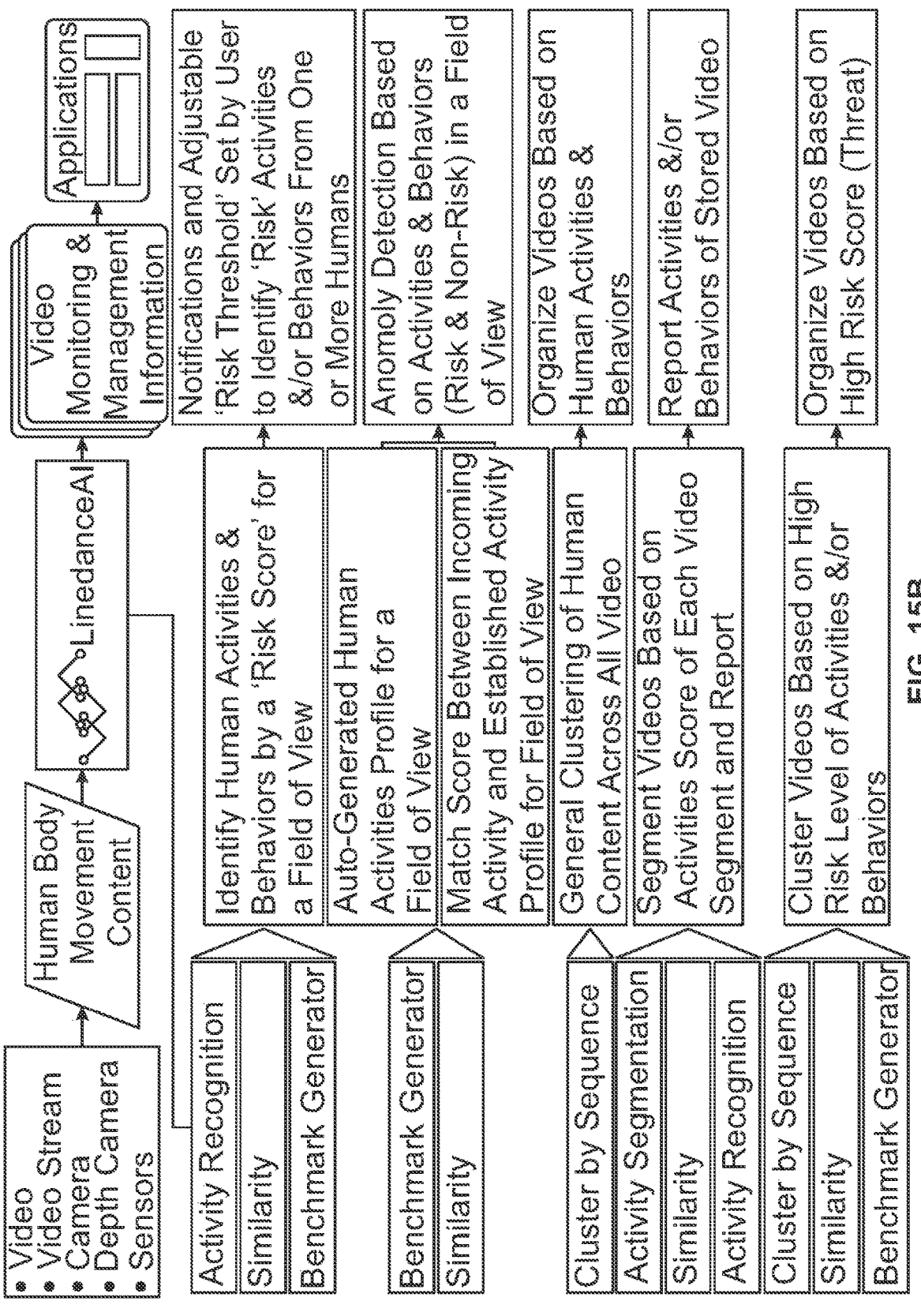
FIG. 15B illustrates a field implementation of the exemplary second embodiment of the automatic body movement recognition and association system used in video monitoring and management applications in accordance with implementations of this disclosure.

Referring to FIG. 15B, to reduce false alerts to video monitoring operators, a notification system may be developed in a physical security operating center to automatically recognize complex human activities and behaviors and associating these activities and behaviors with known criminal or anxiety-based body movement signatures that represent a threshold of probability for a risk event.

A learning system for a video surveillance camera generates a "human activity profile" whereby the pipeline of algorithms automatically learn human activities relevant to that camera's field of view.

A clustering solution for video management identifies and segments human activities and behaviors that may be anomalous to a "Profile" field of view. The video clustering solution organizes video data by any activity and behavior regardless of their probability as a threat or risk. Reporting and organizing non-threat activities and behaviors improves internal operations of the building, open space or corridor, and may drive new insights for decisions around improving public signage or communications.

Figure 15C:
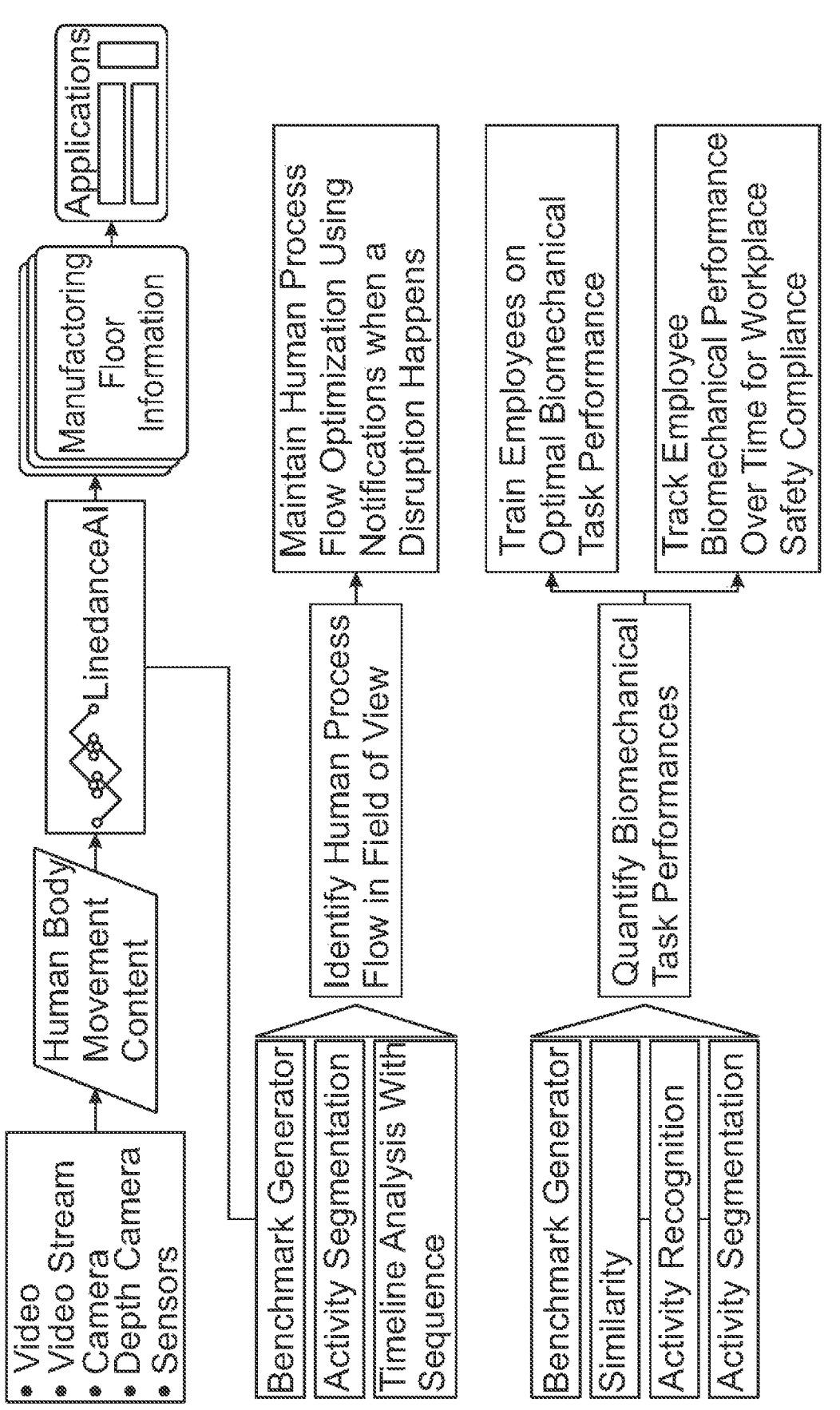
FIG. 15C illustrates a field implementation of the exemplary second embodiment of the automatic body movement recognition and association system used in manufacturing floor applications in accordance with implementations of this disclosure.

Workplace safety applications in manufacturing environments are enhanced using Applicant's technology, shown in FIG. 15C, to analyze a human activity process and proper biomechanical positions and movements to perform tasks. For example, in a logistics and/or transportation/freight floor environment, the floor is designated for people and mechanical processes to move in a way that optimizes time, cost, and human safety. Using Applicant's technology automatically identifies human activity anomalies impacting optimization or information related to precise biomechanical task performance.

Figure 15D:
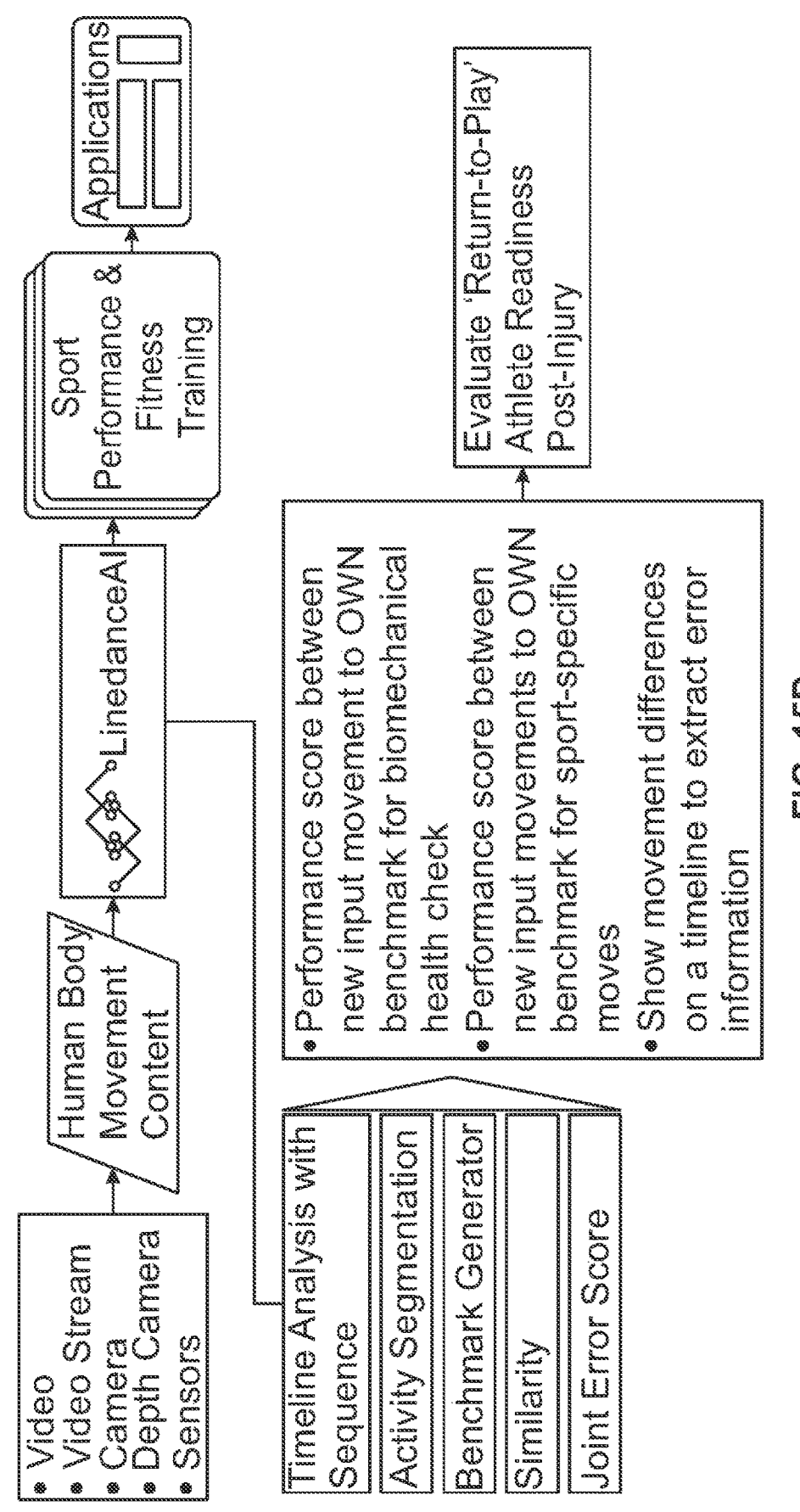
FIG. 15D illustrates a field implementation of the exemplary second embodiment of the automatic body movement recognition and association system used in sports performance and fitness training applications in accordance with implementations of this disclosure.
Figure 15E:
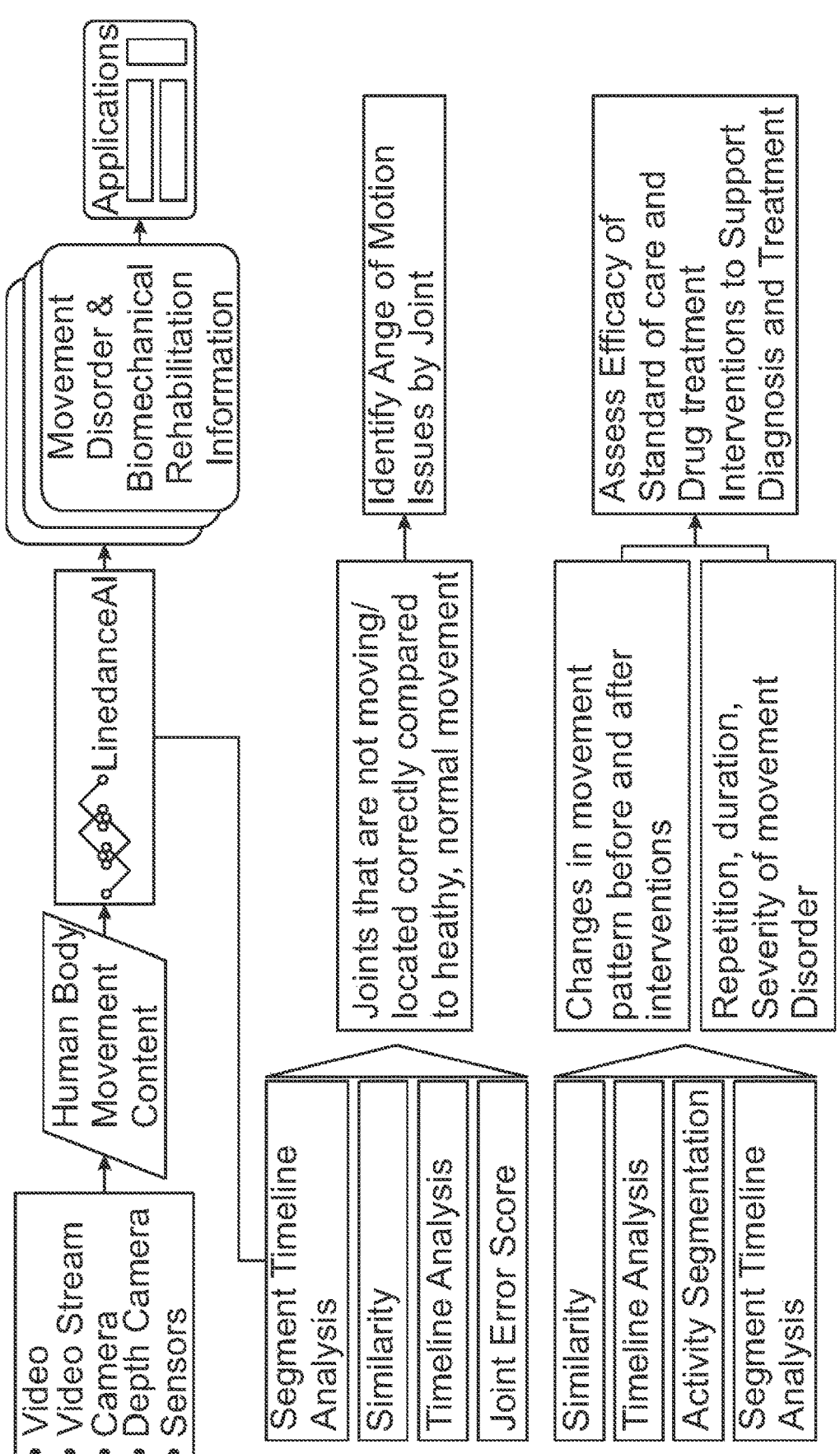
FIG. 15E illustrates a field implementation of the exemplary second embodiment of the automatic body movement recognition and association system used in healthcare applications in accordance with implementations of this disclosure.

Referring to FIG. 15D, human body movement is the most essential manifestation of performance for athletes and people doing exercises for fitness maintenance and/or improvement. Coaches and trainers' job is to evaluate training performance to reach athletic and fitness goals. Coaches and trainers can now be empowered with quantifiable measurements using Applicant's algorithms, for example in post-injury "return to play" decisions based on their current movement performance compared to their pre-injury performance. Furthermore, athletes can measure their movement style compared to another athlete of interest and understand precise differences in patterns between their performances.

On the other hand, doing personal exercise can be harmful when the exercise is not performed correctly, i.e., one or more body joints are not positioned correctly while doing the exercise, the movement associated with the exercise is not performed correctly, or even some range-of-motion movement of the joint is different compared to the correct way of doing the exercise. Applicant's algorithms are providing quantifiable measures to identify similarities between two or more components, identify movement segments which have been neglected or unnecessarily added compared to the "correct way" of performing a specific movement, and identify similarity to illustrate "closeness" of movement data compared to a benchmark or "correct way" of performing the specific movement.

Referring to FIGS. 15-68, a second embodiment of an automatic body movement recognition and association system can perform several processes on two dimensional and/or three-dimensional body movement data received from a stand-alone depth-sensing image capture device, sensor, wearable sensor, video, video streams, and/or the like. The second embodiment of the automatic body movement recognition and association system includes a smoothing process 1400, a segmentation process 1500, a similarity process 1600, a pooling process 1700, and a dynamic modeling process 1800.

Referring to FIGS. 15-33, smoothing is one of the preprocessing algorithms that smooths out errors in the body joints tracking data. Body joints tracking data may have noise or errors due to a lot of factors. The main purpose of any smoothing method and/or algorithm is to remove noise from sequential data without over smoothing the data to the point that important information could be lost in the smoothing process.

Smoothing algorithms of the prior art, like simple and weighted moving averages, can perform smoothing on sequential data. But they always require setting parameters and configurations beforehand as window size and weights' function to perform a specific smoothing with certain properties. These parameters and configurations need to be changed manually if the desired smoothing properties have changed or the curve properties have changed. In addition, these smoothing algorithms are very sensitive to high value noise which could dramatically reduce the performance of removing noise while keeping important information intact regardless of which configurations you are using.

Figure 25:
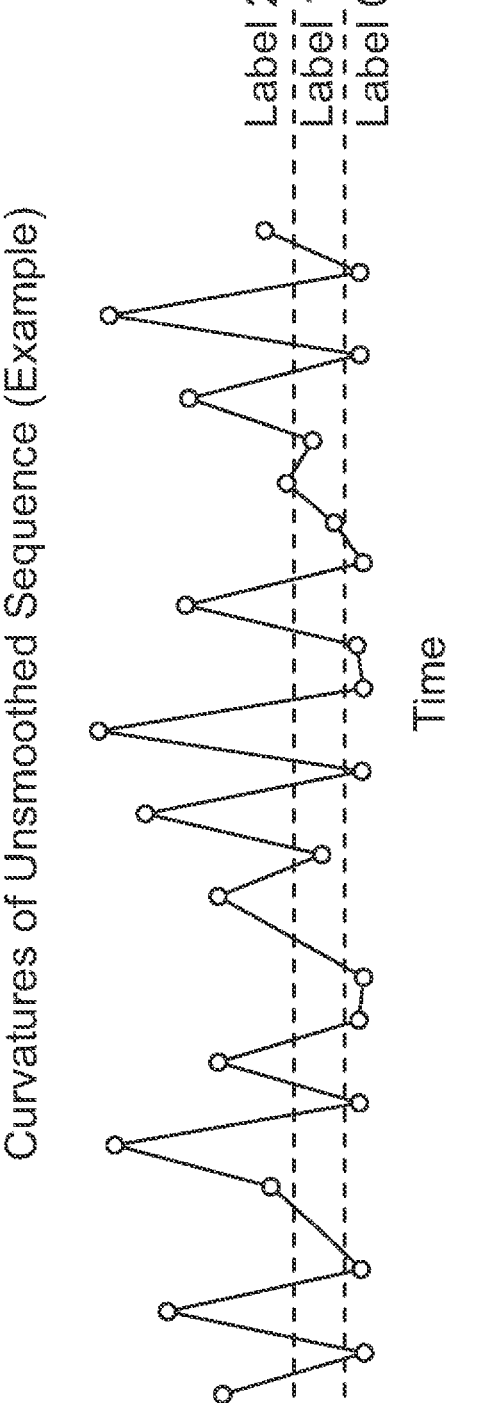
FIG. 25 illustrates an exemplary graph of curvatures of unsmoothed sequence with respect to time of the exemplary second embodiment of the automatic body movement recognition and association system in accordance with implementations of this disclosure.

Unlike those types of algorithms of the prior art, Applicant's smoothing process can detect the configuration of the smoothing automatically based on automatically identifiable sequential data properties and is not sensitive towards high value noise. Applicant's smoothing method considers how sequential data's curves across time are supposed to look like, then automatically searches through the sequential data for these properties. One of the properties is that smoothed curves usually doesn't change from one time frame to next time frame with a big rate of change but in a more consistent local rate of change by considering some time frames ahead and before the current frame. Applicant's smoothing process comprises a process to detect if this property holds before the smoothing starts to ensure if the sequential data is in need of smoothing or not using the "Sequence Contains Errors" process. This step is crucial because it is the main decision point that can stop smoothing and allow it to reach convergence when no error is detected. Applicant's smoothing process also considers other properties, such as the curve curvature. Smoothed curves usually have a specific curvature pattern that is valid mathematically to all multidimensional time series data regardless of the type of sequential data. Since straight or near straight sections of any curve usually have a very low curvature value, while curved sections have a higher curvature value, smoothed curves move from low curvatures to medium curvatures then to high curvatures at inflection points, if any. Unsmoothed curves don't not hold this property, as shown in FIG. 25. "Truth Model" creation is a method to find this pattern within unsmoothed curves. The method is scoring the goodness of frames with respect to this property i.e., low score identifies frames which are considered as noise and high score identifies frames which are holding correct information not noise information. Hence, Applicant's smoothing process can use the scores as smoothing parameters which are detected automatically from sequential data. For "Truth Model" creation to be able to do that job, it requires a specific initialization for the component and the probability of the connections between those components, as shown in FIGS. 19-23.

Figures 19, 20, 21:
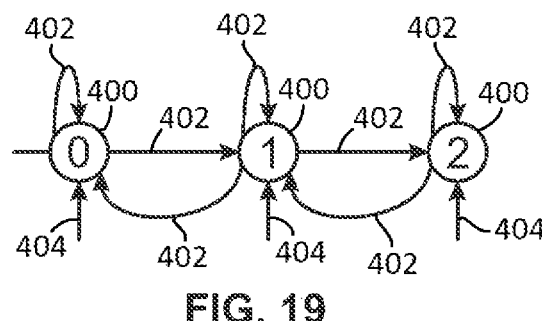
FIG. 19 illustrates an exemplary truth model, each circle representing a curvature component, of the exemplary second embodiment of the automatic body movement recognition and association system in accordance with implementations of this disclosure.
FIG. 20 illustrates an exemplary transition matrix initialization of the black arrows of FIG. 18 of the exemplary second embodiment of the automatic body movement recognition and association system in accordance with implementations of this disclosure.
FIG. 21 illustrates an exemplary initial vectors initialization of the green arrows of FIG. 18 of the exemplary second embodiment of the automatic body movement recognition and association system in accordance with implementations of this disclosure.
Figure 23:
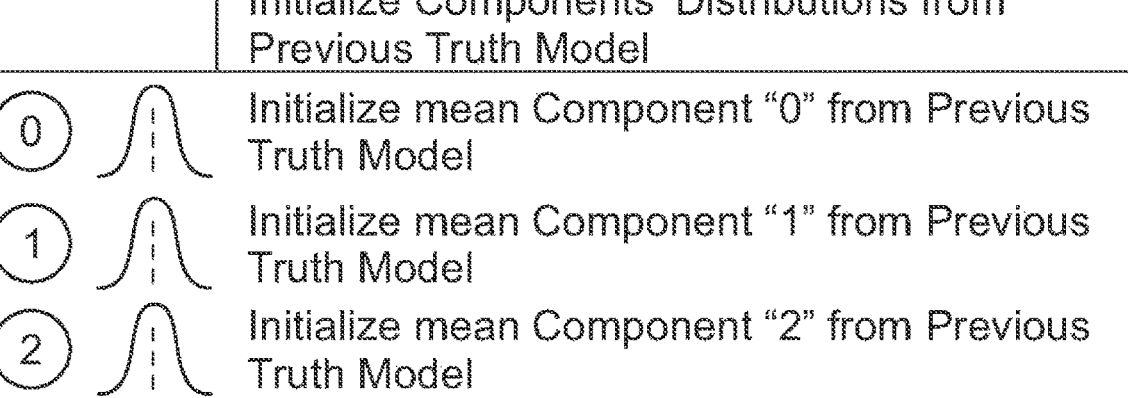
FIG. 23 illustrates an exemplary initialization of the curvature components (FIG. 18) distributions from a previous truth model of the exemplary second embodiment of the automatic body movement recognition and association system in accordance with implementations of this disclosure.

For truth model initialization, for example, each circle 400 in FIG. 19 represents a curvature component. The numbers within the circles 400 represent a label for each component and have a mathematical significance. In this exemplary illustrated implementation, the number zero represents very low curvature, the number one represents medium curvature, and the number two represents maximum curvature. Arrows 402 each represent a transition from one component to another. Arrows 404 each represent the starting component. Arrows 402 and arrows 404 each comprise a probability that describes how probable a certain function is. Arrows 402 probabilities initialization is described in a transition matrix. Arrows 404 initialization is described in an initials vector. Each component is described using normal distribution. The component's distributions are the only things being initialized within the truth model from a previous truth model if available.

Figures 33, 34:
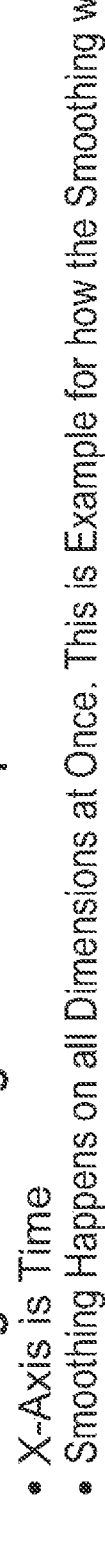
FIG. 33 illustrates an exemplary smoothing on one sequence dimensions, showing the data prior to smoothing in blue and the data after smoothing in red, of the exemplary second embodiment of the automatic body movement recognition and association system in accordance with implementations of this disclosure.
FIG. 34 illustrates an exemplary smoothing on one sequence dimensions, showing the data prior to smoothing in blue and the data after smoothing in red, of the exemplary second embodiment of the automatic body movement recognition and association system in accordance with implementations of this disclosure.

This initialization is the initial truth model architecture that holds how the property is supposed to be mapped regardless of the sequential data shape, then a fitting process identifies the exact component distributions and connection probabilities that match this sequential data specifically. Scoring is calculated from the component distributions, first decoding the sequence by labeling each frame to a certain component considering the maximum likelihood between frame and component and the probability of transitioning from one component to another to generate a truth map for all the sequential data frames. Then the cumulative distribution function (CDF) is calculated for each frame with respect to its component and then this CDF is between 0.316 and 1, which allows us to preserve 68.2% of data curvature at specific locations that belong to that component, as shown in FIGS. 27-30. Using these scores for each prospective frame allow the algorithm to be insensitive to the high value noise as scores are calculated for each frame, i.e., not one score for the frames. The scores are used to run one smoothing iteration as described in FIG. 26. The errors are calculated again to check whether to run another iteration of building a new truth model for the smoothed sequential data or not. When the algorithm converges, no errors are detected. A very fine-tuned smoothing process is performed using a weighted moving average with minimum window sizes as a final step. An exemplary result is shown in FIGS. 33-34.

Figure 16:
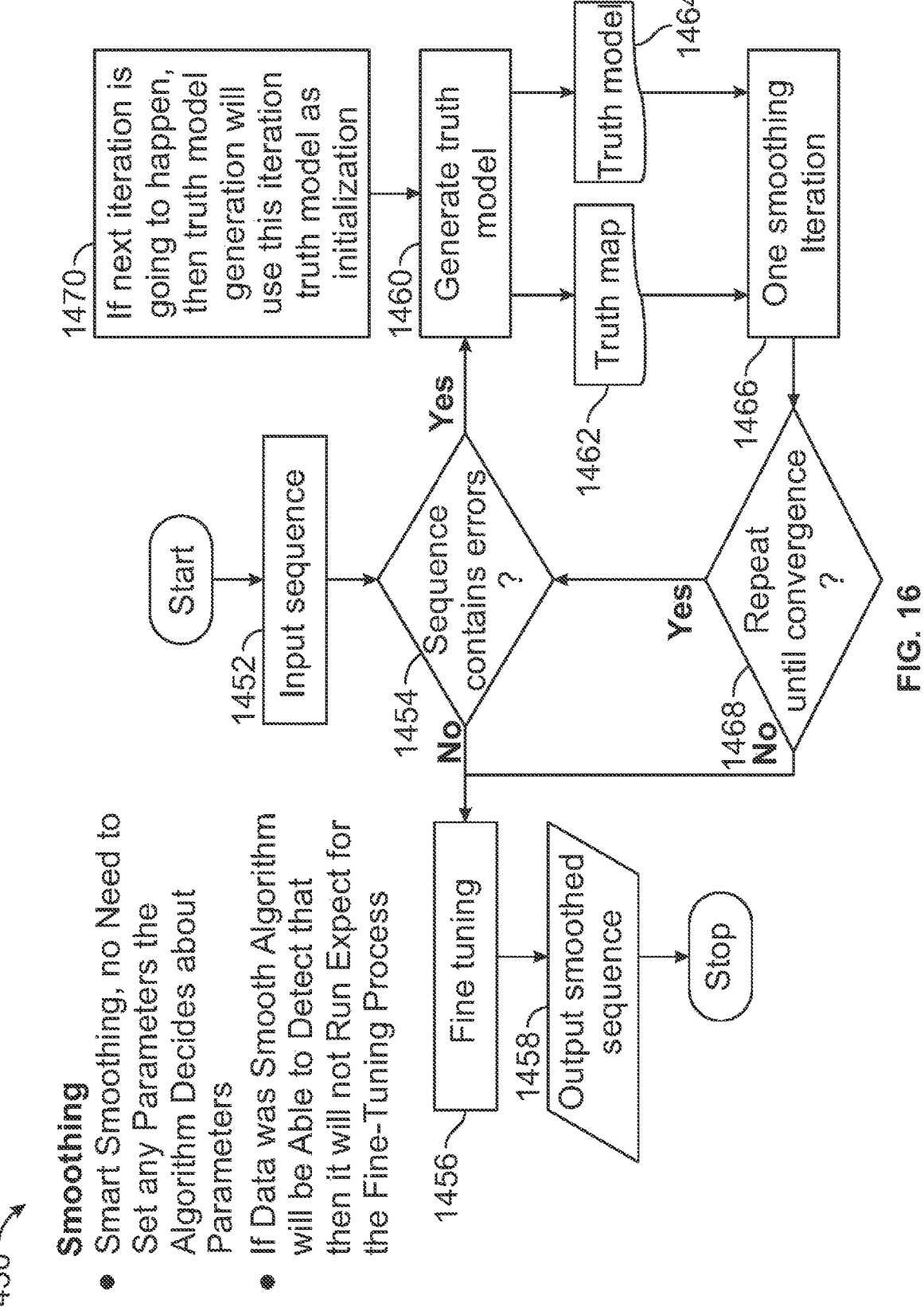
FIG. 16 illustrates a flow diagram of an exemplary process for smoothing received multi-dimensional time series data changes, such as human joint movement data, of the exemplary second embodiment of the automatic body movement recognition and association system in accordance with an exemplary implementation of this disclosure.

In one illustrated exemplary implementation, shown in FIG. 16, a process 1450 for smoothing begins by receiving an input sequence 1452. Process 1450 then determines whether the input sequence contains any errors 1454. If the sequence does not contain any errors, process 1450 fine tunes the input sequence 1456, described in more detail below, and outputs a smoothed, fine-tuned sequence 1458. If the sequence contains errors, process 1450 generates a truth model 1460 to obtain the truth model 1464 and determine a truth map 1462. Process 1450 then performs one smoothing iteration 1466 based on the truth map and the truth model and determines whether to repeat until convergence 1468. If process 1450 determines not to repeat until convergence, process 1450 loops back to fine tuning the input sequence 1456. If process 1450 determines to repeat until convergence, process 1450 loops back to determine whether the sequence contains any errors 1454.

Figure 18:
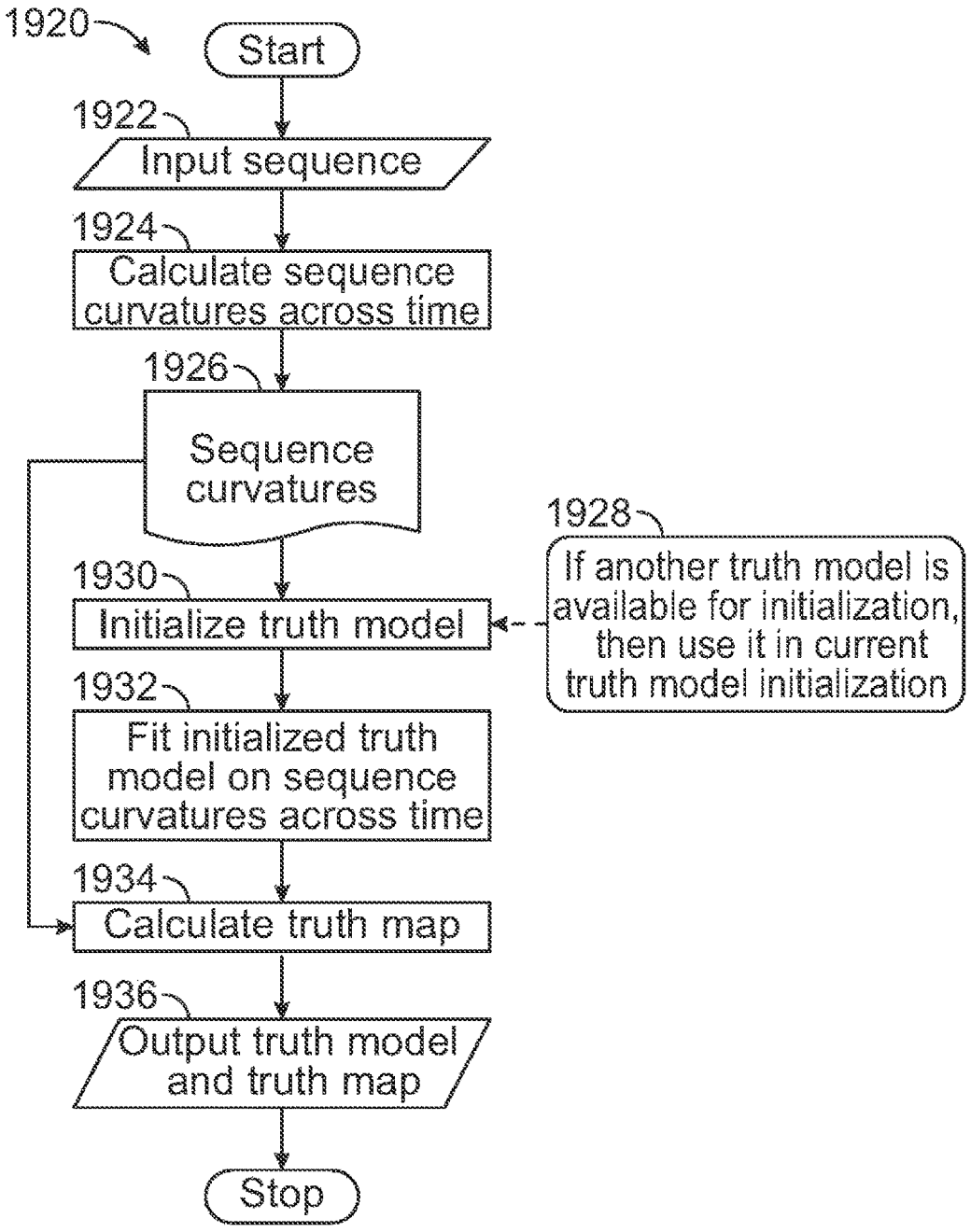
FIG. 18 illustrates a flow diagram of an exemplary process for generating a truth model of an input sequence of data of the exemplary second embodiment of the automatic body movement recognition and association system in accordance with an exemplary implementation of this disclosure.

In one illustrated exemplary implementation, shown in FIG. 18, a process 1920 for generating a truth model begins by receiving an input sequence 1922. Sequence curvatures across time are calculated based on the input sequence 1924 to generate sequence curvatures 1926. If another truth model is available for initialization, that other truth model is used in the current truth model initialization 1930. If another truth model is not available, process 1920 initialized a truth model 1930. The initialized truth model is fit on the sequence curvatures across time 1932 and a truth map is calculated 1934. Process 1920 then outputs the truth model and the truth map 1936.

Figure 26:
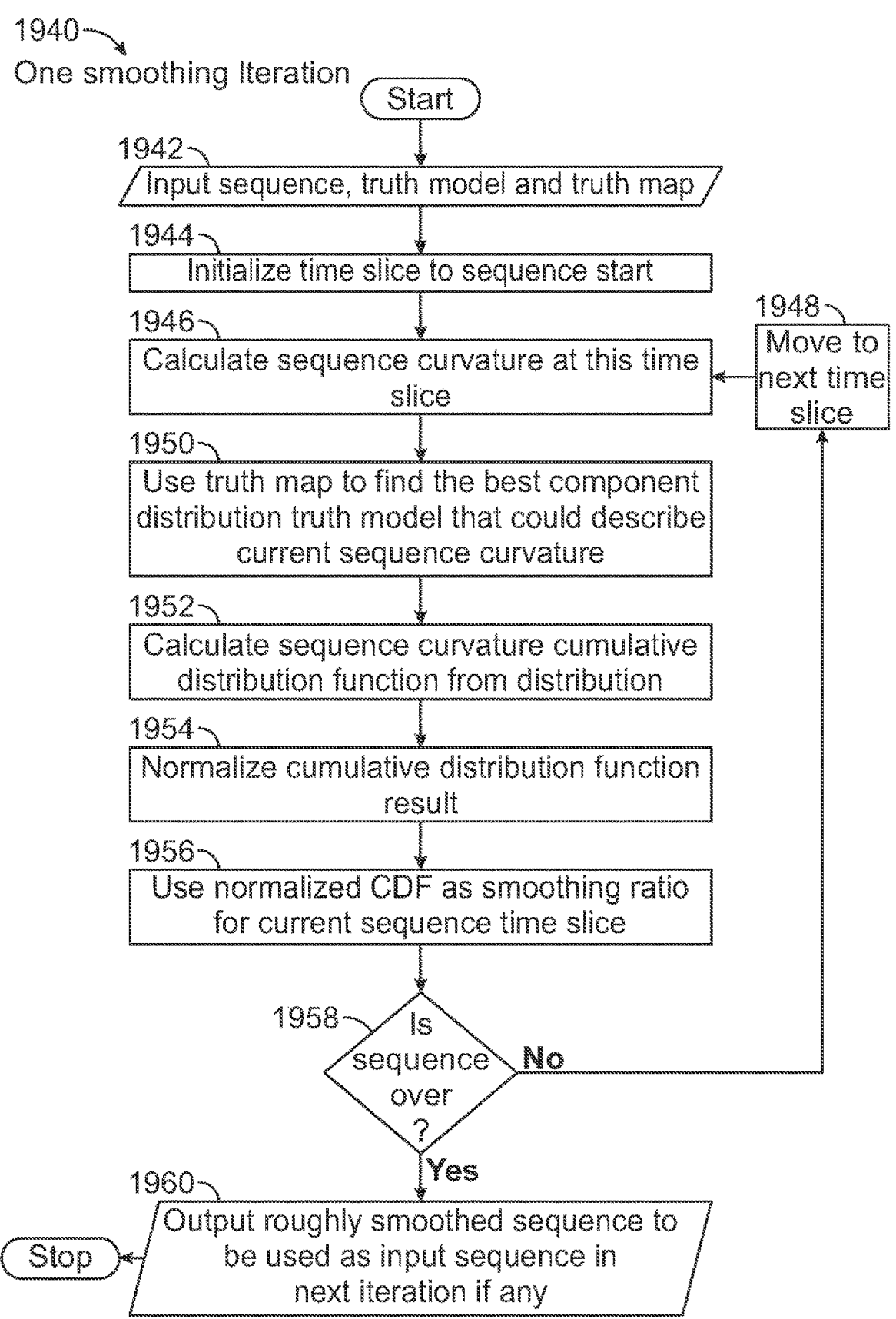
FIG. 26 illustrates a flow diagram of an exemplary process of one smoothing iteration of the exemplary second embodiment of the automatic body movement recognition and association system in accordance with implementations of this disclosure.

In one illustrated exemplary implementation, shown in FIG. 26, a process 1940 for performing one smoothing iteration begins by receiving an input sequence, a truth model, and a truth map 1942. Process 1940 initializes a time slice to the input sequence start 1944 and calculates a sequence curvature at the time slice 1946. The best component distribution within the truth model that could describe the current sequence curvature is determined based on the truth map 1950. A current curvature cumulative distribution function (CDF) is determined based on the best component distribution 1952 and the current curvature cumulative distribution function (CDF) is normalized 1954. The normalized CDF is used as a smoothing ratio for the current sequence time slice 1956 and process 1940 then determines whether the current sequence is over 1958. If the current sequence is not over, process 1940 moves to the next time slice 1948 and loops back to calculate the sequence curvature at the next time slice 1946. If the current sequence is over, process 1940 outputs a roughly smoothed sequence to be used as an input sequence in a next iteration, if any 1960.

Figures 27, 28:
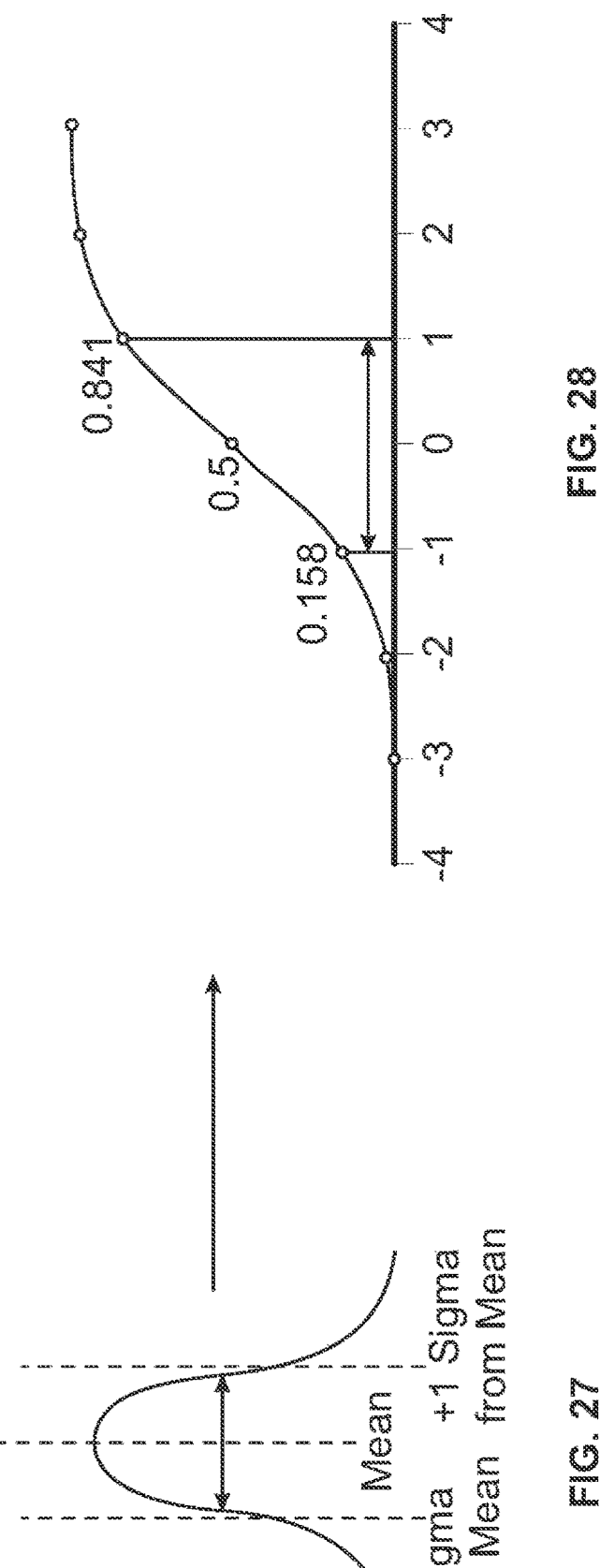
FIG. 27 illustrates an exemplary cumulative distribution function of the exemplary second embodiment of the automatic body movement recognition and association system in accordance with implementations of this disclosure.
FIG. 28 illustrates an exemplary cumulative distribution function of the exemplary second embodiment of the automatic body movement recognition and association system in accordance with implementations of this disclosure.
Figure 30:
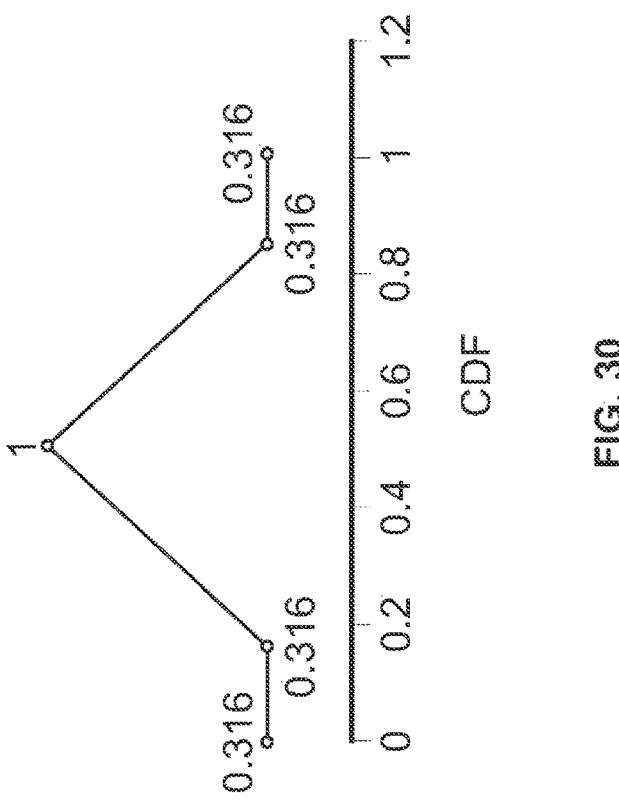
FIG. 30 illustrates an exemplary cumulative distribution function after normalization of the exemplary second embodiment of the automatic body movement recognition and association system in accordance with implementations of this disclosure.
Figure 29:
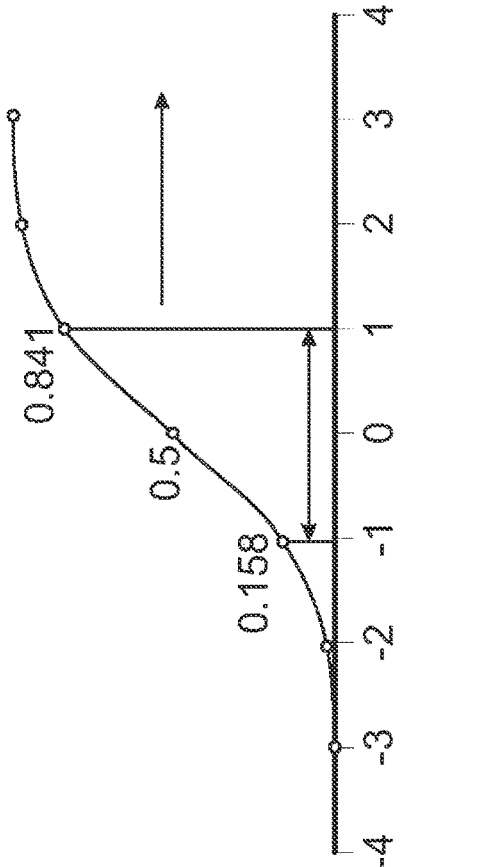
FIG. 29 illustrates an exemplary cumulative distribution function of the exemplary second embodiment of the automatic body movement recognition and association system in accordance with implementations of this disclosure.

The normalize cumulative distribution function (CDF) is shown in the examples of FIGS. 27-30. An example of a truth model component distribution is shown in FIG. 27. A normal distribution probability density function is applied to the truth model component distribution of FIG. 27. Curvatures that are between $+/-\sigma$ from the mean are of higher interest as 68.2% of curvatures are within this region which implies higher truth for curvatures that are in this region. An example of a truth model component CDF example is shown in FIG. 28. Each step on the X-axis of FIG. 28 is a $\sigma$. When the range of CDF values of interest is between $+/-\sigma$, or approximately 0.158 to 0.841 (FIG. 29), the values are used. Referring to FIG. 30, the CDF of the mean will always be 0.5 in any normally distributed data. The mean is the highest known truth value for this component. Therefore, the mean CDF has been normalized to one and there is no need to make any smoothing. CDF values less than or equal to 0.158 will be normalized to 0.316 and CDF values greater than or equal to 0.841 will be normalized to 0.316.

Figure 31:
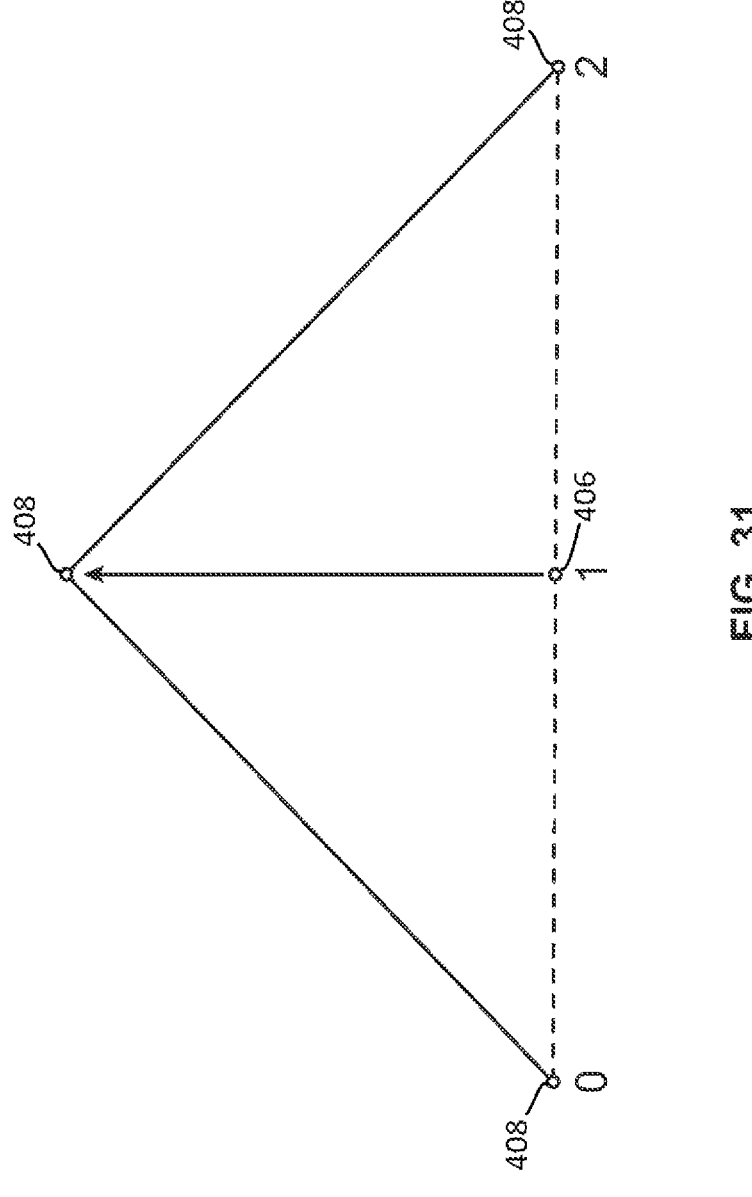
FIG. 31 illustrates an exemplary normalized cumulative distribution function as smoothing ratio of the exemplary second embodiment of the automatic body movement recognition and association system in accordance with implementations of this disclosure.

An example of the normalized CDF as a smoothing ratio is shown in FIG. 31. The X-axis in FIG. 31 represents time and the Y-axis in FIG. 31 is a simplification of sequence data and considering it 1 d for the sake of the drawing as sequence data is multidimensional data. Data point 406 is the midpoint between the data point 408 at t0 and the data point 408 at t1. The distance between the midpoint (data point 406) between the data point 408 at t1 is multiplied by the value of the normalized CDF to smooth the data. After the multiplication, the midpoint is moved towards the data point 408 at time t1 by the same amount. If ratio was one midpoint will coincide with data point at time t1 which means no smoothing.

Figure 17:
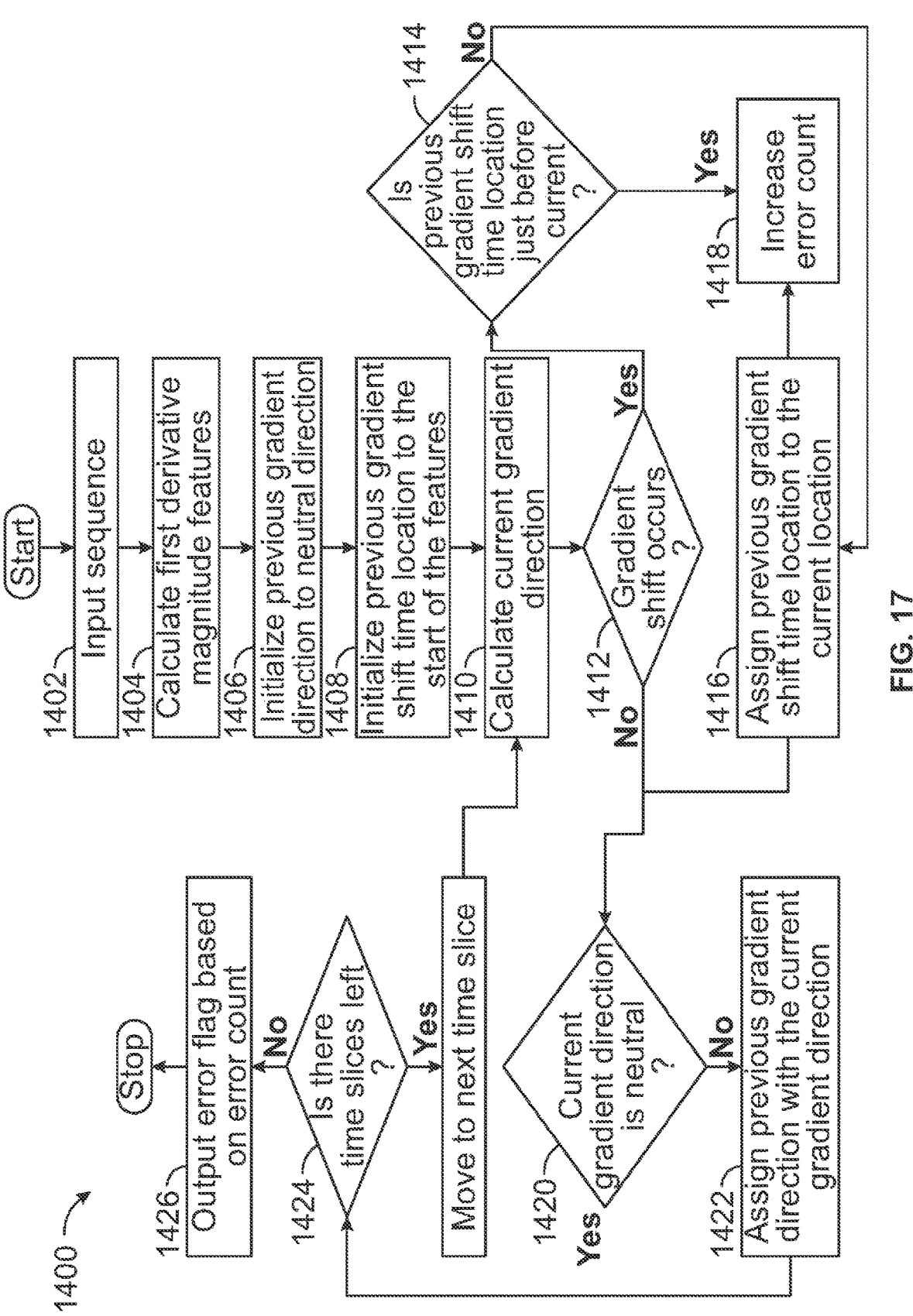
FIG. 17 illustrates a flow diagram of an exemplary process for checking whether a sequence of data contains errors of the exemplary second embodiment of the automatic body movement recognition and association system in accordance with an exemplary implementation of this disclosure.
Figure 24:
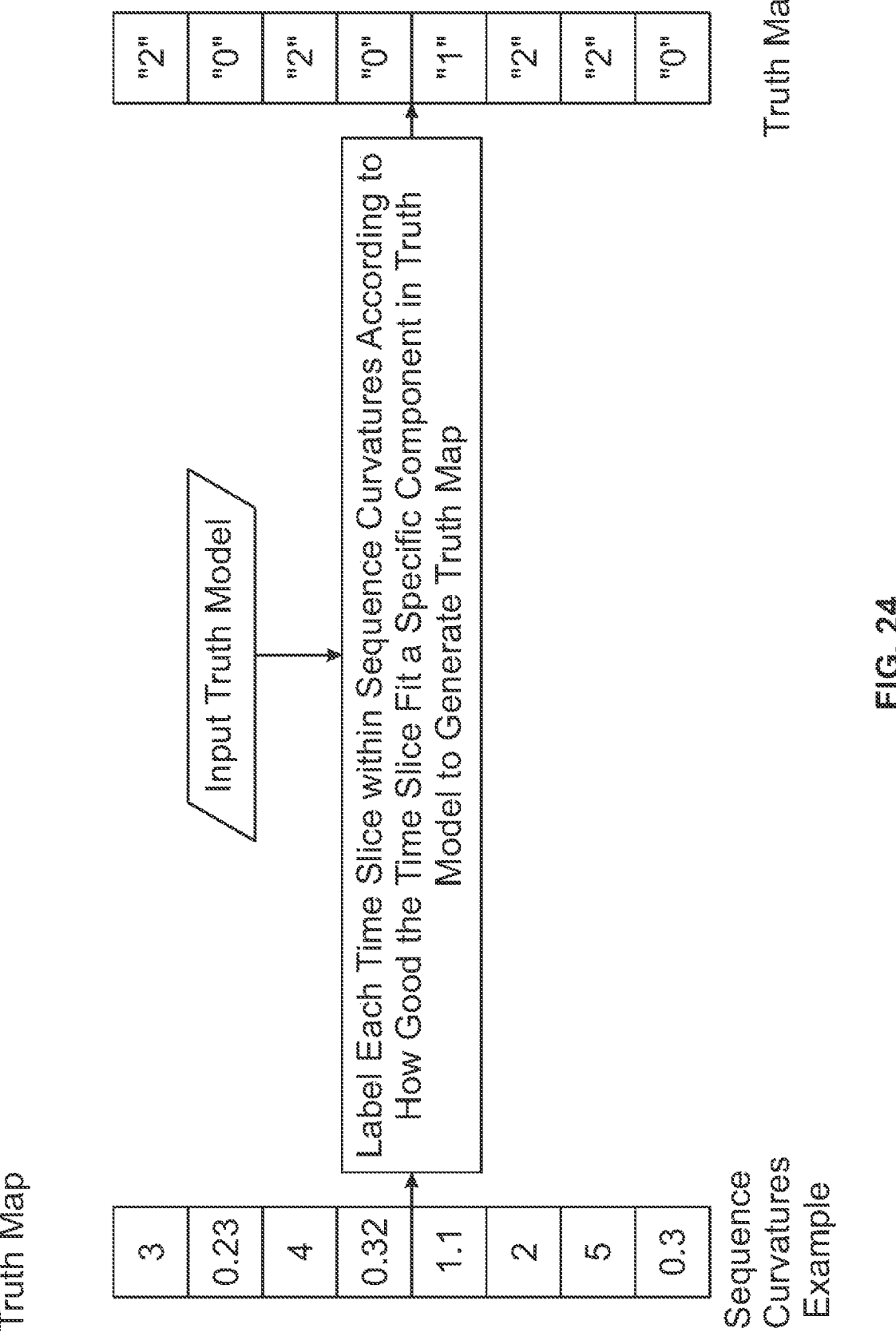
FIG. 24 illustrated a flow diagram of an exemplary process for generating a truth map of the exemplary second embodiment of the automatic body movement recognition and association system in accordance with implementations of this disclosure.

The smoothing algorithm 1400, shown in FIG. 17, takes a sequence of body joints tracking data and detects whether the sequence contains error(s) in it or not. To detect error(s), the data is converted into features by taking the first derivative of data with respect to time, then log transforming the magnitude of each row of the first derivative data. This will determine the rate of change of magnitudes along time frames. The process then calculates the gradient and gradient direction. Gradient direction is whether the magnitude is increasing or decreasing for two consecutive time frames. If gradient direction reverses, then there is a gradient shift. Two gradient shifts consecutively amount to an error. If error is detected by the smoothing algorithm 1400 of FIG. 17, an error correction process, shown in FIG. 18, is started to calculate the sequence curvatures features. A connected probabilistic model or truth model is created to map curvatures into components with distribution for each component as shown in FIG. 19. To correct the error, the error correction process loops over each of the sequence curvatures features, then finds the distribution with the maximum likelihood for this curvature using a truth map, as shown in FIG. 24, and then determines the cumulative distribution function (CDF) using this distribution. The CDF is normalized, shown in FIGS. 27-30, which becomes the factor by which we multiply the middle point to fix the error. The sequence is then checked again for errors and if it still contains error(s), the error correction process is performed again. This iteration happens until there is no error in the sequence. After the sequence is corrected for errors, the sequence is passed over a fine-tuning process, shown in FIG. 32. The fine-tuning process takes weighted moving average with a window size from both directions, i.e., forward and backward and averaging out the values.

In one illustrated exemplary implementation, shown in FIG. 17, process 1400 begins by receiving an input sequence 1402 of movement data and calculating the first derivative magnitude features on the input sequence 1404. Process 1400 then initializes the previous gradient direction to a neutral direction 1406 and initializes the previous gradient shift time location to the start of the features 1408. Process 1400 calculates the current gradient direction 1410. Process 1400 then determines whether a gradient shift has occurred 1412. If a gradient shift has not occurred, process 1400 determines whether the previous gradient shift time location occurred just before the current gradient shift time location 1414. If the gradient shift time location did not occur just before the current gradient shift time location, process 1400 assigns the previous gradient shift time location to the current location 1416. If the gradient shift time location did occur just before the current gradient shift time location, process 1400 increases the error count 1418 and then assigns the previous gradient shift time location to the current location 1416.

Process 1400 then determines whether the current gradient direction is neutral 1420. If the current gradient direction is not neutral, process 1400 assigns the previous gradient direction with the current gradient direction 1422 and then determines whether there are any time slices left 1424. If the current gradient direction is neutral, process 1400 simply determines whether there are any time slices left 1424. If there are time slices left, process 1400 moves to the next time slice and again calculates the current gradient direction for the next time slice 1410 and then outputs an error flag based on the error count 1426. If there are no time slices left, process 1400 simply outputs an error flag based on the error count 1426.

In one illustrated exemplary implementation, shown in FIG. 32, a process 1900 for fine tuning begins by receiving an input sequence 1902. The input sequence is smoothed using a weighted moving average with the smallest window size 1904 to produce sequence 1 1908. The input sequence is also reversed 1906 and smoothed using the weighted moving average with the smallest window size 1910. Process 1900 then reverses the sequence from the last step 1914 to determine sequence 2, determines an average of sequence 1 and sequence 2 1912, and outputs a fine tuned smoothed sequence 1916.

Referring to FIGS. 35-43, segmentation is a method to segment any sequential data into segments which are structurally homogenous, i.e., segments which have a uniform movement in each of them. The process starts by performing initial segmentation. Initial segmentation does not perform a perfect segmentation, i.e., there could be some frames that don't belong to any segments and/or successive segments could have common frames among them. The importance of initial segmentation is that it can roughly tell how many segments are in this sequential data and gives segments that are mostly correct to help navigate through next steps for a perfect segmentation as will be described below. The approach behind initial segmentation is the mathematical property of sequential data curvatures. Straight or near straight curves have a low curvature value while highly curved curves have higher curvature. While sequential data changes with time, when it reaches inflection points the curves are highly curved at this point in time. Hence, building a model that detects these highly curved points of time will lead to segmenting the sequential data at these points. The curvature model's components and probability of connection between components is specifically initialized to capture this property across time, then by fitting the model over the sequential data those initial parameters will be updated to map this property specifically for this sequential data. Additionally, the initialization ensures that after fitting the model's component labeled "0" to be the smallest curvatures distribution, the model's component labeled "1" to be the medium curvatures distribution, and model's component labeled "2" to be the highest curvatures distribution. Hence, by decoding sequential data, i.e., labeling each frame with the prospective component, the initial segmentation process tracks the gradient shifts based on the labels' values and detects where in time the inflection points are happening which will lead to the initial segments.

In order to turn the initial segments into perfect segments, the process builds a dynamic model for the sequential data using dynamic modeling method, described below, where each component within the dynamic model will represent a segment within the sequential data. Hence, by labeling each frame within the sequential data using its prospective dynamic model, a segment map is generated which shows that a segment is consecutive frames that have the same label.

Figure 35:
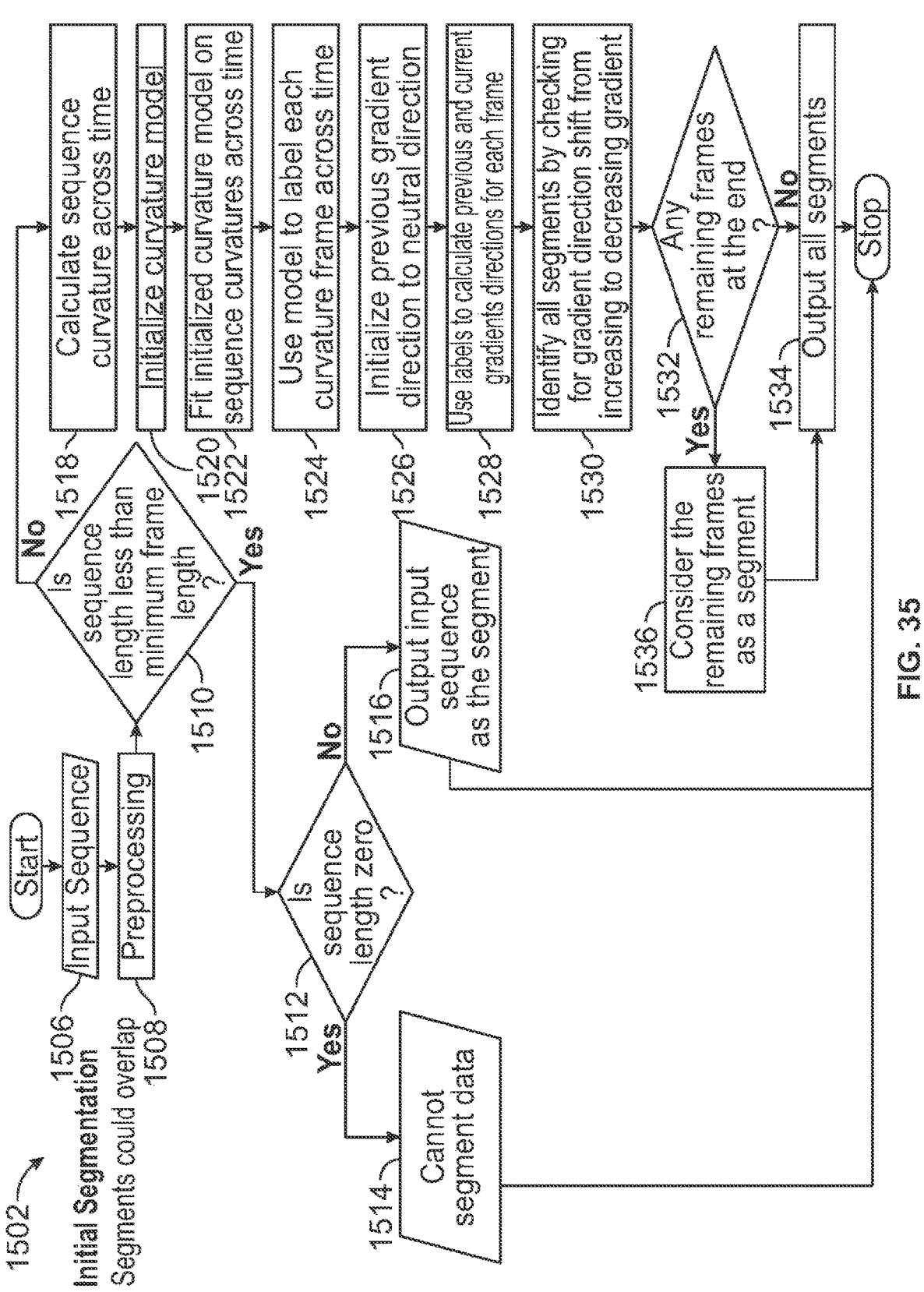
FIG. 35 illustrates a flow diagram of an exemplary process for initial segmentation of a sequence of data of the exemplary second embodiment of the automatic body movement recognition and association system in accordance with an exemplary implementation of this disclosure.
Figure 41:
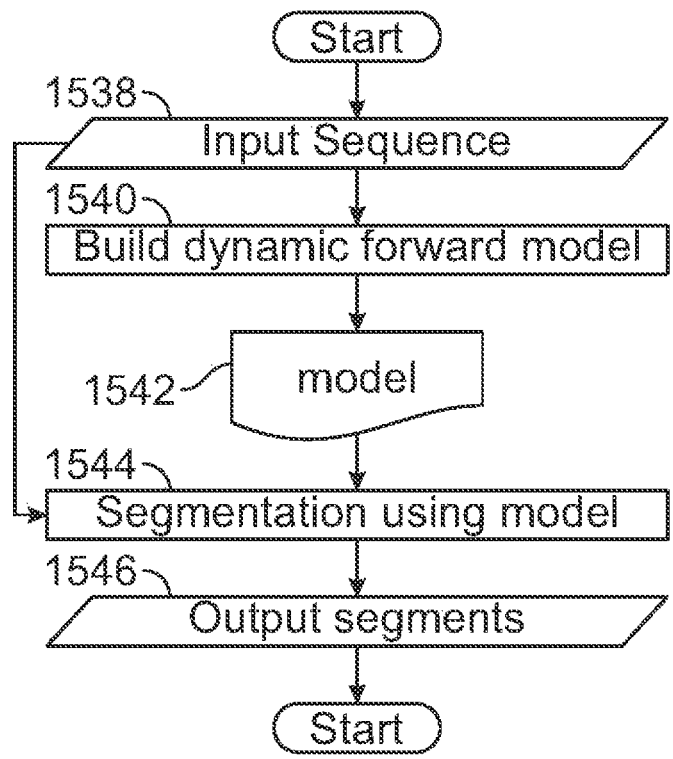
FIG. 41 illustrates a flow diagram of an exemplary process for segmentation of the sequence of data of the exemplary second embodiment of the automatic body movement recognition and association system in accordance with implementations of this disclosure.

The body movement data is passed through two segmentation processes 1500, an initial segmentation process 1502, shown in FIG. 35, and a segmentation process 1504, shown in FIG. 41. The initial segmentation process 1502 segments the data roughly into homogenous segments preserving the time order. These initial segments have a uniform movement in them and should have a minimum number of frames to represent the movement. These initial segments may need further processing, because there could be overlap between segments and/or some data may not be mapped to any segment. The input data to the algorithm represents body movement data from two dimensional and/or three-dimensional data sets. A sequence of data comprises multiple joints changing position across time representing the skeletal movement. Sequence data may come with preprocessing configurations, including, but not limited to, rotation, repositioning, scaling, and smoothing. Once the sequence data is received, it is sent to the pre-processing module to be processed according to its preprocessing configuration. The preprocessed sequence data is first checked to determine if it is long enough to be able to be segmented into smaller segments. If this check fails, the entire sequence is considered a segment. After this check, the preprocessed data is sent to the feature extraction module, where the features are calculated using curvatures, and represented as a curvature feature matrix. The curvatures feature matrix is used to initialize a custom probabilistic connected model. This connected component model is also fitted against the curvatures feature matrix after initialization. This model is used to find the label of each frame to tell which component each frame belongs to. The individual segments are identified by the concept of gradients, with two gradients for each frame, representing a previous gradient starting at zero and the current gradient. The labels are used to calculate previous gradient and current gradient for each frame. The individual segments are considered by checking for a gradient shift from increasing to decreasing gradient. This process is repeated until the sequence data is entirely segmented into smaller segments. The output produced are the initial segments that are obtained by segmenting the sequence data.

Figure 43:
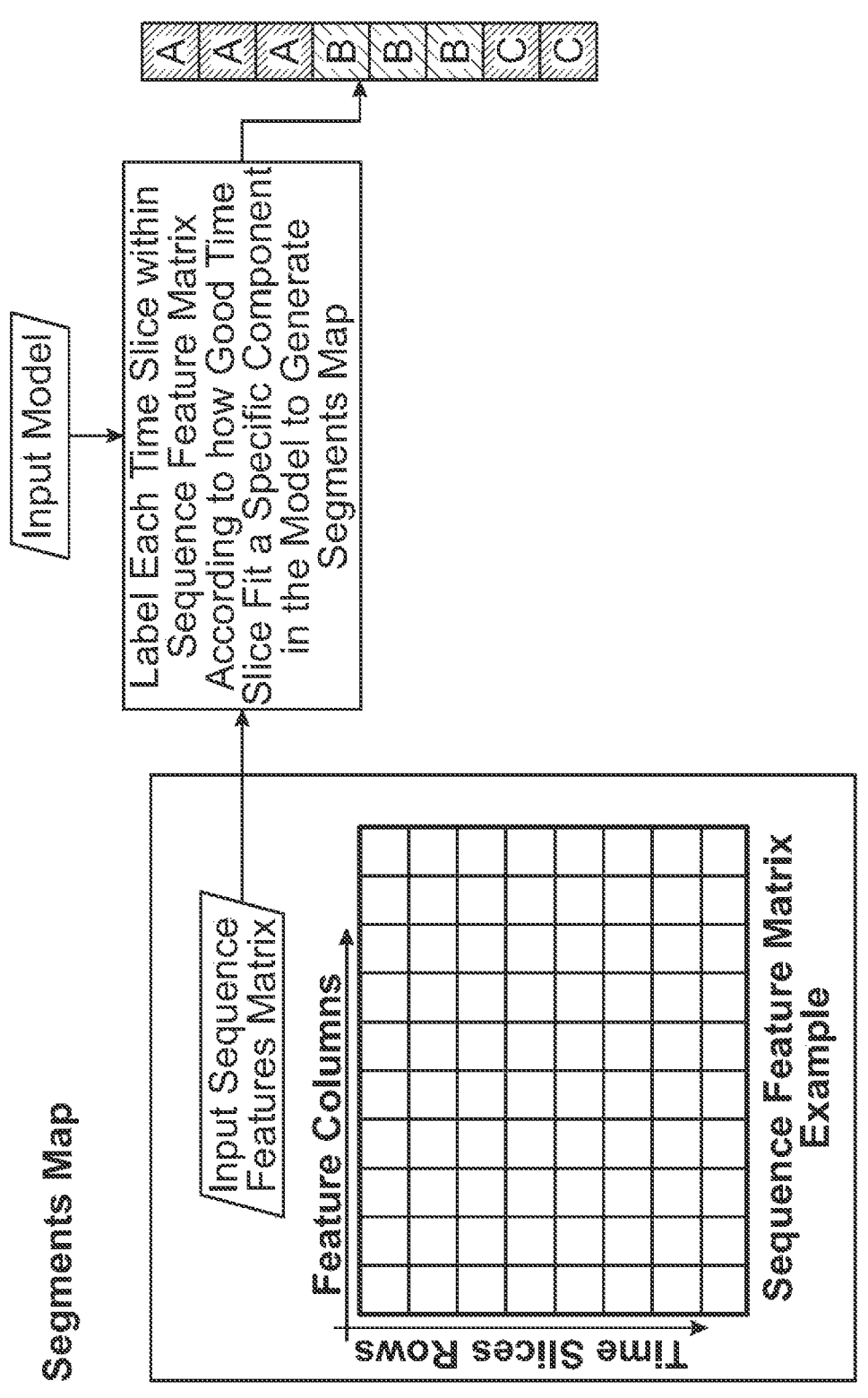
FIG. 43 illustrates an exemplary segments map of the exemplary second embodiment of the automatic body movement recognition and association system in accordance with implementations of this disclosure.

The segmentation process 1504 partitions movement data that was already processed by the initial segmentation process, into homogenous segments preserving the time order. A homogenous segment is a segment having uniform movement throughout the segment. In other words, the sequence data may be obtained by putting all the homogenous segments together in time order. The input data to the algorithm represents body movement data from two dimensional and/or three-dimensional data sets. A sequence of data comprises multiple joints changing positions across time representing the skeletal movement. Sequence data may come with preprocessing configurations, including, but not limited to, rotation, repositioning, scaling, and smoothing. Once the sequence data is received, it is sent to the pre-processing module to be processed according to its preprocessing configuration. The preprocessed data is then sent to the feature generation module, which produces movement data represented as a feature matrix. The preprocessed data is also sent to the connected component model generation module, which produces a probabilistic connected model representation for the sequence data, preserving the time order. The feature matrix, along with the connected model is used to create a mapping representation, as shown in FIG. 43 that represents the best combination of components across time. Using this obtained mapping representation, every segment in the sequence data is obtained in an iterative manner. This process is repeated until the sequence data is completely segmented into smaller homogenous segments. The output produced are the homogenous segments that are obtained by segmenting the sequence data.

In one illustrated exemplary implementation, shown in FIG. 35, process 1502 begins by receiving an input sequence 1506 and preprocessing that sequence 1508 to determine whether the input sequence length is less than the minimum frame length 1510. If the input sequence length is less than the minimum frame length, process 1502 determines whether the input sequence length is zero 1512. If the sequence length is zero, process 1502 determines that it cannot segment the data in the input sequence 1514. If the sequence length is not zero, process 1502 outputs the input sequence as the segment 1516.

If the input sequence is not less than the minimum frame length, process 1502 calculates a sequence curvature across time 1518 based on the input sequence. Process 1502 then initializes a curvature model 1520 and fits the initialized curvature model on the sequence curvature across time 1522. The curvature model is then used to label each curvature frame across time 1524. Process 1502 then initializes the previous gradient direction to a neutral direction 1526 and uses labels to calculate previous and current gradients directions for each frame 1528. Process 1502 identifies all segments by checking for gradient direction shift from increasing to decreasing gradient 1530 and then determines if there are any remaining frames at the end 1532. If there are not remaining frames, process 1502 outputs all segments 1534. If there are remaining frames, process 1502 considers the remaining frames as a segment 1536 and then outputs all segments 1534.

Figures 36, 37, 38:
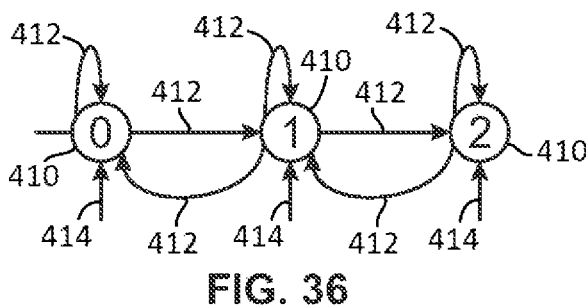
FIG. 36 illustrates an exemplary curvature model, each circle representing a curvature component, of the exemplary second embodiment of the automatic body movement recognition and association system in accordance with implementations of this disclosure.
FIG. 37 illustrates an exemplary transition matrix initialization of the black arrows of FIG. 35 of the exemplary second embodiment of the automatic body movement recognition and association system in accordance with implementations of this disclosure.
FIG. 38 illustrates an exemplary initial vectors initialization of the green arrows of FIG. 35 of the exemplary second embodiment of the automatic body movement recognition and association system in accordance with implementations of this disclosure.
Figure 39:
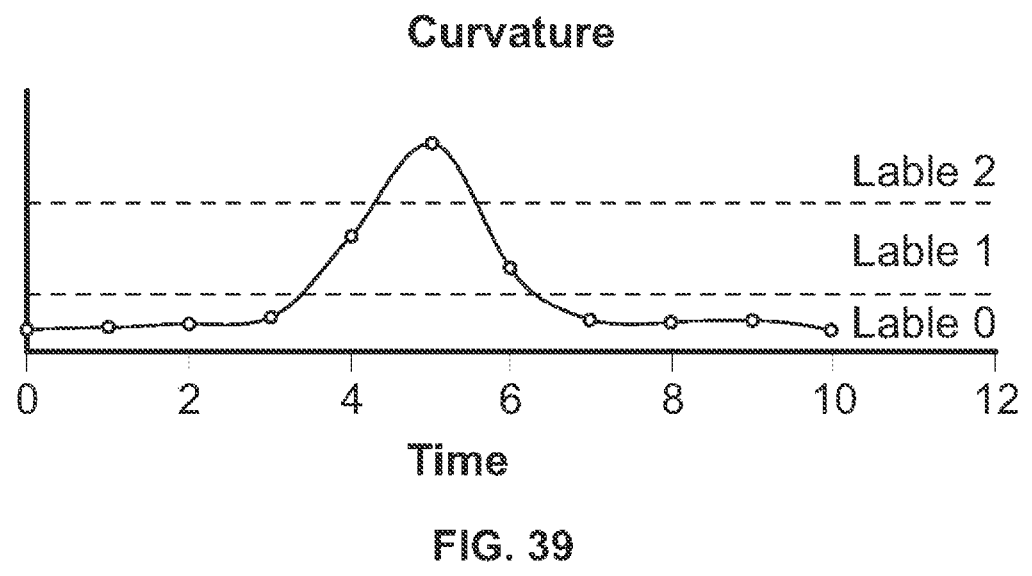
Figure 40:
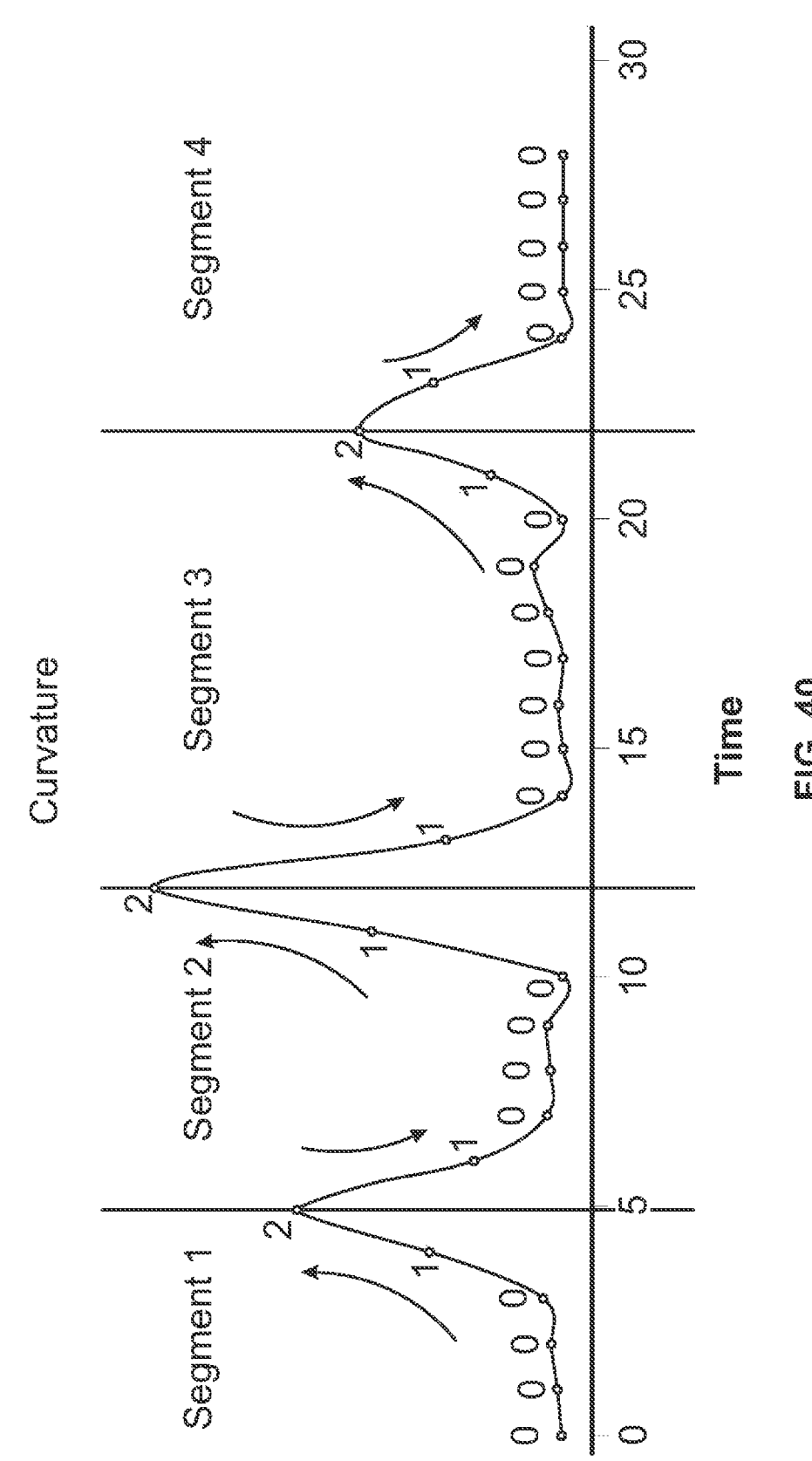
FIG. 40 illustrates an exemplary graph of curvature with respect to time after initial segmentation of the sequence of data of the exemplary second embodiment of the automatic body movement recognition and association system in accordance with implementations of this disclosure.

Curvature model initialization is shown in the examples in FIGS. 36-39. The curvature model is a probabilistic generative connected model that describes relationships between curvature components across time. Each circle 410, shown in FIG. 36, represents a component. The numbers within the circles 410 are labels for each component and have a mathematical significance. The number zero represents very low curvature, the number one represents medium curvature, and the number 2 represents maximum curvature. Arrows 412 each represent a transition from one component to another. Arrows 414 each represent the starting component. Arrows 412 and arrows 414 each comprise a probability that describes how probable a certain function is. Arrows 412 probabilities initialization is described in a transition matrix. Arrows 414 initialization is described in an initials vector. Each component is described using a univariant distribution family, i.e., normal distribution. This model will be able to model any curvature curve with respect to time that will have the shape described in the graph shown in FIG. 39.

In one illustrated exemplary implementation, shown in FIG. 41, process 1504 begins by receiving an input sequence 1538 and builds a dynamic forward model 1540 based on the input sequence. Process 1504 then determines a model 1542 based on the dynamic forward model, performs segmentation based on the model 1544, described in more detail below, and then outputs the segments 1546.

In one illustrated exemplary implementation, shown in FIG. 42, process 1550, to perform segmentation based on the model, begins by receiving an input sequence 1552 and preprocesses the input sequence 1554 to generate a sequence features matrix based on the input sequence 1556. Process 1550 receives an input model 1560 and then labels each time slice within the sequence features matrix according to how well a time slice fits a specific component in the input model to generate a segments map 1558. Once all the time slices within the sequence features matrix are labeled, a segments map is generated 1562. Process 1550 determines whether the sequence features matrix still contains data 1564. If the sequence features matrix does not contain any data, process

1550 outputs all segments 1566. If the sequence features matrix still contains data, process 1550 identifies a first segment in the sequence using the segments map 1568.

An example of a three segments "segments map" is shown in FIG. 43. All the contiguous "A" labeled time slices are one segment, all the contiguous "B" labeled time slices are another segment, and all the contiguous "C" labeled time slices are another segment. Labels include, but are not limited to, letters, numbers, and strings.

Process 1550 then determines whether the first segment is longer than or equal to the segments map length 1570. If the first segment is not longer than or equal to the segments map length, process 1550 takes what is left in the sequence and segments map in order to use it for the next iteration 1572 and then loops back to determine whether the sequence features matrix still contains data 1564. If the first segment is longer than or equal to the segments map length, process 1550 adds what is left in the sequence to a list of output segments 1574 and then outputs all segments 1566.

Referring to FIGS. 44-48, the similarity method compares two sequences of data to each other and gives a score between 0 and 1, representing the similarity between the two sequences of data. The process is a two-way similarity method, i.e., similarity of sequential data A compared to sequential data B, depicted as Sim(A, B) is the same as Sim(B, A). The method builds two models, ModelA for SequenceA and ModelB for SequenceB, for each of the sequential data in a dynamic manner which means that the models are estimated directly from the sequential data. Each model is a representation and description of the sequential data. For more information about dynamic modeling, please refer to the dynamic modeling processes described below. These two models are then used to estimate similarity based on the idea that if the sequential data is similar then the two models will look like each other, i.e., the ability of one model to generate one of the sequential data will be the same as the ability of the other model to generate the same sequential data. Hence, similarity is calculated in two steps. First, the similarity of sequential data A compared to sequential data B is calculated in a one-way fashion, depicted as OneWaySim(A, B), which is ModelA's ability to generate SequenceA compared to ModelB's ability to generate SequenceA. Second, the similarity of SequenceB compared to SequenceA is calculated in a one-way fashion, depicted as OneWaySim(B, A), which of course comprises a different value than OneWaySim(A, B) in general. OneWaySim(B, A) is ModelB's ability to generate SequenceB compared to ModelA's ability to generate SequenceB. The overall similarity score Sim(A, B) is calculated by averaging the OneWaySim(A, B) and OneWaySim(B, A), which is why Sim (A, B) is the same as Sim(B, A).

Figure 44:
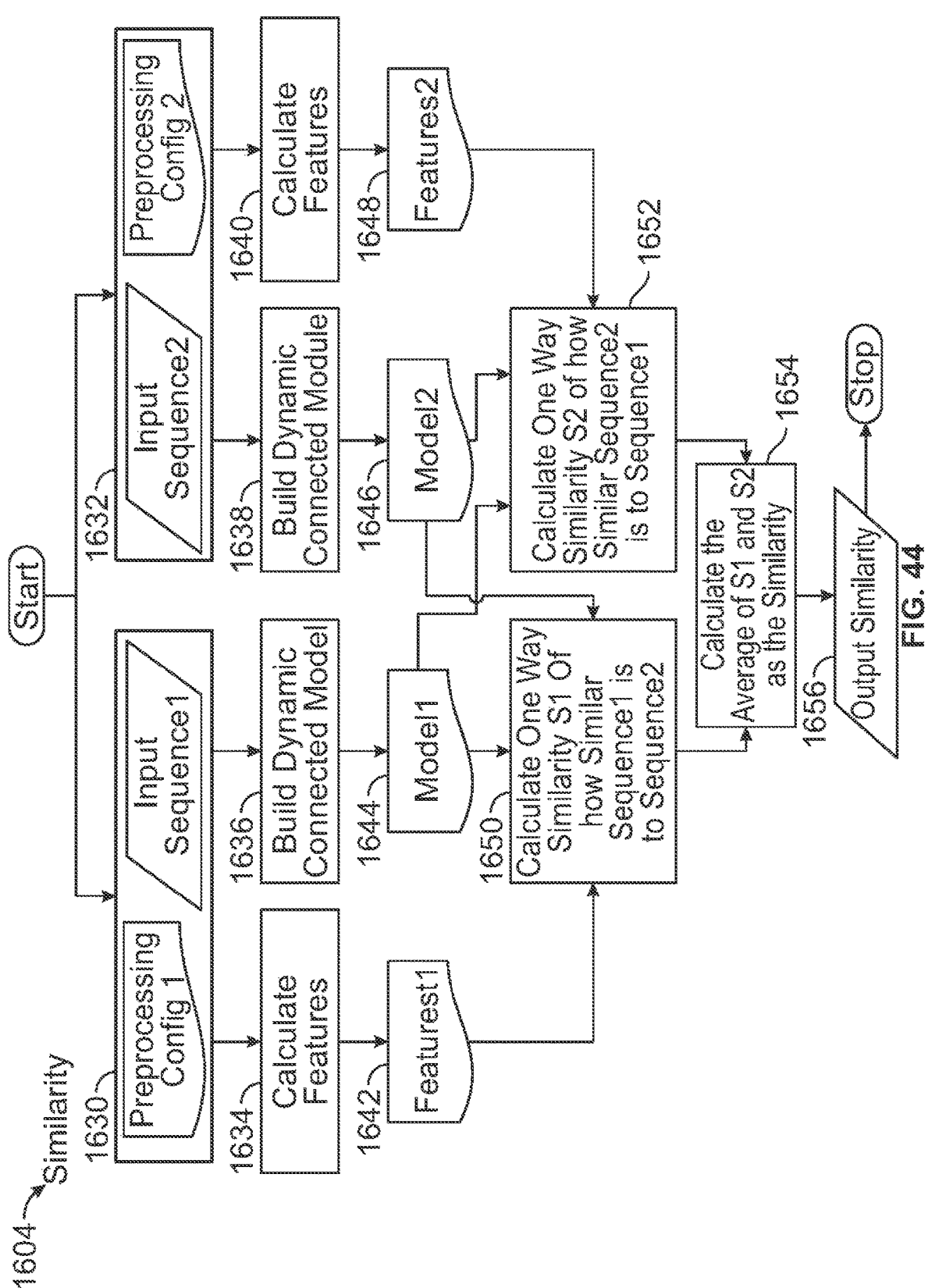
FIG. 44 illustrates a flow diagram of an exemplary process to determine similarity of a sequence of data of the exemplary second embodiment of the automatic body movement recognition and association system in accordance with implementations of this disclosure.
Figure 45:
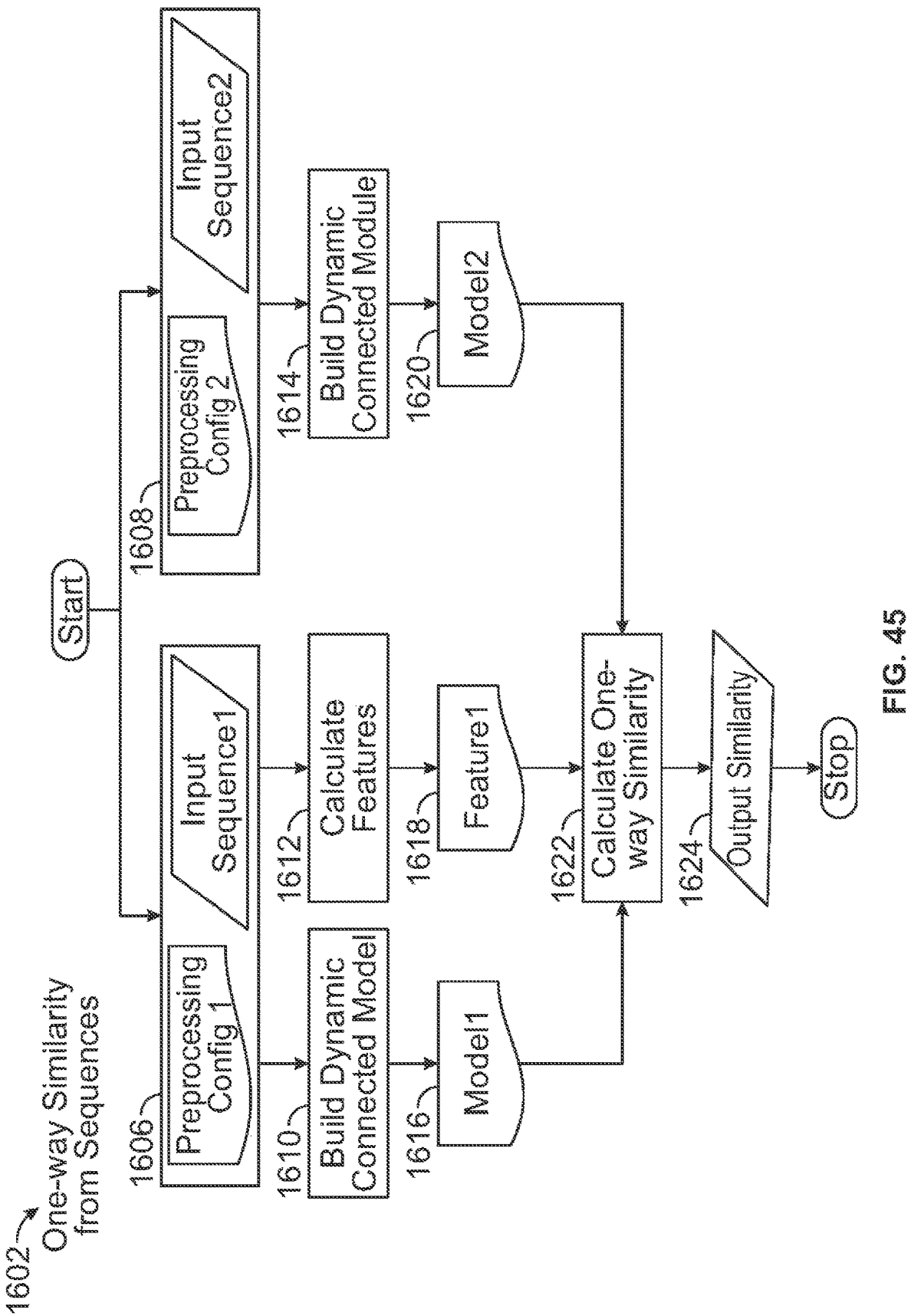
FIG. 45 illustrates a flow diagram of an exemplary process to determine one-way similarity from sequences of data of the exemplary second embodiment of the automatic body movement recognition and association system in accordance with implementations of this disclosure.
Figure 46:
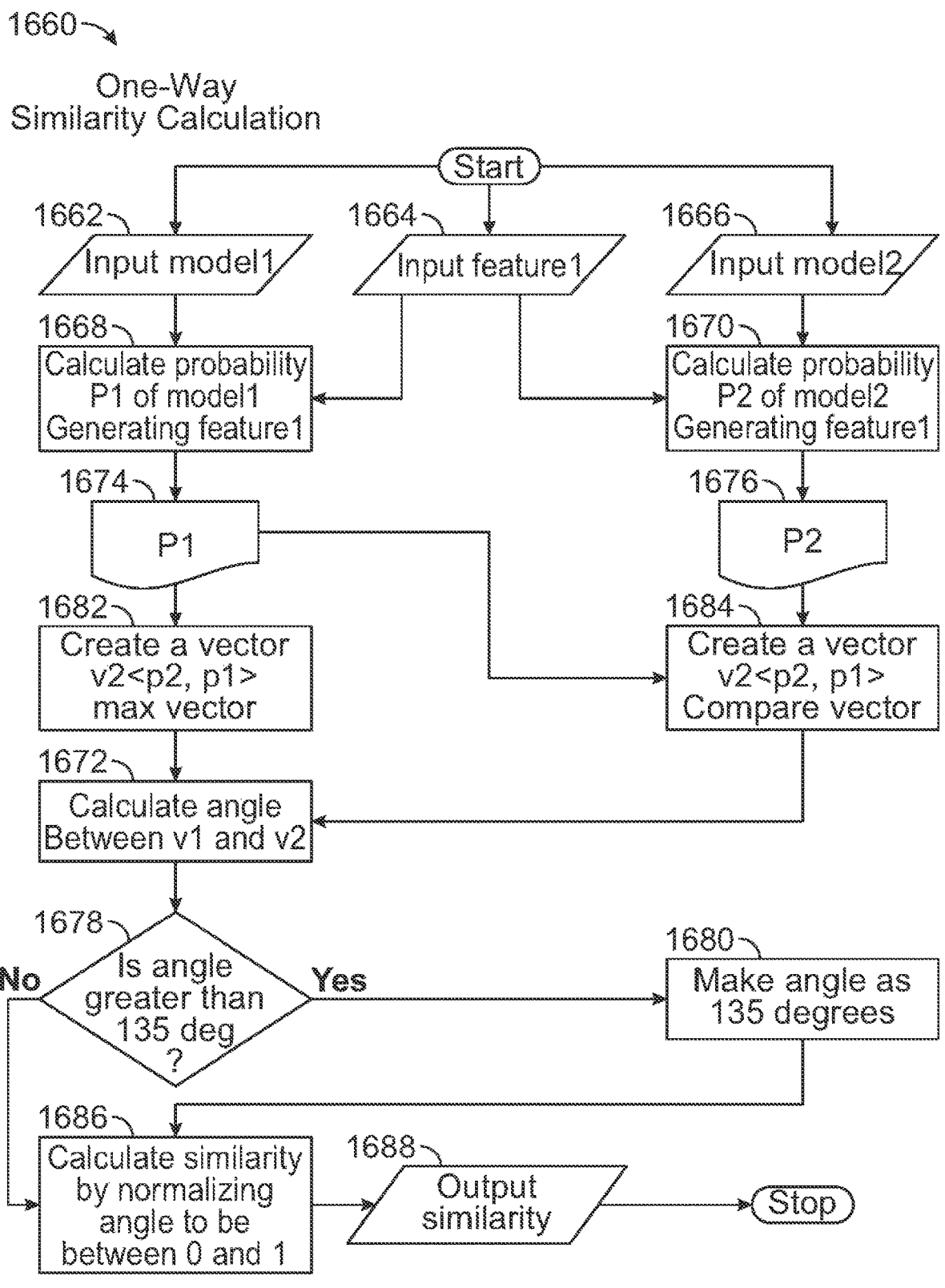
FIG. 46 illustrates a flow diagram of an exemplary process to determine one-way similarity calculation of the exemplary second embodiment of the automatic body movement recognition and association system in accordance with implementations of this disclosure.
Figure 47:
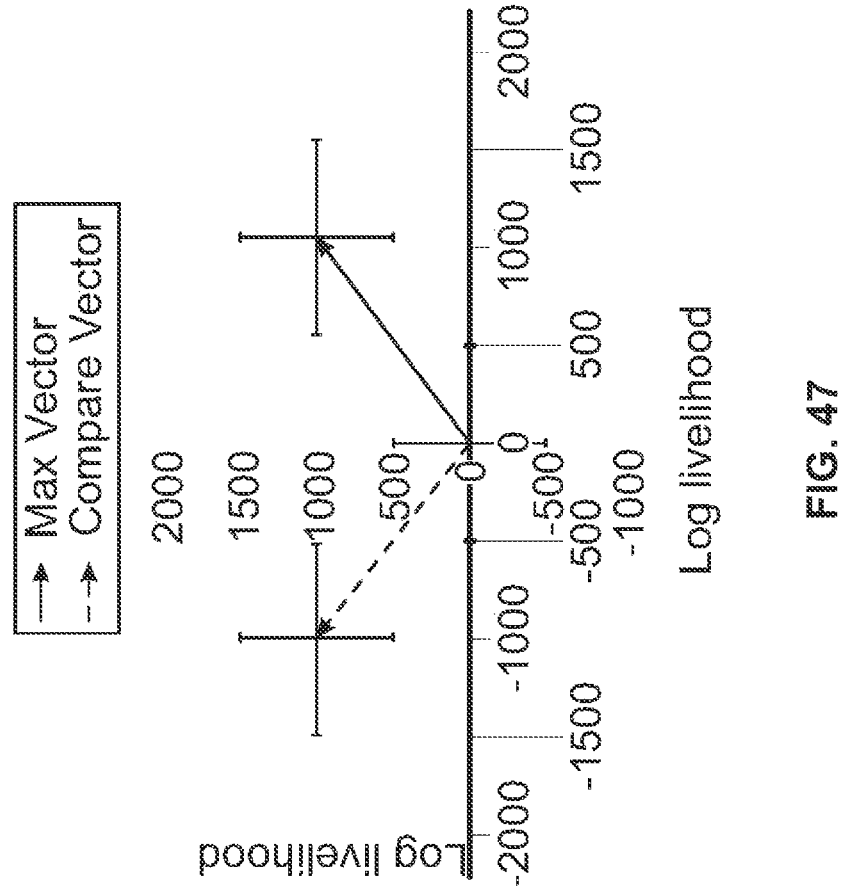
FIG. 47 illustrates an exemplary graph of a one-way similarity example of 33.33% similar sequences of the exemplary second embodiment of the automatic body movement recognition and association system in accordance with implementations of this disclosure.
Figure 48:
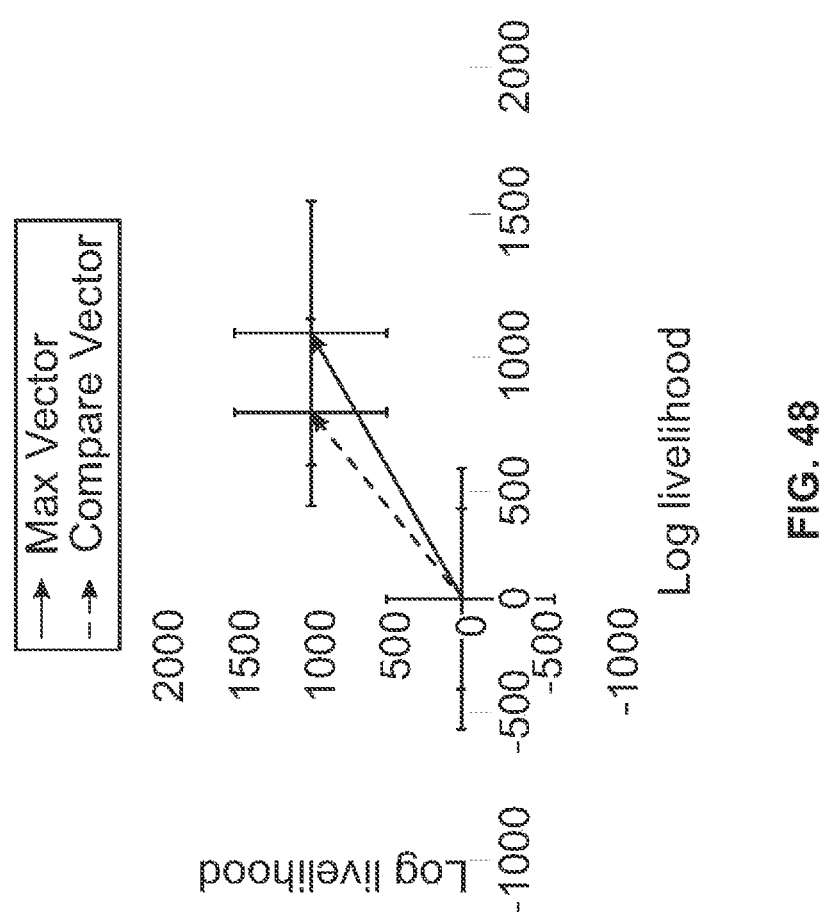
FIG. 48 illustrates an exemplary graph of a one-way similarity example of 92.6% similar sequences of the exemplary second embodiment of the automatic body movement recognition and association system in accordance with implementations of this disclosure.

The body movement data is passed through two similarity processes 1600, a one-way similarity process 1602, shown in FIGS. 45 and 46, and a similarity process 1604, shown in FIG. 44. The one-way similarity process 1602 compares two sequences of data to find how similar one sequence is to the other, on a scale of 0 to 1, 0 representing completely different sequences and 1 representing identical sequences. The two sequences can be of the same length or of different lengths. The sequences can be named Sequence1, which is the sequence of interest, and Sequence2, against which the Sequence1 is compared to. Changing the sequences' order will generate different results. The input data to the algorithm comprises two sequences, each of which represents body movement data from two dimensional and/or three-dimensional data sets. A sequence of data comprises multiple joints changing positions across time representing the skeletal movement. Each sequence of data may come with preprocessing configurations, including, but not limited to, rotation, repositioning, scaling, and smoothing. The sequences are sent to the one-way similarity from sequences process shown in FIG. 45. Once the data is received, Sequence1 is sent to the feature generation module, which produces movement data represented as a feature matrix. Hence, feature matrix for Sequence1 is obtained, shown in FIG. 45. Each sequence is also sent to the connected component model generation module, which produces a probabilistic connected model representation for the sequence data, preserving the time order. Hence, connected model for Sequence1 and connected model for Sequence2 are obtained, shown in FIG. 45. As the next process, the one-way similarity calculation, shown in FIG. 46, calculates two likelihoods, likelihood P1 of Sequence1 model generating Sequence1, P1 will be the max likelihood that any model could generate Sequence1 as the model is modeling Sequence1, and likelihood P2 of Sequence2 model generating Sequence1. These probabilities, P1 and P2, are used to create vectors, shown in FIGS. 47 and 48, that aid in calculating similarity. Vector1 (Max Vector), shown in solid line in FIGS. 47 and 48, is built from probability P1 that represents Sequence1. Vector2 (Compare Vector), shown in dotted line in FIGS. 46 and 47, is built from probabilities P1 and P2, that quantify Sequence2 model generating Sequence1. These vectors are used to calculate the similarity, shown in FIG. 46, which is a direct measure of the angle between the vectors Vector1 and Vector2 after normalization. The similarity value is inversely proportional with the value of the angle, i.e., when the angle is small it indicates higher similarity and when the angle is big it indicates lower similarity. Please note that, according to this definition, the maximum angle between Vector1 and Vector2 is 135 degrees when P2 tends to negative infinity. Hence, it is used as the normalization factor. The similarity value is calculated by normalizing the obtained angle to be between 0 and 1. The output produced is a similarity value that tells how similar Sequence1 is to Sequence2, on a scale of 0 to 1, as shown in FIG. 46.

In one illustrated exemplary implementation, shown in FIG. 45, process 1602 receives input sequence 1 and preprocessing configuration 1, if any, 1606 and input sequence 2 and preprocessing configuration 2, if any, 1608. For input sequence 1, process 1602 calculates features 1612 to determine features 1 1618 and builds a dynamic connected model 1610 to determine model 1. For input sequence 2, process 1602 builds a dynamic connected model 1614 to determine model 2. Features 1, model 1, and model 2 are then used to calculate a one-way similarity 1622, described in detail with respect to FIG. 46, and outputs that similarity 1624.

In one illustrated exemplary implementation, shown in FIG. 46, a process 1660 for determining a one-way similarity begins by receiving model 1 1662, features 1 1664, and model 2 1666. Using model 1 and features 1, process 1660 calculates the probability P1 of model 1 generating features 1 1668 to determine P1 1674. Using model 2 and features 1, process 1660 calculates the probability P2 of model 2 generating features 1 1670 to determine P2 1676. P1 is used to create a vector V1<P1, P1> max vector 1682. P1 and P2 are used to create a vector V2<P2, P1> compare vector 1684. Process 1660 then calculates the angle between V1 and V2 1672 and determines if the angle is greater than 135 degrees 1678. If the angle is greater than 135 degrees, process 1660 sets the angle to 135 degrees 1680, calculates a similarity by normalizing the angle to be between zero and one 1686, and then outputs the similarity 1688. If the angle is not greater than 135 degrees, process 1660 calculates the similarity by normalizing the angle to be between zero and one 1686 and then outputs the similarity 1688.

A one-way similarity example of 33.33% similar sequences is shown in FIG. 47. The X-axis includes log likelihood values and the Y-axis includes log likelihood values. P1 is 1000 in this example and P2 is −1000 in this example. The Max Vector is <P1, P1>=<1000, 1000>. The Compare Vector is <P2, P1>=<−1000, 1000>. The angle between both vectors after normalization represents the one-way similarity.

A one-way similarity example of 92.6% similar sequences is shown in FIG. 48. The X-axis includes log likelihood values and the Y-axis includes log likelihood values. P1 is 1000 in this example and P2 is 700 in this example. The Max Vector is <P1, P1>=<1000, 1000>. The Compare Vector is <P2, P1>=<700, 1000>. The angle between both vectors after normalization represents the one-way similarity.

The similarity process 1604 compares two sequences of data to find how similar they are to each other, on a scale of 0 to 1, 0 representing completely different sequences and 1 representing identical sequences. The two sequences can be of the same length or of different lengths. The input data to the algorithm comprises two sequences, each of which represents body movement data from two dimensional and/ or three-dimensional data sets. The sequences can be named as Sequence1 and Sequence2, changing the order of the sequences will not change the results. A sequence of data comprises multiple joints changing positions across time representing the skeletal movement. Each sequence of data may come with preprocessing configurations, including, but not limited to, rotation, repositioning, scaling, and smoothing. Once the data is received, each sequence is sent to the feature generation module, which produces movement data represented as a feature matrix. This module produces two feature matrices, Feature1 and Feature2, representing features of Sequence1 and Sequence2, respectively. Each sequence is also sent to the connected component model generation module, which produces a probabilistic connected model representation for the sequence data, preserving the time order. This process is repeated twice to produce two connected component models, Model1 and Model2 that represent Sequence1 and Sequence2, respectively. These feature matrices and connected component models are used in calculating one-way similarities. One-way similarity S1 is calculated, in the one-way similarity calculation module shown in FIG. 44, to know how similar Sequence1 is to Sequence2, using Model1, Feature1 and Model2 as Sequence2 representation. One-way similarity S2 is calculated, in the one-way similarity calculation module shown in FIG. 44, to know how similar Sequence2 is to Sequence1, using Model2, Feature2 and Model1 as Sequence1 representation. The overall similarity, shown in FIG. 44, is calculated as the average of the two one-way similarities S1 and S2. The output produced is a similarity value that tells how similar the two sequences are, regardless of which is Sequence1 and which is Sequence2.

In one illustrated exemplary implementation, shown in FIG. 44, process 1604 receives input sequence 1 and preprocessing configuration 1, if any, 1630 and input sequence 2 and preprocessing configuration 2, if any, 1632. For input sequence 1, process 1604 calculates features 1634 to determine features 1 1642 and builds a dynamic connected model 1636 to determine model 1. Similarly, for input sequence 2, process 1604 calculates features 1640 to determine features 2 1648 and builds a dynamic connected model 1638 to determine model 2. Features 1, model 1, and model 2 are then used to calculate a one-way similarity S1 that identifies how similar input sequence 1 is to input sequence 2 1650. Similarly, features 2, model 2, and model 1 are then used to calculate a one-way similarity S2 that identifies how similar input sequence 2 is to input sequence 1 1652. Process 1604 then calculates the average of S1 and S2 as the similarity 1654 and outputs that similarity 1656.

Referring to FIGS. 49-61, the pooling method performs a special clustering to sequential data based on their respective similarity to each other. The process clusters sequences of data which are like each other, then creates a pool for each group. Unlike other clustering techniques, our method only makes clusters or pools where data within each single pool is similar to each other, i.e., you will not find a pool where data within it is different from each other.

The pooling process receives a list of sequential data and builds a similarity matrix for them with defined properties. The similarity matrix must be a square matrix and the upper and lower triangular matrices must be equal. Each cell is the prospective similarity between two sequential data, e.g., cell (2, 5) is the similarity between sequential data at index 2 and at index 5 in the list. The similarity matrix is then converted into a dot similarity matrix which still holds the same properties as the similarity matrix but the values within the cells do not represent similarity only, but also a score between 0 and 1 which indicates the probability of pooling two sequences of data together. A score of 0 indicates no pooling and a score of 1 indicates fully sure to pool two sequences of data. Cell (2, 5) score for example is calculated by taking dot product of row 2 with row 5 from the similarity matrix, then divide the result by row 2 magnitude multiplied by row 5 magnitude as normalization to make values between 0 and 1. The normalized dot product between the similarity matrix's rows generates values which are extremely dependent on each other. This is a property that allows the pooling calculation to see the relationship between two sequences of data compared to all other sequential data only from one cell within dot similarity matrix, e.g., cell (2, 5) in the dot similarity matrix is a score that indicates pooling probability and because the value has been generated from the normalized dot product of row 2 and row 5 then all the values within the two rows are participating in this value as described in FIGS. 57-59.

When the pooling process is used to pool small segments where each frame within each segment is homogenous with other frames within the segment, then the process builds a segment model to be used in the similarity estimation between each two segments for building the similarity matrix. This segment model takes into consideration the fact that each segment's structure is homogenous. To do that, the model components and prospective connections need to be initialized as described in FIGS. 51-56. This initialization ensures that the time relationship between frames is being mapped correctly within the model and the homogeneity between the segment's frames is considered. Hence, when the model is fitted over the segment it can map the segment correctly and generate accurate similarity between the segments.

Figure 49:
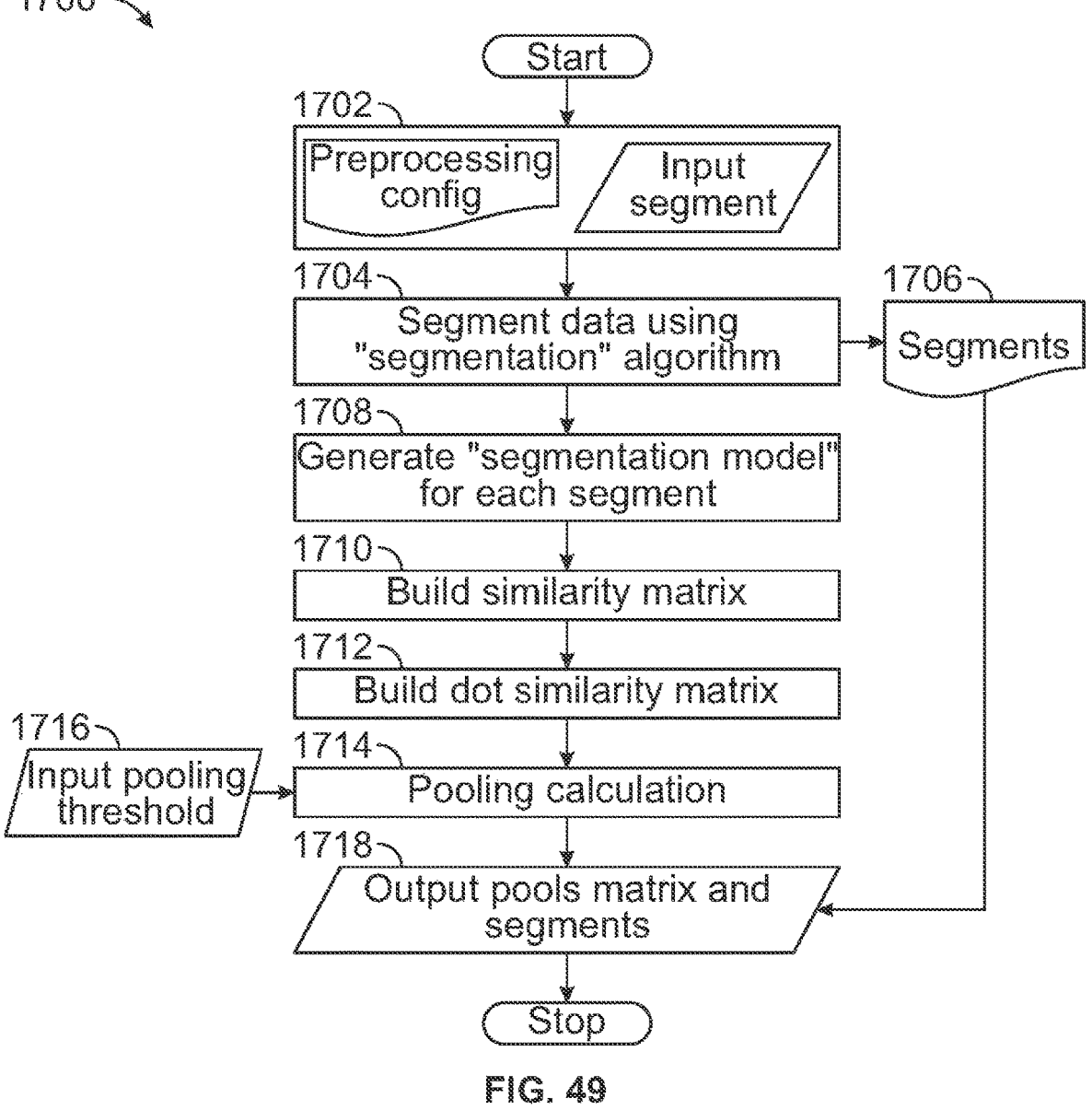
FIG. 49 illustrates a flow diagram of an exemplary process for pooling segments of a sequence of data that look like each other of the exemplary second embodiment of the automatic body movement recognition and association system in accordance with implementations of this disclosure.
Figure 50:
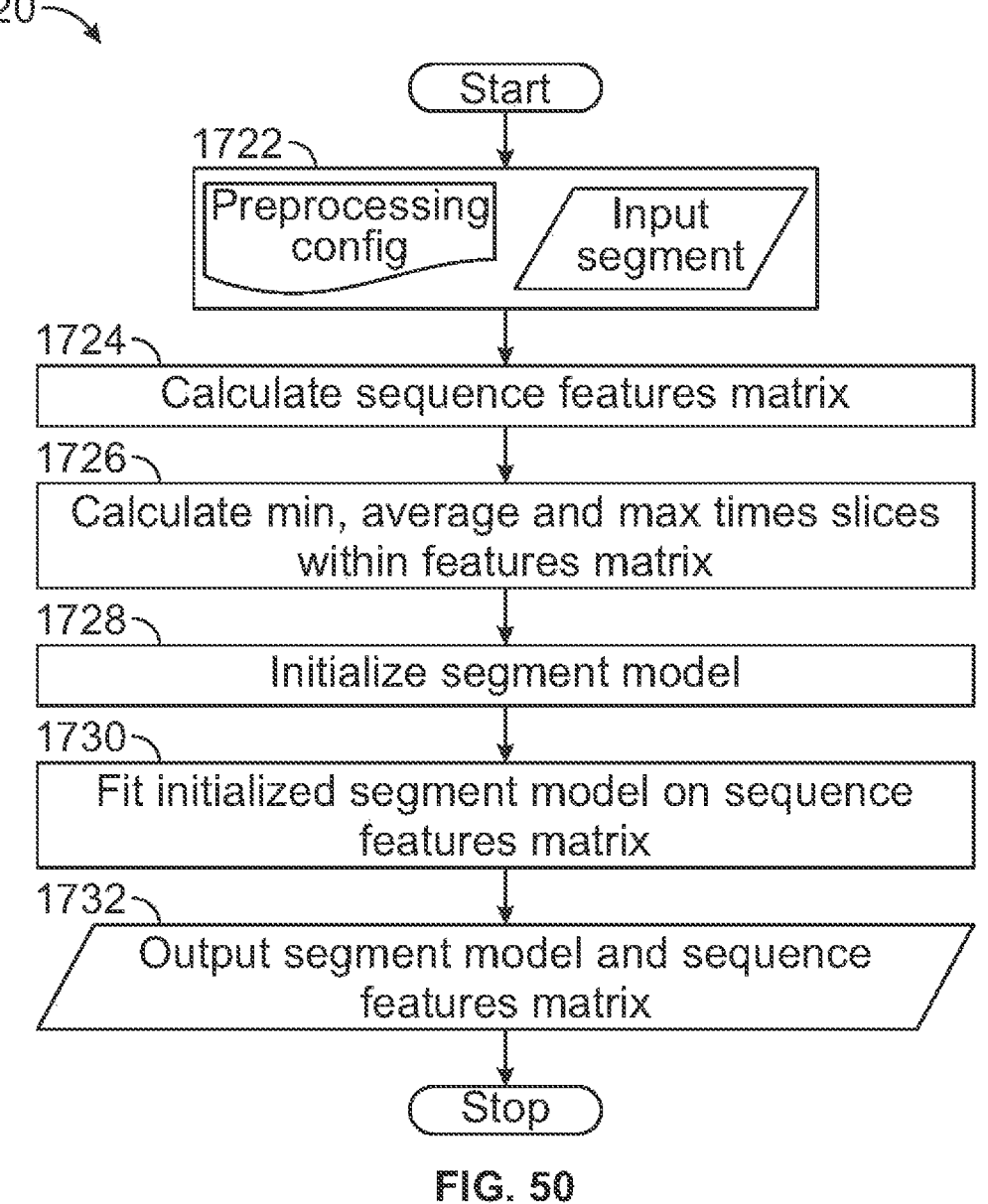
FIG. 50 illustrates a flow diagram of an exemplary process for generating a segment model of the exemplary second embodiment of the automatic body movement recognition and association system in accordance with implementations of this disclosure.

The body movement data is passed through a pooling process 1700, shown in FIG. 49 that pools segments that look like each other together. The pooling process 1700 segments the data using the segmentation algorithm described above and generates a segment model for each segment, shown in FIG. 50. The pooling process then builds a similarity matrix, shown in FIGS. 57-58, that describes how similar each segment is to all the other segments. The algorithm used for detecting similarity is a similarity algorithm using segment model in calculating similarity instead of using a dynamic connected model. The pooling process builds a dot similarity matrix, shown in FIGS. 59 and 60, that takes the similarity matrix and calculates a normalized dot product between each two rows to generate a new matrix that is called the dot similarity matrix. The output matrix will increase the similarity between some segments and reduce the similarity between other segments. For example, if we want to check more accurately the similarity between segment 1 and segment 5, then we will consider how similar segment 1 is to other segments than segment 5 (row 1). We also consider how similar segment 5 is to other segments than segment 1 (row 5). In order to do that, we will take the normalized dot product between row 1 and row 5. The new value is the dot similarity. Finally, the pooling calculation is performed, as shown in FIG. 60, which outputs pools matrix and segments.

In one illustrated exemplary implementation, shown in FIG. 49, process 1700 begins by receiving an input sequence and a preprocessing configuration, in any, 1702. Process 1700 segments data based on the input sequence and any preprocessing configuration using a "segmentation" algorithm 1704 to produce at least one segment 1706 and a segment model is generated for each segment 1708. Process 1700 then builds a similarity matrix 1710 and builds a dot similarity matrix 1712. Process 1700 receives an input pooling threshold 1716 and calculates pooling 1714, described in more detail with respect to FIG. 61, based on the pooling threshold. Process 1700 then outputs segments 1706 and a pools matrix 1718.

Generate Segment Model. A segment model is a probabilistic generative connected model which models segment specifically since segment is homogenous in its internal structure. A segment is exactly a sequence but with specific property, i.e., segments are sequences but homogenous in their internal structure. Therefore, we can apply methods used with sequences on segments, e.g., calculating sequence features matrix. In one illustrated exemplary implementation, shown in FIG. 50, a process 1720 for generating a segment model begins by receiving an input segment and a preprocessing configuration, if any, 1722 and calculates a sequence features matrix 1724. An minimum time slice, an average time slice, and a maximum time slice within the sequence features matrix are calculated 1726. Process 1720 then initializes a segment model 1728 and fits the initialized segment model on the sequence features matrix 1730, and then outputs the segment model and the sequence features matrix 1732.

Minimum, Average, and Maximum Features Matrix Rows. A features matrix represents multidimensional data, i.e., each row is greater than one dimension. Each row represents a time slice in a segment. Therefore, finding the minimum (min), average (ave), and maximum (max) is not a straightforward process. The process calculate dot product between each two rows saves the results. Rows that are closer to each other will have higher dot product values, while rows that are different from each other will have lower dot product values. If we took the min dot product value from this process, we would know that one of the two rows that participated in this calculation is either max or min while the other row will be the opposite of the first row. The process will not be able to tell which row is the max an which row is the min, but knowing both rows will be enough to initialize the segment model. To find the ave row we average each column in the features matrix, which will generate the ave row.

Figure 51:
FIG. 51 illustrates an exemplary graph of a different vectors example with a dot product that is small in value of the exemplary second embodiment of the automatic body movement recognition and association system in accordance with implementations of this disclosure.
Figure 52:
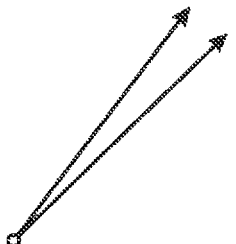
FIG. 52 illustrates an exemplary graph of a similar vectors example with a dot product that is big in value of the exemplary second embodiment of the automatic body movement recognition and association system in accordance with implementations of this disclosure.

A different vector example with dot product that is small in value is shown in FIG. 51. The example shown in FIG. 51 shows a two-dimensional (2D) vector. Sequence features matrix is much higher than that in dimensionality. 2D in this example is for illustration purposes only. A similar vector example with dot product that is big in value is shown in FIG. 52. The example shown in FIG. 52 shows a two-dimensional vector. Sequence features matrix is much higher than that in dimensionality. 2D in this example is for illustration purposes only.

Figures 53, 54, 55:
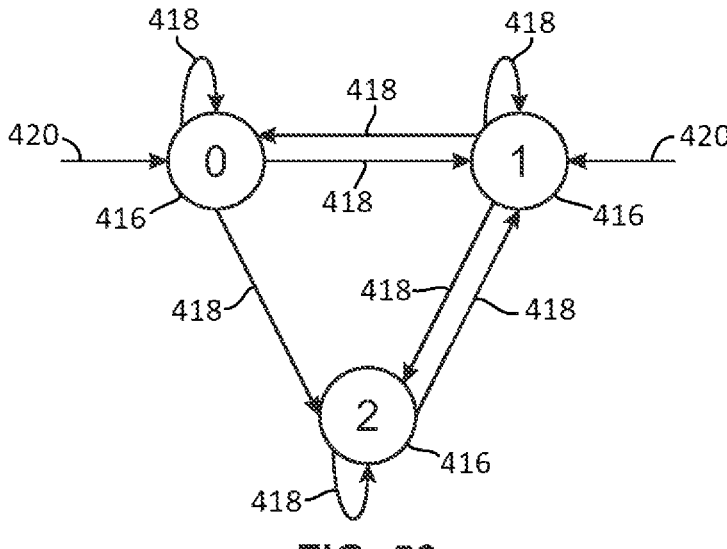
FIG. 53 illustrates an exemplary segment model, each circle representing a small piece of segment components transitioning across time, of the exemplary second embodiment of the automatic body movement recognition and association system in accordance with implementations of this disclosure.
FIG. 54 illustrates an exemplary transition matrix initialization of the black arrows of FIG. 52 of the exemplary second embodiment of the automatic body movement recognition and association system in accordance with implementations of this disclosure.
FIG. 55 illustrates an exemplary initial vectors initialization of the green arrows of FIG. 52 of the exemplary second embodiment of the automatic body movement recognition and association system in accordance with implementations of this disclosure.

Segment model initialization helps to map components transitioning across time. For example, each circle 416 in FIG. 53 represents a small piece of segment, i.e., component. The numbers within the circles 416 represent a label for each component. Arrows 418 each represent a transition from one component to another. Arrows 420 each represent the starting component. Arrows 418 and arrows 420 each comprise a probability that describes how probable a certain function is. Arrows 418 probabilities initialization is described in a transition matrix. Arrows 420 initialization is described in an initials vector. Each component is described using multivariate distribution family, e.g., multivariate normal distribution.

Referring to FIG. 59, a process to build a dot similarity matrix takes a similarity matrix and determines a normalized dot product between each two rows to generate a new matrix that is called the dot similarity matrix. The output matrix will increase the similarity between some segments and will reduce the similarity between other segments. For example, if we want to check the similarity more accurately between segment 1 and segment 5 (row 1), we also consider how similar segment 5 is to other segments than segment 1 (row 5). In order to do this, we will take the normalized dot product between row 1 and row 5, the new value being the dot similarity.

In one illustrated exemplary implementation, shown in FIG. 61, a process 1740 for calculating pooling begins by receiving an input dot similarity matrix 1742 and multiplying the dot similarity matrix diagonal by zero 1744. Process 1740 then initializes an empty pools matrix 1746. For each segment, i.e., for each row within the dot similarity matrix 1748, process 1740 determines whether it has reached the end of the loop 1750. If the end of the loop has been reached, process 1740 outputs a pools matrix 1752. If the end of the loop has not been reached, process 1740 determines whether the segment has been pooled before 1754. If the segment has been pooled before, process 1740 moves on to the next segment 1748. If the segment has not been pooled before, process 1740 opens a new pool by initializing a new empty row in the pools matrix and adds the current segment index into the pools matrix 1756. Process 1740 then determines whether the current segment has any similarity with another segment which is higher than the pooling threshold 1758. If the current segment does not have any similarity with the other segment(s), the current segment is cleared from the dot similarity matrix by setting all values within the segment column and row to zero 1760 and then process 1740 moves on to the next segment 1748. If the current segment does have similarity with the other segment(s), process 1740 receives an input pooling threshold 1774 and finds all segments that have a dot similarity value higher than the pooling threshold compared to the current segment's to output matching segments 1762. For each matching segment with the current segment 1764, process 1740 determines whether the matching segment's dot similarity value with the current segment is the highest among all other segments compared to the matching segment 1768. If the matching segment's dot similarity value is not the highest, process 1740 moves on to the next matching segment 1764. If the matching segment's dot similarity value is the highest, process 1740 adds the matching segment to the current pools matrix 1770, clears the matching segment from the dot similarity matrix by setting all values within the segment column and rows to zero 1772, and then moves on to the next matching segment 1764.

Referring to FIGS. 62-69, the body movement data is passed through a dynamic modeling process 1800 that includes a dynamic forward modeling process 1802, shown in FIG. 62, and a dynamic ergodic modeling process 1804, shown in FIG. 66. The dynamic forward modeling process 1802 builds a probabilistic connected model representation for sequential data, where each component of data comes one after the other. The input data to the algorithm represents body movement data from two dimensional and/or three-dimensional data sets. A sequence of data comprises multiple joints changing positions across time representing the skeletal movement. Sequence data may come with preprocessing configurations, including, but not limited to, rotation, repositioning, scaling, and smoothing. Once the sequence data is received, it is sent to the pre-processing module to be processed according to its preprocessing configuration. The preprocessed data is then sent to the feature generation module, which produces movement data represented as a feature matrix. The preprocessed data is also sent to the initial segmentation module, described above, which segments the data roughly into homogenous segments, maintaining the time order. These initial segments need further processing, because there could be overlap between segments and/or some data may not be mapped to any homogenous segment. This step is essential to have a baseline of how many connected components are needed for accurate segmentation of sequence data. The initial segmentation module produces all the initial segments, which may be good or bad. A segment is considered good if it has some defined movement, i.e., there are enough frames to represent a movement. From the pool of initial segments, only the good segments are used to initialize the probabilistic connected component model. This connected component model based on the initial segments is fitted against the feature matrix. The output is this connected model.

In one illustrated exemplary implementation, shown in FIG. 62, process 1802 begins by receiving an input sequence 1804. The input sequence is preprocessed 1806 to generate features of the preprocessed sequence 1808 and to get at least one initial segment of the preprocessed sequence 1810. Process 1802 then counts the number of good segments to ensure that only segments that include a segment length that is greater than a minimum frame number within the segment are included 1814. A forward connected component model is initialized based on the number of good segments 1818 and then process 1802 fits the initialized forward connected component model with the features of the preprocessed sequence 1816. A "segment using model" method is used to segment the input sequence based on the current forward connected component model 1820. Process 1802 then counts the number of good segments to ensure that only segments that include a segment length that is greater than a minimum frame number within the segment are included 1822 and determines whether the number of good segments is equal to the number of forward connected component models 1824. If the number of good segments is equal to the number of models, process 1802 outputs the forward connected component model 1826. If the number of good segments is not equal to the number of models, process 1802 loops back to initialize the next forward connected component model based on the number of good segments 1818.

Forward Connected Model Initialization. A forward connected model is a probabilistic generative connected model that describes the relationship between segment components across time. For example, each circle 422 in FIG. 63 represents a pool component. The numbers within the circles 422 represent a label for each component. The labels have no mathematical significance. Arrows 424 each represent a transition from one component to another. Arrow 426 represents the starting component. Arrows 424 and arrow 426 each comprise a probability that describes how probable a certain function is. Arrows 424 probabilities initialization is described in a transition matrix. Arrow 426 initialization is described in an initials vector. Each component is described using multivariate distribution family, e.g., multivariate normal distribution. Each component is initialized with respective segment feature data. This forward connected model will be able to model sequence with respect to time based upon segment number of sequence. The example shown in FIG. 63 is considering N good segments. Each component distribution is initialized by the respective segment data.

The dynamic ergodic modeling process 1828 builds a probabilistic connected model representation for sequential data, where each component represents a pool of segments. The input data to the algorithm represents body movement data from two dimensional and/or three-dimensional data sets. A sequence of data comprises multiple joints changing positions across time representing the skeletal movement. Sequence data may come with preprocessing configurations, including, but not limited to, rotation, repositioning, scaling, and smoothing. Once the sequence data is received, it is sent to the pre-processing module to be processed according to its preprocessing configuration. The preprocessed data is then sent to the feature generation module, which produces movement data represented as a feature matrix. The preprocessed data is also sent to the pooling module, described above, which organizes the segments roughly into homogenous pools. This is a two-step process, the first step comprising segmenting the sequence data into homogenous segments using the segmentation module described above and the second step comprises grouping the segments that are similar in movement into a segment pool. The pools are checked to make sure that there is at least one segment in each pool. The segment pools are then sent to the feature generation module, which generates features for each pool. The number of pools and their respective data are used to initialize the probabilistic connected model. The connected component model based on the pools is fitted against the feature matrix of the full sequence. The output is this connected model.

In one illustrated exemplary implementation, shown in FIG. 66, process 1828 begins by receiving an input sequence 1830. The input sequence is preprocessed 1832 to generate features of the preprocessed sequence 1834 and to generate at least one pool 1836. Process 1838 then generates features for each pool 1840 and initializes an ergodic connected component model based on the number of pools 1844. The initialized ergodic connected component model is then fit with the features of the preprocessed sequence 1842. A "segment using model" method is used to segment the input sequence based on the current ergodic connected component model 1846. Process 1828 pools again and then counts the number of pools 1848. Process 1828 then determines whether the pool number is equal to the number of ergodic connected component models 1850. If the pool number is not equal to the number of models, process 1828 loops back to initialize the next ergodic connected component model based on the number of pools 1844. If the pool number is equal to the number of model, process 1828 outputs the ergodic connected component model 1852.

Ergodic Connected Model Initialization. An ergodic connected model is a probabilistic generative connected model that describes the relationship between segment components across time. For example, each circle 428 in FIG. 67 represents a pool component. The numbers within circles 428 represent a label for each component. The labels have no mathematical significance. Arrows 430 each represent a transition from one component to another. Arrow 432 represents the starting component. Arrows 430 and arrow 432 each comprise a probability that describes how probable a certain function is. Arrows 430 probabilities initialization is described in a transition matrix. Arrow 432 initialization is described in an initials vector. Each component is described using multivariate distribution family, e.g., multivariate normal distribution. Each component is initialized with respective pool feature data. This ergodic connected model will be able to model sequence with respect to time based upon pools number of sequence. The example shown in FIG. 67 is considering N pools. Each component distribution is initialized by the respective pool data.

For simplicity of explanation, process 1400, process 1500, process 1502, process 1504, process 1600, process 1602, process 1604, process 1700, process 1800, process 1802, process 1828, process 1900, process 1920, and process 1940 are depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

While the present disclosure has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for smoothing a sequence of body movement data of a user comprising:
   receiving the sequence of body movement data from one of a camera, a video, and a sensor, wherein the sequence of body movement data comprises one of a set of two-dimensional coordinates of a plurality of points of a skeleton of the user and a set of three-dimensional coordinates of a plurality of points of a skeleton of the user;
   fine tuning the sequence of body movement data into a smoothed sequence of body movement data on a condition that the sequence does not contain errors;
   outputting the smoothed sequence of body movement data;
   smoothing the sequence based on a weighted moving average with a smallest window size to determine a first sequence;
   determining a reverse sequence based on the sequence;
   smoothing the reverse sequence based on the weighted moving average with the smallest window size;
   reversing the reverse sequence to determine a second sequence;
   determining an average sequence based on the first sequence and the second sequence; and
   outputting a fine tuned smoothed sequence based on the average sequence.

2. A method for segmenting a sequence of body movement data of a user comprising:
   receiving the sequence of body movement data from one of a camera, a video, and a sensor, wherein the sequence of body movement data comprises one of a set of two-dimensional coordinates of a plurality of points of a skeleton of the user and a set of three-dimensional coordinates of a plurality of points of a skeleton of the user;
   processing, using a preprocessing component, the sequence of body movement data into a preprocessed sequence of body movement data;
   determining a sequence curvature across time based on the preprocessed sequence of body movement data;
   initializing a curvature model into an initialized curvature model;
   fitting initialized curvature model on sequence curvature across time;
   labeling a plurality of curvature frames across time based on the initialized curvature model;
   initializing a previous gradient direction to a neutral direction;
   determining the previous gradient direction and a current gradient direction based on the labeled plurality of curvature frames; and
   identifying the plurality of initial segments of body movement data by checking for gradient direction shift from increasing to decreasing gradient.

3. The method of claim 2, further comprising:
   receiving one of the initial segments of body movement data and the plurality of initial segments of body movement data;
   identifying a dynamic forward model based on one of the initial segments of body movement data and the plurality of initial segments of body movement data;
   segmenting one of the initial segments of body movement data and the plurality of initial segments of body movement data based on the dynamic forward model; and identifying one of a segment of body movement data and a plurality of segments of body movement data.

* * * * *